United States Patent
Fan et al.

(10) Patent No.: US 12,101,621 B2
(45) Date of Patent: Sep. 24, 2024

(54) MULTIMEDIA INFORMATION PROCESSING METHOD AND APPARATUS, AND STORAGE MEDIUM

(71) Applicant: HUAWEI TECHNOLOGIES CO., LTD., Guangdong (CN)

(72) Inventors: Fan Fan, Shenzhen (CN); Jiang Li, Shenzhen (CN); Ruihua Li, Shenzhen (CN); Lelin Wang, Shenzhen (CN); Shuo Li, Shenzhen (CN); Jincheng Luo, Shenzhen (CN); Yu Huang, Wuhan (CN); Meng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 277 days.

(21) Appl. No.: 17/554,038

(22) Filed: Dec. 17, 2021

(65) Prior Publication Data

US 2022/0109944 A1 Apr. 7, 2022

Related U.S. Application Data

(63) Continuation of application No. PCT/CN2020/097183, filed on Jun. 19, 2020.

(30) Foreign Application Priority Data

Jun. 19, 2019 (CN) .......................... 201910533786.6

(51) Int. Cl.
*H04S 7/00* (2006.01)
*G11B 27/34* (2006.01)
(Continued)

(52) U.S. Cl.
CPC .............. *H04S 7/303* (2013.01); *G11B 27/34* (2013.01); *H04R 1/406* (2013.01); *H04R 3/005* (2013.01);
(Continued)

(58) Field of Classification Search
CPC .......... H04R 1/406; H04R 3/005; H04R 5/02; H04R 5/04; H04R 2430/20;
(Continued)

(56) References Cited

U.S. PATENT DOCUMENTS 9,913,011 B1 3/2018 Giuliani et al.
10,070,244 B1 * 9/2018 Dabney .................... H04R 5/04
(Continued)

FOREIGN PATENT DOCUMENTS

CN 101272570 A 9/2008
CN 103065658 A 4/2013
(Continued)

OTHER PUBLICATIONS

IEEE Std 802.11—2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

(Continued)

*Primary Examiner* — Jason R Kurr

(57) ABSTRACT

The technology of this application relates to a multimedia information processing method and apparatus, and a storage medium. The method includes determining a data transmission delay between a terminal device and a first playing device of at least two playing devices, determining a clock offset between the terminal device and the first playing device based on the data transmission delay between the terminal device and the first playing device, and determining, based on the clock offset between the terminal device and the first playing device, a first start playing time of multimedia information corresponding to the first playing device. The multimedia information processing method and apparatus, and storage medium provided in this application can enable each of the at least two playing devices to synchronously play multimedia information corresponding to the playing device, to improve listening experience of a user.

20 Claims, 22 Drawing Sheets

(51) Int. Cl.
*H04R 1/40* (2006.01)
*H04R 3/00* (2006.01)
*H04R 5/02* (2006.01)
*H04R 5/04* (2006.01)
*H04S 3/00* (2006.01)

(52) U.S. Cl.
CPC ............. *H04R 5/02* (2013.01); *H04R 5/04* (2013.01); *H04S 3/008* (2013.01); *H04S 7/301* (2013.01); *H04S 2400/01* (2013.01); *H04S 2400/15* (2013.01)

(58) Field of Classification Search
CPC . H04R 2430/21; H04R 2430/23; H04S 7/303; H04S 7/301; H04S 3/008; H04S 2400/01; H04S 2400/15; G11B 27/34
See application file for complete search history.

(56) References Cited

U.S. PATENT DOCUMENTS

| | | | | |
|---|---|---|---|---|
| 2008/0226087 A1* | 9/2008 | Kinghorn | ............... | H04S 7/301 381/59 |
| 2010/0027805 A1* | 2/2010 | Itou | ............... | G10K 11/17881 381/71.12 |
| 2015/0016642 A1* | 1/2015 | Walsh | ............... | H04S 7/301 381/307 |
| 2016/0249153 A1* | 8/2016 | Nielsen | ............... | H04R 5/02 |
| 2018/0192223 A1* | 7/2018 | Satheesh | ............... | H04S 7/301 |
| 2018/0242095 A1* | 8/2018 | Patil | ............... | H04S 7/301 |

FOREIGN PATENT DOCUMENTS

| | | |
|---|---|---|
| CN | 103841498 A | 6/2014 |
| CN | 104185122 A | 12/2014 |
| CN | 104467928 A | 3/2015 |
| CN | 104967953 A | 10/2015 |
| CN | 105847926 A | 8/2016 |
| CN | 106303836 A | 1/2017 |
| CN | 106341719 A | 1/2017 |
| CN | 106686520 A | 5/2017 |
| CN | 109218795 A | 1/2019 |
| CN | 109379613 A | 2/2019 |
| WO | 2016127699 A1 | 8/2016 |

OTHER PUBLICATIONS

Office Action issued in CN201910533786.6, dated Mar. 3, 2021, 15 pages.

International Search Report and Written Opinion issued in PCT/CN2020/097183, dated Aug. 27, 2020, 9 pages.

Office Action dated Feb. 16, 2022 for Chinese Application No. 201910533786, 9 pages.

* cited by examiner

MULTIMEDIA INFORMATION PROCESSING METHOD AND APPARATUS, AND STORAGE MEDIUM

CROSS-REFERENCE TO RELATED APPLICATIONS

This application is a continuation of International Application No. PCT/CN2020/097183, filed on Jun. 19, 2020, which claims priority to Chinese Patent Application No. 201910533786.6, filed on Jun. 19, 2019. The disclosures of the aforementioned applications are hereby incorporated by reference in their entireties.

TECHNICAL FIELD

Embodiments of this application relate to the field of multimedia technologies, and in particular, to a multimedia information processing method and apparatus, and a storage medium.

BACKGROUND

With popularization and intelligent development of mobile terminals and audio devices such as mobile phones, tablets, personal computers (PC), and wireless speakers, a plurality of intelligent devices usually exist in a home and are connected to a same local area network in a wired or wireless manner, making inter-device interaction and coordinated entertainment an important development direction for enhancing user entertainment experience.

Currently, multi-device coordinated playing mainly means establishing a wireless connection between a playing device (such as a wireless speaker or a Bluetooth speaker) and a terminal device (such as a mobile phone), to play an audio source on the terminal device by using the playing device. Specifically, the following two playing modes may be included. In the first mode, a plurality of playing devices play a same audio source, that is, a terminal device is connected to a master playing device, and an audio stream is first pushed to the master playing device by using a wireless network; and then the master playing device pushes the audio stream to other playing devices sequentially in a streaming mode. In the second mode, two playing devices are used to establish a connection to each other. A master playing device and a terminal device are connected in a wireless manner by using a router or a mobile hotspot. The terminal device pushes a stereo audio stream to the master playing device. Based on a configuration of a user, the master playing device determines to push an audio stream on a left sound channel or a right sound channel to a slave playing device for playing, and plays the opposite sound channel, to form a stereo effect.

However, in the foregoing two playing modes, audio stream playing may be asynchronous between the plurality of playing devices and between each playing device and the terminal device, and this phenomenon affects listening experience of the user.

SUMMARY

Embodiments of this application provide a multimedia information processing method and apparatus, and a storage medium, so that each of at least two playing devices can synchronously play multimedia information corresponding to the playing device, to improve listening experience of a user.

According to a first aspect, an embodiment of this application provides a multimedia information processing method, including:
  determining a data transmission delay between a terminal device and a first playing device of at least two playing devices;
  determining a clock offset between the terminal device and the first playing device based on the data transmission delay between the terminal device and the first playing device; and
  determining, based on the clock offset between the terminal device and the first playing device, a first start playing time of multimedia information corresponding to the first playing device, where the first start playing time is used to indicate a start time at which the first playing device plays the multimedia information corresponding to the first playing device.

In this solution, because a clock offset between the terminal device and each of the at least two playing devices may be determined based on a data transmission delay between the terminal device and the playing device, a start playing time of multimedia information corresponding to the playing device is determined. Therefore, each of the at least two playing devices can synchronously play the multimedia information corresponding to the playing device, to improve listening experience of a user.

In a possible implementation, the method is applied to the terminal device, and the method further includes:
  sending, to the first playing device, the multimedia information corresponding to the first playing device and the first start playing time.

In this solution, if the terminal device determines the first start playing time of the multimedia information corresponding to the first playing device, the multimedia information corresponding to the first playing device and the first start playing time further need to be sent to the first playing device. In this way, the first playing device starts to play the multimedia information at the first start playing time.

In a possible implementation, the method is applied to the terminal device, and the method further includes:
  determining a data transmission delay between the terminal device and a second playing device of the at least two playing devices;
  determining a clock offset between the terminal device and the second playing device based on the data transmission delay between the terminal device and the second playing device;
  determining, based on the clock offset between the terminal device and the second playing device, a second start playing time of multimedia information corresponding to the second playing device, where the second start playing time is used to indicate a start time at which the second playing device plays the multimedia information corresponding to the second playing device, and the first start playing time and the second start playing time enable the first playing device and the second playing device to synchronously play the multimedia information corresponding to the first playing device and the second playing device; and
  sending, to the second playing device, the multimedia information corresponding to the second playing device and the second start playing time.

In this solution, because the clock offset between the terminal device and each of the at least two playing devices may be determined based on the data transmission delay between the terminal device and the playing device, the start playing time of the multimedia information corresponding to the playing device is determined. Therefore, each of the at least two playing devices can synchronously play the multimedia information corresponding to the playing device, to improve listening experience of the user.

In a possible implementation, the determining a data transmission delay between a terminal device and a first playing device of at least two playing devices includes:
- determining the data transmission delay between the terminal device and the first playing device and a clock offset corresponding to the data transmission delay between the terminal device and the first playing device; and
- the determining a clock offset between the terminal device and the first playing device based on the data transmission delay between the terminal device and the first playing device includes:
- comparing the data transmission delay between the terminal device and the first playing device with a preset threshold; and
- if the data transmission delay between the terminal device and the first playing device is less than or equal to the preset threshold, determining that the clock offset corresponding to the data transmission delay between the terminal device and the first playing device is the clock offset between the terminal device and the first playing device.

In this solution, when the data transmission delay between the terminal device and the first playing device is less than or equal to the preset threshold, the determined clock offset between the terminal device and the first playing device has a small error. In this case, it is determined that the clock offset corresponding to the data transmission delay between the terminal device and the first playing device is the clock offset between the terminal device and the first playing device. This can improve accuracy of the clock offset.

In a possible implementation, the determining the data transmission delay between the terminal device and the first playing device and a clock offset corresponding to the data transmission delay between the terminal device and the first playing device includes:
- determining, based on times at which synchronization messages are sent and received by the terminal device and the first playing device, the data transmission delay between the terminal device and the first playing device and the clock offset corresponding to the data transmission delay between the terminal device and the first playing device.

In a possible implementation, the method further includes:
- if the data transmission delay between the terminal device and the first playing device is greater than the preset threshold, determining the clock offset between the terminal device and the first playing device based on historical times that are recorded by the terminal device and at which synchronization messages are sent and received by the terminal device and the first playing device, where the historical times are recorded in a historical time period of preset duration, or a quantity of the historical times is a preset value.

In this solution, if the data transmission delay between the terminal device and the first playing device is greater than the preset threshold, it indicates that the clock offset corresponding to the data transmission delay between the terminal device and the first playing device has a large error. In this case, it may be determined that the clock offset corresponding to the data transmission delay between the terminal device and the first playing device is invalid. In this case, the clock offset between the terminal device and the first playing device may be determined based on the historical times that are pre-recorded by the terminal device and at which synchronization messages are sent and received by the terminal device and the first playing device. This can reduce the error of the determined clock offset between the terminal device and the first playing device.

In a possible implementation, the determining the clock offset between the terminal device and the first playing device based on historical times that are recorded by the terminal device and at which synchronization messages are sent and received by the terminal device and the first playing device includes:
- determining, based on the historical times, at least two historical data transmission delays and historical clock offsets corresponding to the at least two historical data transmission delays, where the at least two historical data transmission delays are data transmission delays between the terminal device and the first playing device; and
- determining that a historical clock offset corresponding to a shortest one of the at least two historical data transmission delays is the clock offset between the terminal device and the first playing device.

In this solution, it may be determined that the historical clock offset corresponding to the shortest one of the at least two historical data transmission delays is the clock offset between the terminal device and the first playing device. Therefore, the error of the clock offset between the terminal device and the first playing device can be further reduced, and accuracy of the determined clock offset is improved.

In a possible implementation, the method is applied to the terminal device, and the synchronization messages include a synchronization request and a synchronization response; and the method further includes:
- determining a first time at which a synchronization request is received from the first playing device and a second time at which a synchronization response is sent to the first playing device; and
- receiving a first message from the first playing device, where the first message includes a third time at which the first playing device sends the synchronization request and a fourth time at which the first playing device receives the synchronization response; and
- the determining, based on times at which synchronization messages are sent and received by the terminal device and the first playing device, the data transmission delay between the terminal device and the first playing device and the clock offset corresponding to the data transmission delay between the terminal device and the first playing device includes:
- determining, based on the first time, the second time, the third time, and the fourth time, the data transmission delay between the terminal device and the first playing device and the clock offset corresponding to the data transmission delay between the terminal device and the first playing device.

In this solution, the data transmission delay between the terminal device and the first playing device and the clock offset corresponding to the data transmission delay between the terminal device and the first playing device may be determined based on the times at which the synchronization request and the synchronization response are sent and received by the terminal device and the first playing device. This helps improve accuracy of the data transmission delay and the clock offset.

In a possible implementation, the method is applied to the terminal device, and the synchronization messages include a synchronization request and a synchronization response; and the method further includes:

determining a fifth time at which a synchronization request is sent to the first playing device and a sixth time at which a synchronization response is received from the first playing device; and receiving a second message from the first playing device, where the second message includes a seventh time at which the first playing device receives the synchronization request and an eighth time at which the first playing device sends the synchronization response; and the determining, based on times at which synchronization messages are sent and received by the terminal device and the first playing device, the data transmission delay between the terminal device and the first playing device and the clock offset corresponding to the data transmission delay between the terminal device and the first playing device includes:

determining, based on the fifth time, the sixth time, the seventh time, and the eighth time, the data transmission delay between the terminal device and the first playing device and the clock offset corresponding to the data transmission delay between the terminal device and the first playing device.

In this solution, the data transmission delay between the terminal device and the first playing device and the clock offset corresponding to the data transmission delay between the terminal device and the first playing device may be determined based on the times at which the synchronization request and the synchronization response are sent and received by the terminal device and the first playing device. This helps improve accuracy of the data transmission delay and the clock offset.

In a possible implementation, the multimedia information includes audio information; and the sending, to the first playing device, the multimedia information corresponding to the first playing device includes:

performing sound channel processing on an audio stream to be played, to obtain audio information corresponding to at least two sound channels; and sending, to the first playing device, audio information corresponding to one of the at least two sound channels.

In this solution, the audio information corresponding to one of the at least two sound channels is sent to the first playing device, so that when the at least two playing devices play the audio information, a stereo effect can be achieved.

According to a second aspect, an embodiment of this application provides a multimedia information processing method, including:

obtaining relative position information of at least two playing devices;

obtaining position information of a user relative to the at least two playing devices based on the relative position information of the at least two playing devices; and performing, based on the position information of the user relative to the at least two playing devices and the relative position information of the at least two playing devices, a sound field correction on original multimedia information corresponding to a first playing device of the at least two playing devices, to obtain multimedia information corresponding to the first playing device, where the multimedia information includes audio information.

In this solution, because a sound field correction can be performed, based on the position information of the user relative to the at least two playing devices and the relative position information of the at least two playing devices, on original multimedia information corresponding to each of the at least two playing devices, and corrected multimedia information is sent to each playing device, after the playing device plays the multimedia information, the user is in a sweet spot, and listening experience of the user can be improved.

In a possible implementation, the method is applied to a terminal device, and the method further includes:

sending, to the first playing device, the multimedia information corresponding to the first playing device.

In this solution, if the terminal device performs, based on the position information of the user relative to the at least two playing devices and the relative position information of the at least two playing devices, the sound field correction on the original multimedia information corresponding to the first playing device of the at least two playing devices, to obtain the multimedia information corresponding to the first playing device, the terminal device further needs to send, to the first playing device, the multimedia information corresponding to the first playing device, so that the first playing device plays the multimedia information.

In a possible implementation, the method is applied to the terminal device, and the method further includes:

performing, based on the position information of the user relative to the at least two playing devices and the relative position information of the at least two playing devices, a sound field correction on original multimedia information corresponding to a second playing device of the at least two playing devices, to obtain multimedia information corresponding to the second playing device, where the multimedia information includes audio information; and sending, to the second playing device, the multimedia information corresponding to the second playing device.

In this solution, because the sound field correction can be performed, based on the position information of the user relative to the at least two playing devices and the relative position information of the at least two playing devices, on the original multimedia information corresponding to each of the at least two playing devices, and the corrected multimedia information is sent to each playing device, after the playing device plays the multimedia information, the user is in a sweet spot, and listening experience of the user can be improved.

In a possible implementation, the relative position information of the at least two playing devices includes a distance between the first playing device and the second playing device of the at least two playing devices, and the obtaining position information of a user relative to the at least two playing devices based on the relative position information of the at least two playing devices includes:

obtaining first angle information of the first playing device relative to a microphone array of the second playing device and second angle information of the second playing device relative to a microphone array of the first playing device by using a sound source localization technology, where the first angle information is angle information in a coordinate axis of the microphone array of the second playing device, and the second angle information is angle information in a coordinate axis of the microphone array of the first playing device;

performing a rotation correction on the coordinate axis of the microphone array of the first playing device based on the first angle information and the second angle information, where an axial direction of the coordinate axis of the microphone array of the second playing device is consistent with an axial direction of the coordinate axis of the microphone array of the first playing device after the rotation correction; and determining, based on the coordinate axis of the microphone array of the first playing device after the rotation correction and based on the distance between the first playing device and the second playing device, a position of the user relative to the first playing device.

In this solution, the rotation correction is performed on the coordinate axis of the microphone array of the first playing device, so that the axial direction of the coordinate axis of the microphone array of the second playing device is consistent with the axial direction of the coordinate axis of the microphone array of the first playing device after the rotation correction. This can improve accuracy of the determined position of the user relative to the first playing device.

In a possible implementation, the determining, based on the coordinate axis of the microphone array of the first playing device after the rotation correction and based on the distance between the first playing device and the second playing device, a position of the user relative to the first playing device includes:

obtaining third angle information of the user relative to the microphone array of the first playing device by using the sound source localization technology, where the third angle information is angle information in the coordinate axis of the microphone array of the first playing device after the rotation correction;

obtaining fourth angle information of the user relative to the microphone array of the second playing device by using the sound source localization technology, where the fourth angle information is angle information in the coordinate axis of the microphone array of the second playing device; and determining the position of the user relative to the first playing device based on the distance between the first playing device and the second playing device, the third angle information, and the fourth angle information.

In this solution, the position of the user relative to the first playing device may be determined based on the distance between the first playing device and the second playing device, the third angle information, and the fourth angle information. This can avoid a phenomenon in the prior art that a user needs to manually measure a position of the user relative to a first playing device. Therefore, not only efficiency can be improved, but also user experience can be improved.

In a possible implementation, the relative position information of the at least two playing devices includes the distance between the first playing device and the second playing device of the at least two playing devices, and the obtaining relative position information of at least two playing devices includes:

determining first duration and second duration, where the first duration is a difference between a time at which the microphone of the first playing device captures a second sound played by the second playing device and a time at which the microphone of the first playing device captures a first sound played by the first playing device, and the second duration is a difference between a time at which the microphone of the second playing device captures the second sound played by the second playing device and a time at which the microphone of the second playing device captures the first sound played by the first playing device; and determining the distance between the first playing device and the second playing device based on the first duration and the second duration.

In a possible implementation, the determining the distance between the first playing device and the second playing device based on the first duration and the second duration includes:

determining the distance between the first playing device and the second playing device based on a formula $D=(Tdelay1-Tdelay2)*C/2$, where D is the distance between the first playing device and the second playing device, Tdelay1 is the first duration, Tdelay2 is the second duration, and C is a sound velocity.

In this solution, the distance between the first playing device and the second playing device may be determined based on the first duration and the second duration. This can avoid a phenomenon in the prior art that a user needs to manually measure a distance between a first playing device and a second playing device. Therefore, not only efficiency can be improved, but also user experience can be improved.

In a possible implementation, the method is applied to the terminal device, and the method further includes:

when the first playing device plays the multimedia information corresponding to the first playing device, capturing mixed multimedia information, where the mixed multimedia information includes the multimedia information corresponding to the first playing device and ambient noise information;

determining the ambient noise information and/or an estimated value of a secondary path impulse response from the first playing device to the terminal device based on the multimedia information corresponding to the first playing device and the mixed multimedia information; and sending the ambient noise information and/or the estimated value of the secondary path impulse response to the first playing device, where the noise information and/or the estimated value of the secondary path impulse response are/is used to obtain reverse noise, and the reverse noise is used to cancel the ambient noise information.

In this solution, when the first playing device plays the multimedia information corresponding to the first playing device, the terminal device captures the mixed multimedia information, determines the ambient noise information and/or the estimated value of the secondary path impulse response from the first playing device to the terminal device based on the multimedia information corresponding to the first playing device and the mixed multimedia information, and sends the ambient noise information and/or the estimated value of the secondary path impulse response to the first playing device; and then the first playing device may obtain the reverse noise based on the ambient noise information and/or the estimated value of the secondary path impulse response, to cancel the ambient noise information. Therefore, an objective of active noise reduction can also be achieved in an open environment.

According to a third aspect, an embodiment of this application provides a multimedia information processing method, including:

receiving multimedia information corresponding to a playing device and a start playing time that are sent by a terminal device, where the start playing time is determined by the terminal device based on a clock offset between the terminal device and the playing device, and the clock offset between the terminal device and the playing device is determined by the terminal device based on a data transmission delay between the terminal device and the playing device; and playing, based on the start playing time, the multimedia information corresponding to the playing device.

In this solution, because a clock offset between the terminal device and each of at least two playing devices may be determined based on a data transmission delay between the terminal device and the playing device, a start playing time of multimedia information corresponding to the playing device is determined. Therefore, each of the at least two playing devices can synchronously play the multimedia information corresponding to the playing device, to improve listening experience of a user.

In a possible implementation, the method further includes:

determining a third time at which a synchronization request is sent to the terminal device and a fourth time at which a synchronization response is received from the terminal device; and sending a first message to the terminal device, where the first message includes the third time and the fourth time, the first message is used to instruct the terminal device to determine the clock offset between the terminal device and the playing device based on a first time, a second time, the third time, and the fourth time, the first time is a time at which the terminal device receives the synchronization request, and the second time is a time at which the terminal device sends the synchronization response.

In this solution, the data transmission delay between the terminal device and the first playing device and the clock offset corresponding to the data transmission delay between the terminal device and the first playing device may be determined based on the times at which the synchronization request and the synchronization response are sent and received by the terminal device and the first playing device. This helps improve accuracy of the data transmission delay and the clock offset.

In a possible implementation, the method further includes:

determining a seventh time at which a synchronization request is received from the terminal device and an eighth time at which a synchronization response is sent to the terminal device; and sending a second message to the terminal device, where the second message includes the seventh time and the eighth time, the second message is used to instruct the terminal device to determine the clock offset between the terminal device and the playing device based on a fifth time, a sixth time, the seventh time, and the eighth time, the fifth time is a time at which the terminal device sends the synchronization request, and the sixth time is a time at which the terminal device receives the synchronization response.

In this solution, the data transmission delay between the terminal device and the first playing device and the clock offset corresponding to the data transmission delay between the terminal device and the first playing device may be determined based on the times at which the synchronization request and the synchronization response are sent and received by the terminal device and the first playing device. This helps improve accuracy of the data transmission delay and the clock offset.

In a possible implementation, the multimedia information includes audio information; and the receiving multimedia information corresponding to a playing device and sent by a terminal device includes:

receiving audio information sent by the terminal device, where the audio information is audio information corresponding to one of at least two sound channels and obtained by the terminal device by performing sound channel processing on an audio stream to be played.

In this solution, the audio information corresponding to one of the at least two sound channels is sent to the first playing device, so that when the at least two playing devices play the audio information, a stereo effect can be achieved.

According to a fourth aspect, an embodiment of this application provides a multimedia information processing method, including:

receiving multimedia information corresponding to a first playing device and sent by a terminal device, where the multimedia information includes audio information, and the multimedia information corresponding to the first playing device is obtained by the terminal device by performing, based on position information of a user relative to at least two playing devices and relative position information of the at least two playing devices, a sound field correction on original multimedia information corresponding to the first playing device of the at least two playing devices; and playing the multimedia information corresponding to the first playing device.

In this solution, because a sound field correction can be performed, based on the position information of the user relative to the at least two playing devices and the relative position information of the at least two playing devices, on original multimedia information corresponding to each of the at least two playing devices, and corrected multimedia information is sent to each playing device, after the playing device plays the multimedia information, the user is in a sweet spot, and listening experience of the user can be improved.

In a possible implementation, the relative position information of the at least two playing devices includes a distance between the first playing device and a second playing device of the at least two playing devices; and the method further includes:

obtaining first angle information of the first playing device relative to a microphone array of the second playing device and second angle information of the second playing device relative to a microphone array of the first playing device by using a sound source localization technology, where the first angle information is angle information in a coordinate axis of the microphone array of the second playing device, and the second angle information is angle information in a coordinate axis of the microphone array of the first playing device;

performing a rotation correction on the coordinate axis of the microphone array of the first playing device based on the first angle information and the second angle information, where an axial direction of the coordinate axis of the microphone array of the second playing device is consistent with an axial direction of the coordinate axis of the microphone array of the first playing device after the rotation correction;

determining, based on the coordinate axis of the microphone array of the first playing device after the rotation correction and based on the distance between the first playing device and the second playing device, a position of the user relative to the first playing device; and sending, to the terminal device, the position of the user relative to the first playing device.

In this solution, the rotation correction is performed on the coordinate axis of the microphone array of the first playing device, so that the axial direction of the coordinate axis of the microphone array of the second playing device is consistent with the axial direction of the coordinate axis of the microphone array of the first playing device after the rotation correction. This can improve accuracy of the determined position of the user relative to the first playing device.

In a possible implementation, the determining, based on the coordinate axis of the microphone array of the first playing device after the rotation correction and based on the distance between the first playing device and the second playing device, a position of the user relative to the first playing device includes:

obtaining third angle information of the user relative to the microphone array of the first playing device by using the sound source localization technology, where the third angle information is angle information in the coordinate axis of the microphone array of the first playing device after the rotation correction;

obtaining fourth angle information of the user relative to the microphone array of the second playing device by using the sound source localization technology, where the fourth angle information is angle information in the coordinate axis of the microphone array of the second playing device; and determining the position of the user relative to the first playing device based on the distance between the first playing device and the second playing device, the third angle information, and the fourth angle information.

In this solution, the position of the user relative to the first playing device may be determined based on the distance between the first playing device and the second playing device, the third angle information, and the fourth angle information. This can avoid a phenomenon in the prior art that a user needs to manually measure a position of the user relative to a first playing device. Therefore, not only efficiency can be improved, but also user experience can be improved.

In a possible implementation, the method further includes:

determining first duration and second duration, where the first duration is a difference between a time at which the microphone of the first playing device captures a second sound played by the second playing device and a time at which the microphone of the first playing device captures a first sound played by the first playing device, and the second duration is a difference between a time at which the microphone of the second playing device captures the second sound played by the second playing device and a time at which the microphone of the second playing device captures the first sound played by the first playing device; and determining the distance between the first playing device and the second playing device based on the first duration and the second duration.

In a possible implementation, the determining the distance between the first playing device and the second playing device based on the first duration and the second duration includes: determining the distance between the first playing device and the second playing device based on a formula $D=(Tdelay1-Tdelay2)*C/2$, where D is the distance between the first playing device and the third playing device, $Tdelay1$ is the first duration, $Tdelay2$ is the second duration, and C is a sound velocity.

In this solution, the distance between the first playing device and the second playing device may be determined based on the first duration and the second duration. This can avoid a phenomenon in the prior art that a user needs to manually measure a distance between a first playing device and a second playing device. Therefore, not only efficiency can be improved, but also user experience can be improved.

In a possible implementation, the method further includes:

receiving ambient noise information and/or an estimated value of a secondary path impulse response from the first playing device to the terminal device that are/is sent by the terminal device, where the ambient noise information and/or the estimated value of the secondary path impulse response from the first playing device to the terminal device are/is determined based on the audio information corresponding to the first playing device and mixed audio information that is captured by the terminal device when the first playing device plays the audio information corresponding to the first playing device, and the mixed audio information includes the audio information corresponding to the first playing device and the ambient noise information; and determining reverse noise based on the ambient noise information and/or the estimated value of the secondary path impulse response, where the reverse noise is used to cancel the ambient noise information.

In this solution, when the first playing device plays the multimedia information corresponding to the first playing device, the terminal device captures mixed multimedia information, determines the ambient noise information and/or the estimated value of the secondary path impulse response from the first playing device to the terminal device based on the multimedia information corresponding to the first playing device and the mixed multimedia information, and sends the ambient noise information and/or the estimated value of the secondary path impulse response to the first playing device; and then the first playing device may obtain the reverse noise based on the ambient noise information and/or the estimated value of the secondary path impulse response, to cancel the ambient noise information. Therefore, an objective of active noise reduction can also be achieved in an open environment.

According to a fifth aspect, an embodiment of this application provides a multimedia information processing apparatus, including:

a first processing unit, configured to determine a data transmission delay between a terminal device and a first playing device of at least two playing devices, where the first processing unit is further configured to determine a clock offset between the terminal device and the first playing device based on the data transmission delay between the terminal device and the first playing device; and a second processing unit, configured to determine, based on the clock offset between the terminal device and the first playing device, a first start playing time of multimedia information corresponding to the first playing device, where the first start playing time is used to indicate a start time at which the first playing device plays the multimedia information corresponding to the first playing device.

In a possible implementation, the apparatus is the terminal device, and the apparatus further includes:

a sending unit, configured to send, to the first playing device, the multimedia information corresponding to the first playing device and the first start playing time.

In a possible implementation, the apparatus is the terminal device, and the apparatus further includes the sending unit.

The first processing unit is further configured to determine a data transmission delay between the terminal device and a second playing device of the at least two playing devices.

The first processing unit is further configured to determine a clock offset between the terminal device and the second playing device based on the data transmission delay between the terminal device and the second playing device.

The second processing unit is further configured to determine, based on the clock offset between the terminal device and the second playing device, a second start playing time of multimedia information corresponding to the second playing device, where the second start playing time is used to indicate a start time at which the second playing device plays the multimedia information corresponding to the second playing device, and the first start playing time and the second start playing time enable the first playing device and the second playing device to synchronously play the multimedia information corresponding to the first playing device and the second playing device.

The sending unit is configured to send, to the second playing device, the multimedia information corresponding to the second playing device and the second start playing time.

In a possible implementation, the first processing unit is configured to:

determine the data transmission delay between the terminal device and the first playing device and a clock offset corresponding to the data transmission delay between the terminal device and the first playing device;

compare the data transmission delay between the terminal device and the first playing device with a preset threshold; and if the data transmission delay between the terminal device and the first playing device is less than or equal to the preset threshold, determine that the clock offset corresponding to the data transmission delay between the terminal device and the first playing device is the clock offset between the terminal device and the first playing device.

In a possible implementation, the first processing unit is configured to:

determine, based on times at which synchronization messages are sent and received by the terminal device and the first playing device, the data transmission delay between the terminal device and the first playing device and the clock offset corresponding to the data transmission delay between the terminal device and the first playing device.

In a possible implementation, the first processing unit is configured to:

if the data transmission delay between the terminal device and the first playing device is greater than the preset threshold, determine the clock offset between the terminal device and the first playing device based on historical times that are recorded by the terminal device and at which synchronization messages are sent and received by the terminal device and the first playing device, where the historical times are recorded in a historical time period of preset duration, or a quantity of the historical times is a preset value.

In a possible implementation, the first processing unit is configured to:

determine, based on the historical times, at least two historical data transmission delays and historical clock offsets corresponding to the at least two historical data transmission delays, where the at least two historical data transmission delays are data transmission delays between the terminal device and the first playing device; and determine that a historical clock offset corresponding to a shortest one of the at least two historical data transmission delays is the clock offset between the terminal device and the first playing device.

In a possible implementation, the apparatus is the terminal device, and the synchronization messages include a synchronization request and a synchronization response; and the apparatus further includes a receiving unit.

The first processing unit is further configured to determine a first time at which a synchronization request is received from the first playing device and a second time at which a synchronization response is sent to the first playing device.

The receiving unit is configured to receive a first message from the first playing device, where the first message includes a third time at which the first playing device sends the synchronization request and a fourth time at which the first playing device receives the synchronization response.

The first processing unit is further configured to determine, based on the first time, the second time, the third time, and the fourth time, the data transmission delay between the terminal device and the first playing device and the clock offset corresponding to the data transmission delay between the terminal device and the first playing device.

In a possible implementation, the apparatus is the terminal device, and the synchronization messages include a synchronization request and a synchronization response; and the apparatus further includes a receiving unit.

The first processing unit is further configured to determine a fifth time at which a synchronization request is sent to the first playing device and a sixth time at which a synchronization response is received from the first playing device.

The receiving unit is configured to receive a second message from the first playing device, where the second message includes a seventh time at which the first playing device receives the synchronization request and an eighth time at which the first playing device sends the synchronization response.

The first processing unit is further configured to determine, based on the fifth time, the sixth time, the seventh time, and the eighth time, the data transmission delay between the terminal device and the first playing device and the clock offset corresponding to the data transmission delay between the terminal device and the first playing device.

In a possible implementation, the multimedia information includes audio information; and the sending unit is further configured to:

perform sound channel processing on an audio stream to be played, to obtain audio information corresponding to at least two sound channels; and send, to the first playing device, audio information corresponding to one of the at least two sound channels.

According to a sixth aspect, an embodiment of this application provides a multimedia information processing apparatus, including:

a first processing unit, configured to obtain relative position information of at least two playing devices, where the first processing unit is further configured to obtain position information of a user relative to the at least two playing devices based on the relative position information of the at least two playing devices; and a second processing unit, configured to perform, based on the position information of the user relative to the at least two playing devices and the relative position information of the at least two playing devices, a sound field correction on original multimedia information corresponding to a first playing device of the at least two playing devices, to obtain multimedia information corresponding to the first playing device, where the multimedia information includes audio information.

In a possible implementation, the apparatus is a terminal device, and the apparatus further includes a sending unit.

The sending unit is configured to send, to the first playing device, the multimedia information corresponding to the first playing device.

In a possible implementation, the apparatus is the terminal device, and the apparatus further includes the sending unit.

The second processing unit is further configured to perform, based on the position information of the user relative to the at least two playing devices and the relative position information of the at least two playing devices, a sound field correction on original multimedia information corresponding to a second playing device of the at least two playing devices, to obtain multimedia information corresponding to the second playing device, where the multimedia information includes audio information.

The sending unit is configured to send, to the second playing device, the multimedia information corresponding to the second playing device.

In a possible implementation, the relative position information of the at least two playing devices includes a distance between the first playing device and the second playing device of the at least two playing devices; and the first processing unit is configured to:

obtain first angle information of the first playing device relative to a microphone array of the second playing device and second angle information of the second playing device relative to a microphone array of the first playing device by using a sound source localization technology, where the first angle information is angle information in a coordinate axis of the microphone array of the second playing device, and the second angle information is angle information in a coordinate axis of the microphone array of the first playing device;

perform a rotation correction on the coordinate axis of the microphone array of the first playing device based on the first angle information and the second angle information, where an axial direction of the coordinate axis of the microphone array of the second playing device is consistent with an axial direction of the coordinate axis of the microphone array of the first playing device after the rotation correction; and determine, based on the coordinate axis of the microphone array of the first playing device after the rotation correction and based on the distance between the first playing device and the second playing device, a position of the user relative to the first playing device.

In a possible implementation, the first processing unit is configured to:

obtain third angle information of the user relative to the microphone array of the first playing device by using the sound source localization technology, where the third angle information is angle information in the coordinate axis of the microphone array of the first playing device after the rotation correction;

obtain fourth angle information of the user relative to the microphone array of the second playing device by using the sound source localization technology, where the fourth angle information is angle information in the coordinate axis of the microphone array of the second playing device; and determine the position of the user relative to the first playing device based on the distance between the first playing device and the second playing device, the third angle information, and the fourth angle information.

In a possible implementation, the relative position information of the at least two playing devices includes the distance between the first playing device and the second playing device of the at least two playing devices; and the first processing unit is configured to:

determine first duration and second duration, where the first duration is a difference between a time at which the microphone of the first playing device captures a second sound played by the second playing device and a time at which the microphone of the first playing device captures a first sound played by the first playing device, and the second duration is a difference between a time at which the microphone of the second playing device captures the second sound played by the second playing device and a time at which the microphone of the second playing device captures the first sound played by the first playing device; and determine the distance between the first playing device and the second playing device based on the first duration and the second duration.

In a possible implementation, the first processing unit is configured to:

determine the distance between the first playing device and the second playing device based on a formula $D=(Tdelay1-Tdelay2)*C/2$, where D is the distance between the first playing device and the second playing device, Tdelay1 is the first duration, Tdelay2 is the second duration, and C is a sound velocity.

In a possible implementation, the apparatus is the terminal device, and the apparatus further includes the sending unit.

When the first playing device plays the multimedia information corresponding to the first playing device, the second processing unit is further configured to capture mixed multimedia information, where the mixed multimedia information includes the multimedia information corresponding to the first playing device and ambient noise information.

The second processing unit is further configured to determine the ambient noise information and/or an estimated value of a secondary path impulse response from the first playing device to the terminal device based on the multimedia information corresponding to the first playing device and the mixed multimedia information.

The sending unit is configured to send the ambient noise information and/or the estimated value of the secondary path impulse response to the first playing device, where the noise information and/or the estimated value of the secondary path impulse response are/is used to obtain reverse noise, and the reverse noise is used to cancel the ambient noise information.

According to a seventh aspect, an embodiment of this application provides a multimedia information processing apparatus, including:

a receiving unit, configured to receive multimedia information corresponding to a playing device and a start playing time that are sent by a terminal device, where the start playing time is determined by the terminal device based on a clock offset between the terminal device and the playing device, and the clock offset between the terminal device and the playing device is determined by the terminal device based on a data transmission delay between the terminal device and the playing device; and a processing unit, configured to play, based on the start playing time, the multimedia information corresponding to the playing device.

In a possible implementation, the apparatus further includes a sending unit.

The processing unit is further configured to determine a third time at which a synchronization request is sent to the terminal device and a fourth time at which a synchronization response is received from the terminal device.

The sending unit is configured to send a first message to the terminal device, where the first message includes the third time and the fourth time, the first message is used to instruct the terminal device to determine the clock offset between the terminal device and the playing device based on a first time, a second time, the third time, and the fourth time, the first time is a time at which the terminal device receives the synchronization request, and the second time is a time at which the terminal device sends the synchronization response.

The processing unit is further configured to determine a seventh time at which a synchronization request is received from the terminal device and an eighth time at which a synchronization response is sent to the terminal device.

The sending unit is configured to send a second message to the terminal device, where the second message includes the seventh time and the eighth time, the second message is used to instruct the terminal device to determine the clock offset between the terminal device and the playing device based on a fifth time, a sixth time, the seventh time, and the eighth time, the fifth time is a time at which the terminal device sends the synchronization request, and the sixth time is a time at which the terminal device receives the synchronization response.

In a possible implementation, the multimedia information includes audio information; and the receiving unit is configured to:

receive audio information sent by the terminal device, where the audio information is audio information corresponding to one of at least two sound channels and obtained by the terminal device by performing sound channel processing on an audio stream to be played.

According to an eighth aspect, an embodiment of this application provides a multimedia information processing apparatus, including:

a receiving unit, configured to receive multimedia information corresponding to a first playing device and sent by a terminal device, where the multimedia information includes audio information, and the multimedia information corresponding to the first playing device is obtained by the terminal device by performing, based on position information of a user relative to at least two playing devices and relative position information of the at least two playing devices, a sound field correction on original multimedia information corresponding to the first playing device of the at least two playing devices; and a processing unit, configured to play the multimedia information corresponding to the first playing device.

In a possible implementation, the relative position information of the at least two playing devices includes a distance between the first playing device and a second playing device of the at least two playing devices;

the processing unit is further configured to obtain first angle information of the first playing device relative to a microphone array of the second playing device and second angle information of the second playing device relative to a microphone array of the first playing device by using a sound source localization technology, where the first angle information is angle information in a coordinate axis of the microphone array of the second playing device, and the second angle information is angle information in a coordinate axis of the microphone array of the first playing device;

the processing unit is further configured to perform a rotation correction on the coordinate axis of the microphone array of the first playing device based on the first angle information and the second angle information, where an axial direction of the coordinate axis of the microphone array of the second playing device is consistent with an axial direction of the coordinate axis of the microphone array of the first playing device after the rotation correction;

the processing unit is further configured to determine, based on the coordinate axis of the microphone array of the first playing device after the rotation correction and based on the distance between the first playing device and the second playing device, a position of the user relative to the first playing device; and the sending unit is further configured to send, to the terminal device, the position of the user relative to the first playing device.

In a possible implementation, the processing unit is configured to:

obtain third angle information of the user relative to the microphone array of the first playing device by using the sound source localization technology, where the third angle information is angle information in the coordinate axis of the microphone array of the first playing device after the rotation correction;

obtain fourth angle information of the user relative to the microphone array of the second playing device by using the sound source localization technology, where the fourth angle information is angle information in the coordinate axis of the microphone array of the second playing device; and determine the position of the user relative to the first playing device based on the distance between the first playing device and the second playing device, the third angle information, and the fourth angle information.

In a possible implementation, the processing unit is configured to:

determine first duration and second duration, where the first duration is a difference between a time at which the microphone of the first playing device captures a second sound played by the second playing device and a time at which the microphone of the first playing device captures a first sound played by the first playing device, and the second duration is a difference between a time at which the microphone of the second playing device captures the second sound played by the second playing device and a time at which the microphone of the second playing device captures the first sound played by the first playing device; and determine the distance between the first playing device and the second playing device based on the first duration and the second duration.

In a possible implementation, the processing unit is configured to:

determine the distance between the first playing device and the second playing device based on a formula $D=(Tdelay1-Tdelay2)*C/2$, where D is the distance between the first playing device and the third playing device, Tdelay1 is the first duration, Tdelay2 is the second duration, and C is a sound velocity.

In a possible implementation, the receiving unit is configured to receive ambient noise information and/or an estimated value of a secondary path impulse response from the first playing device to the terminal device that are/is sent by the terminal device, where the ambient noise information and/or the estimated value of the secondary path impulse response from the first playing device to the terminal device are/is determined based on the audio information corresponding to the first playing device and mixed audio information that is captured by the terminal device when the first playing device plays the audio information corresponding to the first playing device, and the mixed audio information includes the audio information corresponding to the first playing device and the ambient noise information; and the processing unit is further configured to determine reverse noise based on the ambient noise information and/or the estimated value of the secondary path impulse response, where the reverse noise is used to cancel the ambient noise information.

The apparatus provided in each of the fifth aspect to the eighth aspect of this application may be a terminal device or a playing device, or may be a chip in the terminal device or a chip in the playing device. The terminal device, the playing device, or the chip has a function of implementing the multimedia information processing method in the foregoing aspects or any one of the possible implementations thereof. The function may be implemented by hardware, or may be implemented by hardware by executing corresponding software. The hardware or the software includes one or more units corresponding to the foregoing functions.

The terminal device or the playing device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the terminal device or the playing device includes a storage unit, the storage unit is configured to store computer-executable instructions, the processing unit is connected to the storage unit, and the processing unit executes the computer-executable instructions stored in the storage unit, so that the terminal device or the playing device performs the multimedia information processing method in the foregoing aspects or any one of the possible implementations thereof.

The chip includes a processing unit and a transceiver unit. The processing unit may be a processor, and the transceiver unit may be an input/output interface, a pin, a circuit, or the like on the chip. The processing unit may execute the computer-executable instructions stored in the storage unit, so that the chip performs the multimedia information processing method in the foregoing aspects or any possible implementations thereof. Optionally, the storage unit may be a storage unit (for example, a register or a buffer) in the chip, or the storage unit may be a storage unit (for example, a read-only memory (ROM)) that is located outside the chip in the terminal device or the playing device, another type of static storage device (for example, a random access memory (RAM)) that can store static information and instructions, or the like.

The processor mentioned above may be a central processing unit (CPU), a microprocessor, or an application-specific integrated circuit (ASIC), or may be one or more integrated circuits that are configured to control program execution of the multimedia information processing method in the foregoing aspects or any one of the possible implementations of the foregoing aspects.

According to a ninth aspect, an embodiment of this application provides a computer-readable storage medium, configured to store computer instructions. When the computer instructions are run on a computer, the computer is enabled to perform the multimedia information processing method provided in any one of the first aspect to the fourth aspect of the embodiments of this application.

According to a tenth aspect, an embodiment of this application provides a computer program product including instructions. When the instructions are run on a computer, the computer is enabled to perform the multimedia information processing method provided in any one of the first aspect to the fourth aspect of the embodiments of this application.

According to an eleventh aspect, an embodiment of this application provides a multimedia information processing apparatus, including a memory and a processor. The memory is configured to store program instructions; and the processor is configured to invoke the program instructions stored in the memory, to implement the method in any one of the first aspect to the fourth aspect.

According to the multimedia information processing method and apparatus, and storage medium provided in this application, the data transmission delay between the terminal device and the first playing device of the at least two playing devices is determined; the clock offset between the terminal device and the first playing device is determined based on the data transmission delay between the terminal device and the first playing device; and then the first start playing time of the multimedia information corresponding to the first playing device is determined based on the clock offset between the terminal device and the first playing device, where the first start playing time is used to indicate the start time at which the first playing device plays the multimedia information corresponding to the first playing device. Because the clock offset between the terminal device and each of the at least two playing devices may be determined based on the data transmission delay between the terminal device and the playing device, the start playing time of the multimedia information corresponding to the playing device is determined. Therefore, each of the at least two playing devices can synchronously play the multimedia information corresponding to the playing device, to improve listening experience of the user.

According to the multimedia information processing method and apparatus, and storage medium provided in this application, the relative position information of the at least two playing devices is obtained; the position information of the user relative to the at least two playing devices is obtained based on the relative position information of the at least two playing devices; then the sound field correction is performed, based on the position information of the user relative to the at least two playing devices and the relative position information of the at least two playing devices, on the original multimedia information corresponding to the first playing device of the at least two playing devices, to obtain the multimedia information corresponding to the first playing device, where the multimedia information includes audio information; and then the multimedia information corresponding to the first playing device is sent to the first playing device. Because the sound field correction can be performed, based on the position information of the user relative to the at least two playing devices and the relative position information of the at least two playing devices, on the original multimedia information corresponding to each of the at least two playing devices, and the corrected multimedia information is sent to each playing device, after the playing device plays the multimedia information, the user is in a sweet spot, and listening experience of the user can be improved.

DESCRIPTION OF EMBODIMENTS

The following explains some terms in this application to facilitate understanding by a person skilled in the art.

(1) A unit in this application can include a functional unit or a logic unit. The unit may be in a form of software, and a processor executes program code to implement a function of the unit; or the unit may be in a form of hardware.

(2) "A plurality of" means two or more. Other quantifiers have similar interpretations. The term "and/or" describes an association relationship for describing associated objects and indicates that at least three relationships may exist. For example, A and/or B may represent the following three cases: Only A exists, both A and B exist, and only B exists. The character "/" usually indicates an "or" relationship between the associated objects. A range described by using "above", "below", or the like includes a boundary point.

Figure 1:
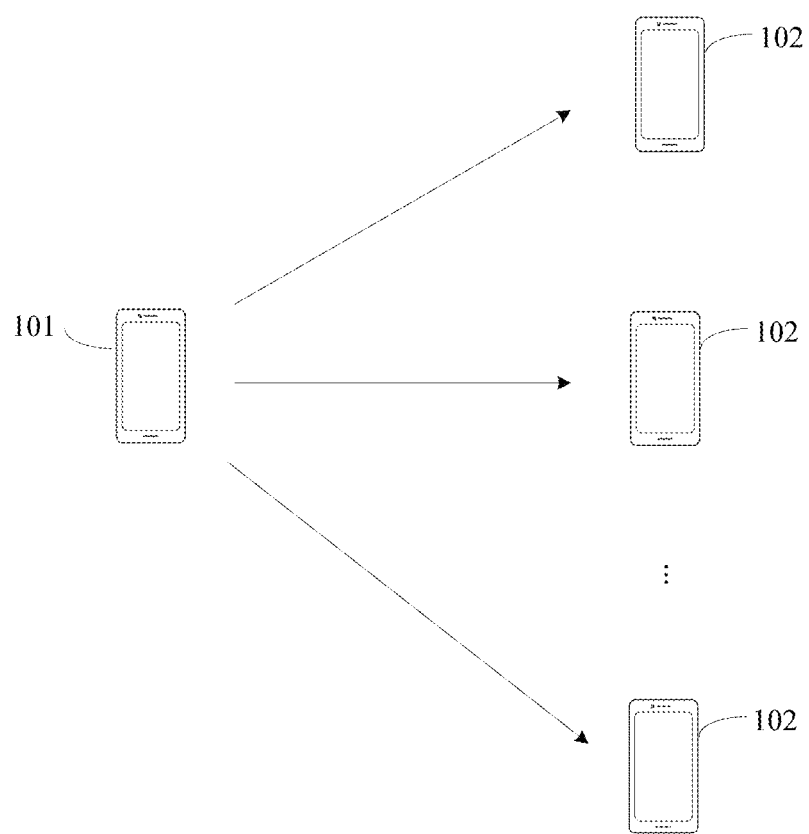
FIG. 1 is an example schematic diagram of a possible application scenario according to an embodiment of this application.

A multimedia information processing method provided in an embodiment of this application is applied to a scenario in which multimedia information is synchronized between a terminal device and each of a plurality of playing devices, and between the plurality of playing devices. The multimedia information may include audio information and/or video information. FIG. 1 is a schematic diagram of a possible application scenario according to an embodiment of this application. As shown in FIG. 1, the system includes a terminal device 101 and at least two playing devices 102. When the terminal device 101 pushes multimedia information to each playing device 102, to synchronize the multimedia information played between the terminal device 101 and each playing device 102, the terminal device 101 further needs to determine a clock offset between the terminal device and each playing device based on a data transmission delay between the terminal device 101 and each playing device 102, to determine, based on the determined clock offset, a start playing time at which each playing device 102 starts to play the multimedia information. In this way, the terminal device 101 can send the determined start playing time to the corresponding playing device 102, and the playing device 102 can start to play the multimedia information based on the received start playing time, thereby synchronizing the multimedia information played between the terminal device 101 and each playing device 102.

It may be understood that a start playing time corresponding to one playing device 102 may be the same as or different from a start playing time corresponding to another playing device 102.

Figure 2A:
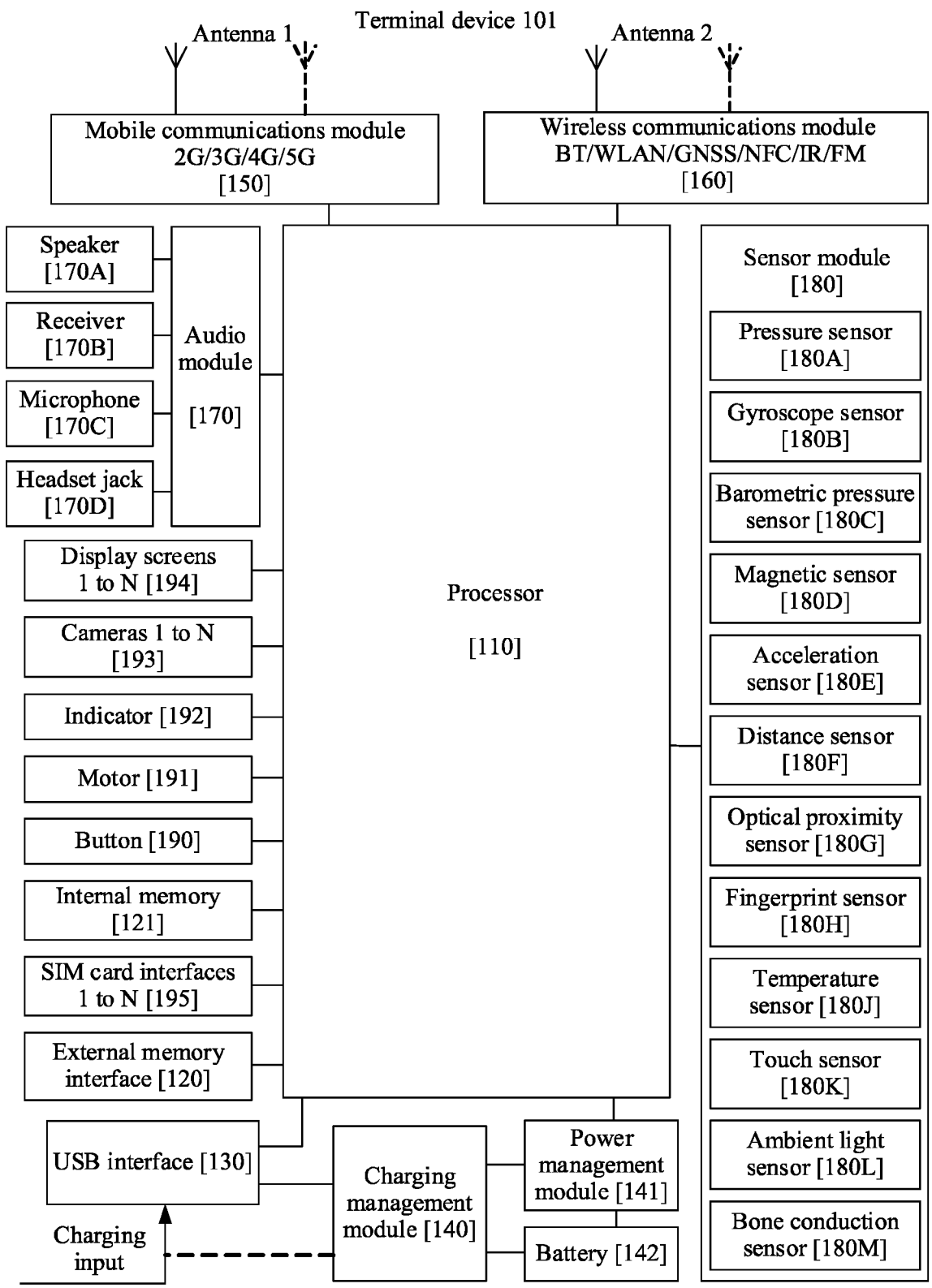
FIG. 2a is an example schematic diagram of a structure of a terminal device 101 (for example, a mobile phone) in FIG. 1.

In a specific implementation, in an embodiment, the terminal device 101 may be an electronic device such as a portable computer, a personal digital assistant (PDA), a mobile phone, a tablet computer, a wireless terminal device, a communications device, a Bluetooth speaker, or a Wi-Fi speaker. For example, FIG. 2a is a schematic diagram of a structure of the terminal device 101 (for example, a mobile phone) in FIG. 1. As shown in FIG. 2a, the terminal device 101 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headsetjack 170D, a sensor 180, a button 190, a motor 191, an indicator 192, a camera 193, a display 194, a subscriber identification module (SIM) card interface 195, and the like. It may be understood that the structure shown in this embodiment does not constitute a specific limitation on the terminal device 101. In some other embodiments of this application, the terminal device 101 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be separate devices, or may be integrated into one or more processors. In some embodiments, the terminal device 101 may alternatively include one or more processors 110. The controller may be a nerve center and a command center of the terminal device 101. The controller may generate an operation control signal based on an instruction operation code and a time sequence signal, to control instruction fetching and execution. A memory may be further disposed in the processor 110 to store instructions and data. In some embodiments, the memory in the processor 110 is a cache. The memory may store an instruction or datajust used or cyclically used by the processor 110. If the processor 110 needs to use the instruction or the data again, the processor 110 may directly invoke the instruction or the data from the memory, to avoid repeated access and reduces waiting time of the processor 110, and improve system efficiency of the terminal device 101.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. The USB interface 130 is an interface that conforms to a USB standard specification, and may be specifically a mini USB interface, a micro USB interface, a USB Type C interface, or the like. The USB interface 130 may be configured to connect to a charger to charge the terminal device 101, or may be configured to transmit data between the terminal device 101 and a peripheral device. The USB interface 130 may alternatively be configured to connect to a headset, to play audio by using the headset.

It may be understood that an interface connection relationship between the modules that is shown in this embodiment of the present technology is merely an example for description, and does not constitute a limitation on the structure of the terminal device 101. In some other embodiments of this application, the terminal device 101 may alternatively use an interface connection mode different from that in the foregoing embodiment, or use a combination of a plurality of interface connection modes.

The charging management module 140 is configured to receive charging input from a charger. The charger may be a wireless charger, or may be a wired charger. In some embodiments of wired charging, the charging management module 140 may receive charging input from a wired charger by using the USB interface 130. In some embodiments of wireless charging, the charging management module 140 may receive wireless charging input through a wireless charging coil of the terminal device 101. The charging management module 140 supplies power to the terminal device 101 by using the power management module 141 while charging the battery 142.

The power management module 141 is configured to connect to the battery 142, the charging management module 140, and the processor 110. The power management module 141 receives input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a quantity of battery cycles, and a battery health status (electric leakage and impedance). In some other embodiments, the power management module 141 may be alternatively disposed in the processor 110. In some other embodiments, the power management module 141 and the charging management module 140 may be alternatively disposed in a same device.

A wireless communication function of the terminal device 101 may be implemented by using the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the terminal device 101 may be configured to cover one or more communication frequency bands. Different antennas may be multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a solution used for wireless communication that includes 2G, 3G, 4G, 5G, and the like and that is applied to the terminal device 101. The mobile communication module 150 may include at least one filter, a switch, a power amplifier, a low noise amplifier, and the like. The mobile communications module 150 may receive an electromagnetic wave by using the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert an amplified signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into an intermediate- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor, and a processed signal is transmitted to the application processor. The application processor outputs a sound signal by using an audio device (not limited to the speaker 170A, the receiver 170B, and the like), or displays an image or a video by using the display 194. In some embodiments, the modem processor may be an independent device. In some other embodiments, the modem processor may be independent of the processor 110, and is disposed in a same device with the mobile communications module 150 or another functional module.

The wireless communications module 160 may provide wireless communication solutions, applied to the terminal device 101, that include a wireless local area network (WLAN), Bluetooth, a global navigation satellite system (GNSS), frequency modulation (FM), NFC, an infrared (IR) technology, and the like. The wireless communications module 160 may be one or more devices that integrate at least one communications processing unit. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave and radiate the electromagnetic wave by using the antenna 2.

In some embodiments, the antenna 1 of the terminal device 101 is coupled to the mobile communication module 150, and the antenna 2 is coupled to the wireless communication module 160, so that the terminal device 101 can communicate with a network and another device by using a wireless communication technology. The wireless communications technology may include GSM, GPRS, CDMA, WCDMA, TD-SCDMA, LTE, GNSS, WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The terminal device 101 may implement a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs, which execute an instruction to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the terminal device 101 may include one or N displays 194, where N is a positive integer greater than 1.

The terminal device 101 may implement a photographing function by using the ISP, one or more cameras 193, the video codec, the GPU, one or more displays 194, the application processor, and the like.

The NPU is a neural-network (NN) computing processor. The NPU quickly processes input information with reference to a structure of a biological neural network, for example, with reference to a transfer mode between human brain neurons, and may further continuously perform self-learning. Applications such as intelligent cognition of the terminal device 101, for example, image recognition, facial recognition, voice recognition, and text understanding, may be implemented through the NPU.

The external memory interface 120 may be configured to connect to an external storage card, for example, a micro SD card, to expand a storage capability of the terminal device 101. The external storage card communicates with the processor 110 by using the external memory interface 120, to implement a data storage function. For example, data files such as music, a photo, and a video is stored in the external storage card.

The internal memory 121 may be configured to store one or more computer programs, where the one or more computer programs include instructions. The processor 110 may run the instructions stored in the internal memory 121, so that the terminal device 101 performs the multimedia information processing method, various function applications, data processing, and the like provided in some embodiments of this application. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the terminal device 101, and the like. In addition, the internal memory 121 may include a high-speed random access memory, or may include a nonvolatile memory, for example, at least one magnetic disk storage device, a flash storage device, or a universal flash storage (UFS). In some embodiments, the processor 110 may run the instructions stored in the internal memory 121 and/or the instructions stored in the memory disposed in the processor 110, so that the terminal device 101 performs the multimedia information processing method, various function applications, and data processing provided in the embodiments of this application.

The audio module 170, the speaker 170A, the receiver 170B, the microphone 170C, and the headset jack 170D may provide an audio interface between a user and the terminal device 101. The terminal device 101 may implement an audio function such as music playing and recording by using the audio module 170, the speaker 170A, the receiver 170B, the microphone 170C, the headset jack 170D, the application processor, and the like. The audio module 170 is configured to convert a digital audio signal into an analog audio signal, and also configured to convert an analog audio signal into a digital audio signal, and transmit the converted audio signal to the speaker 170A. The speaker 170A converts the audio signal into a sound signal for outputting. The audio module 170 may be further configured to encode and decode an audio signal. In some embodiments, the audio module 170 may be disposed in the processor 110, or some functional modules of the audio module 170 are disposed in the processor 110. The speaker 170A, also referred to as a "loudspeaker", is configured to convert an audio electrical signal into a sound signal, and output the sound signal. The terminal device 101 may be used to listen to music or answer a call in a hands-free mode over the speaker 170A. The receiver 170B, also referred to as an "earpiece", is configured to convert an audio electrical signal into a sound signal. When a call is answered or a voice message is received through the terminal device 101, the receiver 170B may be put close to a human ear to listen to a voice. The microphone 170C, also referred to as "mike" or "mic", is configured to convert a sound signal into an electrical signal. The audio module 170 receives the electrical signal, then converts the electrical signal into audio data, and outputs the audio data to an antenna to send the audio data, for example, to another mobile phone, or outputs the audio data to the internal memory 121 for further processing. When making a call or sending voice information, a user may move a mouth close to the microphone 170C and make a sound, to input a sound signal into the microphone 170C. At least one microphone 170C may be disposed in the terminal device 101. In some other embodiments, two microphones 170C may be disposed in the terminal device 101, to collect a sound signal and implement a noise reduction function. In some other embodiments, three, four, or more microphones 170C may alternatively be disposed in the terminal device 101, to collect a sound signal and implement noise reduction, and recognize a sound source, to implement a directional recording function, and the like. The headset interface 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

In addition, in this embodiment of this application, at least three microphones 170C need to be disposed in the terminal device 101 to form a microphone array, so as to implement sound source localization, and determine position information of the user relative to the at least two playing devices.

The sensor 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates that have conductive materials. When a force acts on the pressure sensor 180A, capacitance between electrodes changes. The terminal device 101 determines pressure intensity based on a capacitance change. When a touch operation is performed on the display 194, the terminal device 101 detects intensity of the touch operation by using the pressure sensor 180A. The terminal device 101 may further calculate a touch location based on a detection signal of the pressure sensor 180A. In some embodiments, touch operations acting on a same touch position but having different touch operation strength may correspond to different operation instructions. For example, when a touch operation whose touch operation intensity is less than a first pressure threshold is performed on a messaging application icon, an instruction for viewing an SMS message is executed. When a touch operation whose touch operation intensity is greater than or equal to a first pressure threshold is performed on the application icon "Messages", an instruction for creating an SMS message is executed.

The gyroscope sensor 180B may be configured to determine a motion posture of the terminal device 101. In some embodiments, an angular velocity of the terminal device 101 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the terminal device 101 shakes, obtains, through calculation based on the angle, a distance for which a lens module needs to compensate, and allows the lens to cancel shaking of the terminal device 101 through reverse motion, to implement image stabilization. The gyroscope sensor 180B may be further used in a navigation scenario, a motion-sensing game scenario, and the like.

The acceleration sensor 180E may detect magnitude of accelerations in various directions (usually on three axes) of the terminal device 101, and may detect a value and a direction of gravity when the terminal device 101 is still. The acceleration sensor 180E may be further configured to recognize a posture of the terminal device, and is used in switching between a landscape mode and a portrait mode, a pedometer, or another application.

The distance sensor 180F is configured to measure a distance. The terminal device 101 may measure a distance by using an infrared ray or a laser. In some embodiments, in a photographing scenario, the terminal device 101 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The terminal device 101 emits infrared light by using the light-emitting diode. The terminal device 101 detects infrared reflected light from a nearby object by using the photodiode. When detecting sufficient reflected light, it may be determined that there is an object near the terminal device 101. When detecting insufficient reflected light, terminal device 101 may determine that there is no object near the terminal device 101. The terminal device 101 may detect, by using the optical proximity sensor 180G, that the user holds the terminal device 101 close to an ear for a call, so that the terminal device 101 automatically turns off the screen to save power. The optical proximity sensor 180G may also be used in a leather case mode or a pocket mode to automatically unlock or lock the screen.

The ambient light sensor 180L is configured to sense ambient light brightness. The terminal device 101 may adaptively adjust brightness of the display 194 based on the sensed ambient light brightness. The ambient light sensor 180L may also be configured to automatically adjust white balance during photographing. The ambient optical sensor 180L may further work with the proximity sensor 180G to detect whether the terminal device 101 is in a pocket, to avoid an accidental touch.

The fingerprint sensor 180H (also referred to as a fingerprint recognizer) is configured to collect a fingerprint. The terminal device 101 may use a feature of the collected fingerprint to implement fingerprint-based unlocking, application lock access, fingerprint-based photographing, fingerprint-based call answering, and the like. In addition, for other descriptions of fingerprint sensors, refer to International Patent Application PCT/CN2017/082773 and entitled "NOTIFICATION PROCESSING METHOD AND ELECTRONIC DEVICE", which is incorporated herein by reference in its entirety.

The touch sensor 180K may also be referred to as a touch panel or a touch-sensitive surface. The touch sensor 180K may be disposed in the display 194, and a touchscreen includes the touch sensor 180K and the display 194, which is also referred to as a touchscreen. The touch sensor 180K is configured to detect a touch operation acting on or near the touch sensor. The touch sensor may transmit the detected touch operation to the application processor, to determine a type of a touch event. Visual output related to the touch operation may be provided by using the display 194. In some other embodiments, the touch sensor 180K may alternatively be disposed on a surface of the terminal device 101 in a position different from that of the display 194.

The bone conduction sensor 180M may obtain a vibration signal. In some embodiments, the bone conduction sensor 180M may obtain a vibration signal from a vibration bone of a human voice part. The bone conduction sensor 180M may also be in contact with a human pulse, and receive a blood pressure and pulse signal. In some embodiments, the bone conduction sensor 180M may be alternatively disposed in a headset to form a bone conduction headset. The audio module 170 may obtain a speech signal through parsing based on the vibration signal that is of the vibration bone at the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, or the like. The button 190 may be a mechanical button, or may be a touch button. The terminal device 101 may receive key input, and generate a key signal input related to a user setting and function control of the terminal device 101.

The SIM card interface 195 is configured to connect to a SIM card. The SIM card may be inserted into the SIM card interface 195 or removed from the SIM card interface 195, to implement contact with or separation from the terminal device 101. The terminal device 101 can support one or N SIM card interfaces, where N is a positive integer greater than 1. The SIM card interface 195 may support a nano SIM card, a micro SIM card, a SIM card, and the like. A plurality of cards may be inserted in one SIM card interface 195. The plurality of cards may have a same type or different types. The SIM card interface 195 may also be compatible with different types of SIM cards. The SIM card interface 195 may also be compatible with an external storage card. The terminal device 101 interacts with a network through the SIM card, to implement functions such as calling and data communication. In some embodiments, the terminal device 101 uses an eSIM, namely, an embedded SIM card. The eSIM card may be embedded in the terminal device 101, and cannot be separated from the terminal device 101.

Figure 2B:
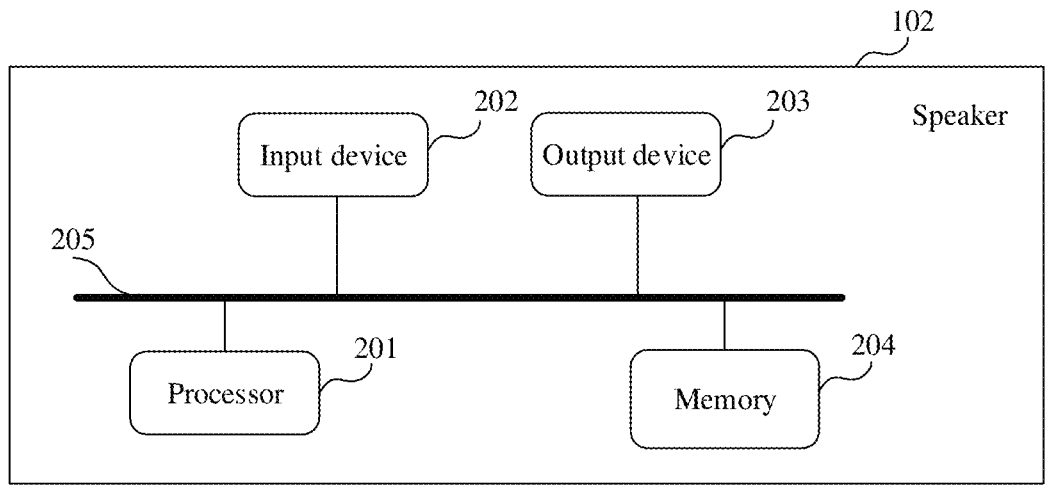
FIG. 2b is an example schematic diagram of a structure of a playing device 102 (for example, a speaker) in FIG. 1.

In an embodiment, the playing device 102 may alternatively be an electronic device such as a portable computer, a PDA, a mobile phone, a tablet computer, a wireless terminal device, a communications device, a Bluetooth speaker, or a Wi-Fi speaker. For example, FIG. 2b is a schematic diagram of a structure of the playing device 102 (for example, a speaker) in FIG. 1. As shown in FIG. 2b, the speaker may also be referred to as a playing device, a multimedia unit, a speaker, or the like, and is configured to output an audio or a video, or output an audio and a video. The speaker 102 may include one or more processors 201 (only one is shown in the figure), one or more input devices 202 (only one is shown in the figure), one or more output devices 203 (only one is shown in the figure), and a memory 204. The processor 201, the input device 202, the output device 203, and the memory 204 are connected by using a bus 205. The memory 204 is configured to store an instruction, the processor 201 is configured to execute the instruction stored in the memory 204, and the memory 204 is configured to store a software program and a module. By running the software program and the module stored in the memory 204, the processor 201 executes various function applications and processes data.

It should be further understood that, in this embodiment of the present technology, the processor 201 may be a central processing unit (CPU). The processor may alternatively be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like. The input device 202 may include a touchpad and a fingerprint sensor (configured to capture user fingerprint information and fingerprint direction information of the user), a microphone, a data receiving interface, and the like. The output device 203 may include a display (such as an LCD), a speaker, a data sending interface, and the like. The speaker 102 may play a sound, for example, music, by using the speaker. The display may be configured to display information about music that is played, and the like. The memory 204 may include a read-only memory and a random access memory, and provide instructions and data to the processor 201. A part of the memory 204 may further include a non-volatile random access memory. For example, the memory 204 may further store information about a device type.

Based on the system architecture shown in FIG. 1, the following describes in detail the technical solutions of the multimedia information processing methods provided in the embodiments of this application. For example, all the technical solutions in the following embodiments may be implemented in the terminal device or the playing device having the foregoing hardware architecture.

Figure 3:
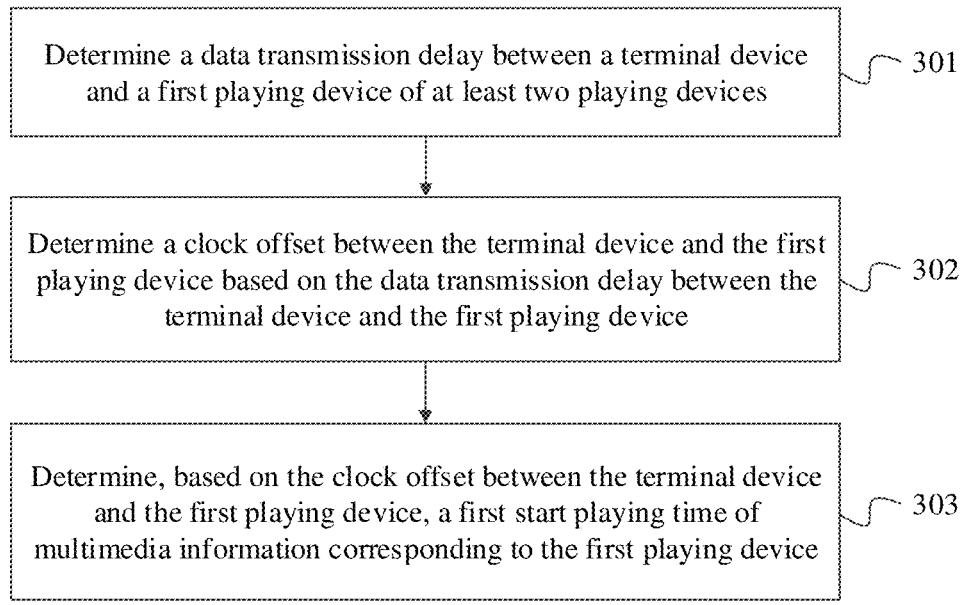
FIG. 3 is an example schematic flowchart of a multimedia information processing method according to an embodiment of this application.

FIG. 3 is a schematic flowchart of a multimedia information processing method according to an embodiment of this application. The multimedia information processing method provided in this embodiment of this application may be performed by any apparatus that performs the multimedia information processing method, and the apparatus may be implemented by using software and/or hardware. In this embodiment, the apparatus may be integrated into a terminal device 101 or a playing device 102. As shown in FIG. 3, the method includes the following steps.

Step 301: Determine a data transmission delay between a terminal device and a first playing device of at least two playing devices.

Step 302: Determine a clock offset between the terminal device and the first playing device based on the data transmission delay between the terminal device and the first playing device.

It may be understood that, the terminal device may determine the data transmission delay between the terminal device and the first playing device, or any one of the at least two playing devices may determine the data transmission delay between the terminal device and the first playing device. The first playing device may be any one of the at least two playing devices.

In this step, the data transmission delay between the terminal device and the first playing device may be understood as a time period from starting to send data by the terminal device to receiving the data from the terminal device by the first playing device, or may be understood as a time period from starting to send data by the first playing device to receiving the data from the first playing device by the terminal device.

Each of the terminal device and the first playing device has a system time, and the clock offset between the terminal device and the first playing device may be understood as an offset between the system time of the terminal device and the system time of the first playing device.

In a possible implementation, the determining a data transmission delay between a terminal device and a first playing device of at least two playing devices may be determining the data transmission delay between the terminal device and the first playing device and a clock offset corresponding to the data transmission delay between the terminal device and the first playing device.

Specifically, the data transmission delay between the terminal device and the first playing device and the clock offset corresponding to the data transmission delay between the terminal device and the first playing device are determined based on times at which synchronization messages are sent and received by the terminal device and the first playing device.

In the following description, it is assumed that the terminal device determines the data transmission delay and the corresponding clock offset based on the times at which synchronization messages are sent and received by the terminal device and the first playing device. A manner of determining the data transmission delay and the corresponding clock offset by the first playing device based on the times at which synchronization messages are sent and received by the terminal device and the first playing device is similar to the manner of determining by the terminal device, and is not described herein again.

Figure 4:
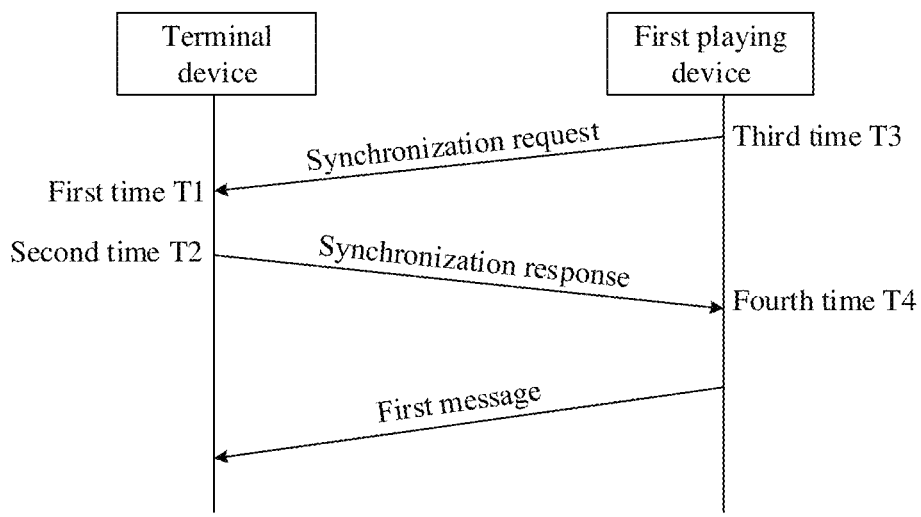
FIG. 4 is an example schematic diagram of time alignment (e.g., time synchronization) between a terminal device and a first playing device.

For example, FIG. 4 is a schematic diagram of time alignment between the terminal device and the first playing device. As shown in FIG. 4, the synchronization messages include a synchronization request and a synchronization response. After connecting to the terminal device, the first playing device first sends the synchronization request to the terminal device, and records a third time T3 at which the synchronization request is sent, where the synchronization request may be, for example, SLAVE_SEND_SYNCHRONIZATION_REQUEST. After receiving the synchronization request, the terminal device determines and records a first time T1 at which the synchronization request is received, then sends the synchronization response to the first playing device, and records a second time T2 at which the synchronization response is sent, where the synchronization response may be, for example, MASTER_SEND_SYNCHRONIZATION_RESPONSE. After receiving the synchronization response, the first playing device records a fourth time T4 at which the synchronization response is received, and sends a first message to the terminal device, where the first message includes the third time T3 at which the first playing device sends the synchronization request and the fourth time T4 at which the first playing device receives the synchronization response. After receiving the first message, the terminal device may determine, based on the first time T1, the second time T2, the third time T3, and the fourth time T4, the data transmission delay between the terminal device and the first playing device and the clock offset corresponding to the data transmission delay between the terminal device and the first playing device.

In a specific implementation process, assuming that the clock offset between the terminal device and the first playing device is Toffset, and that the datatransmission delay between the terminal device and the first playing device is Tdelay, the following formula (1) and formula (2) exist:

$$T3+Toffset+Tdelay=T1 \quad (1)$$

$$T2-Toffset+Tdelay=T4 \quad (2)$$

Based on the formula (1) and the formula (2), the formula (3) and the formula (4) may be obtained:

$$Toffset=(T1-T4+T2-T3)/2 \quad (3)$$

$$Tdelay=(T1+T4-T2-T3)/2 \quad (4)$$

Therefore, the terminal device may determine, based on the formula (3) and the formula (4), the data transmission delay Tdelay between the terminal device and the first playing device and the clock offset Toffset corresponding to the data transmission delay Tdelay between the terminal device and the first playing device.

It should be noted that, there is a correspondence between the data transmission delay between the terminal device and the first playing device and the clock offset between the terminal device and the first playing device, that is, one data transmission delay corresponds to one clock offset, as known based on the formula (3) and the formula (4).

Figure 5:
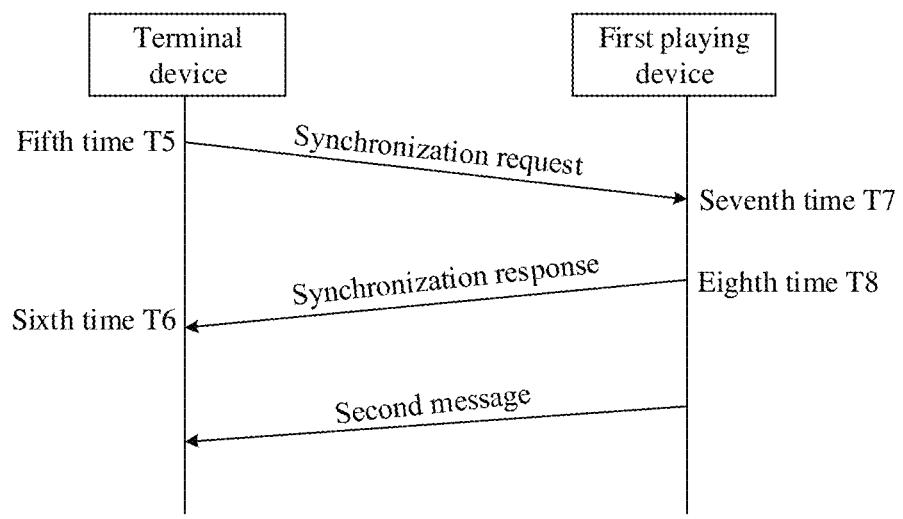
FIG. 5 is another example schematic diagram of time alignment between a terminal device and a first playing device.

For example, FIG. 5 is another schematic diagram of time alignment between the terminal device and the first playing device. As shown in FIG. 5, the synchronization messages include a synchronization request and a synchronization response. After the first playing device connects to the terminal device, the terminal device first sends the synchronization request to the first playing device, and records a fifth time T5 at which the synchronization request is sent, where the synchronization request may be, for example, SLAVE_SEND_SYNCHRONIZATION_REQUEST. After receiving the synchronization request, the first playing device determines and records a seventh time T7 at which the synchronization request is received, then sends the synchronization response to the terminal device, and records an eighth time T8 at which the synchronization response is sent, where the synchronization response may be, for example, MASTER_SEND_SYNCHRONIZATION_RESPONSE. After receiving the synchronization response, the terminal device records a sixth time T6 at which the synchronization response is received. In addition, the first playing device sends a second message to the terminal device, where the second message includes the seventh time T7 at which the first playing device receives the synchronization request and the eighth time T8 at which the first playing device sends the synchronization response. After receiving the second message, the terminal device may determine, based on the fifth time T5, the sixth time T6, the seventh time T7, and the eighth time T8, the data transmission delay between the terminal device and the first playing device and the clock offset corresponding to the data transmission delay between the terminal device and the first playing device.

In a specific implementation process, assuming that the clock offset between the terminal device and the first playing device is Toffset, and that the datatransmission delay between the terminal device and the first playing device is Tdelay, the following formula (5) and formula (6) exist:

$$T5+Toffset+Tdelay=T7 \quad (5)$$

$$T8-Toffset+Tdelay=T6 \quad (6)$$

Based on the formula (5) and the formula (6), the formula (7) and the formula (8) may be obtained:

$$Toffset=(T7-T6+T8-T5)/2 \quad (7)$$

$$Tdelay=(T7+T6-T8-T5)/2 \quad (8)$$

Therefore, the terminal device may determine, based on the formula (7) and the formula (8), the data transmission delay Tdelay between the terminal device and the first playing device and the clock offset Toffset corresponding to the data transmission delay Tdelay between the terminal device and the first playing device.

It should be noted that, in this embodiment of this application, synchronously playing multimedia information between the terminal device and the first playing device is based on an assumption that a sending delay and a receiving delay between the terminal device and the first playing device are equal. In an actual application, the sending delay and the receiving delay are generally not equal. In this case, when the data transmission delay between the terminal device and the first playing device is less than or equal to a preset threshold, the determined clock offset between the terminal device and the first playing device has a small error. Alternatively, when the data transmission delay between the terminal device and the first playing device is greater than or equal to a preset threshold, the determined clock offset between the terminal device and the first playing device has a large error. In this case, synchronization between the terminal device and the first playing device may fail.

The clock offset between the terminal device and the first playing device may be determined by using historical times that are recorded and at which synchronization messages are sent and received by the terminal device and the first playing device. This can reduce the error of the clock offset between the terminal device and the first playing device.

In summary, in a possible implementation, after the data transmission delay and the corresponding clock offset are determined, a numerical relationship between the data transmission delay between the terminal device and the first playing device and the preset threshold may be determined; and if the data transmission delay between the terminal device and the first playing device is less than or equal to the preset threshold, it is determined that the clock offset corresponding to the data transmission delay between the terminal device and the first playing device is the clock offset between the terminal device and the first playing device.

The preset threshold may be set based on an actual situation or experience, for example, may be set to 10 ms. A specific value of the preset threshold is not limited in this embodiment of this application.

If the data transmission delay between the terminal device and the first playing device is less than or equal to the preset threshold, it indicates that the clock offset corresponding to the data transmission delay between the terminal device and the first playing device has a small error. In this case, it may be determined that the clock offset corresponding to the data transmission delay between the terminal device and the first playing device is valid, and the clock offset corresponding to the data transmission delay between the terminal device and the first playing device may be determined as the clock offset between the terminal device and the first playing device. The clock offset corresponding to the data transmission delay between the terminal device and the first playing device may be determined based on the formula (3) or the formula (7).

In another possible implementation, if the data transmission delay between the terminal device and the first playing device is greater than the preset threshold, the clock offset between the terminal device and the first playing device is determined based on the historical times that are recorded by the terminal device and at which synchronization messages are sent and received by the terminal device and the first playing device.

Specifically, if the data transmission delay between the terminal device and the first playing device is greater than the preset threshold, it indicates that the clock offset corresponding to the data transmission delay between the terminal device and the first playing device has a large error. In this case, it may be determined that the clock offset corresponding to the data transmission delay between the terminal device and the first playing device is invalid. In this case, the clock offset between the terminal device and the first playing device may be determined based on the historical times that are pre-recorded by the terminal device and at which synchronization messages are sent and received by the terminal device and the first playing device, where the historical times are recorded in a historical time period of preset duration, or a quantity of the historical times is a preset value.

For example, the clock offset between the terminal device and the first playing device may be determined based on times that are recorded by the terminal device and at which synchronization messages are sent and received by the terminal device and the first playing device within past 10 minutes, or the clock offset between the terminal device and the first playing device may be determined based on times that are recorded by the terminal device and at which synchronization messages are sent and received by the terminal device and the first playing device for 100 times in the past.

In an actual application, at least two historical data transmission delays and historical clock offsets corresponding to the at least two historical data transmission delays may be determined based on the historical times, and it is determined that a historical clock offset corresponding to a shortest one of the at least two historical data transmission delays is the clock offset between the terminal device and the first playing device, where the at least two historical data transmission delays are data transmission delays between the terminal device and the first playing device.

At least two historical times at which synchronization messages are sent and received by the terminal device and the first playing device are obtained. To be specific, at least two of the first time T1, the second time T2, the third time T3, and the fourth time T4 in FIG. 4 are obtained; or at least two of the fifth time T5, the sixth time T6, the seventh time T7, and the eighth time T8 in FIG. 5 are obtained. Therefore, based on the first time T1, the second time T2, the third time T3, and the fourth time T4, the at least two historical data transmission delays and the historical clock offsets corresponding to the at least two historical data transmission delays may be calculated by using the formula (3) and the formula (4); or based on the fifth time T5, the sixth time T6, the seventh time T7, and the eighth time T8, the at least two historical data transmission delays and the historical clock offsets corresponding to the at least two historical data transmission delays may be calculated by using the formula (7) and the formula (8). Then the shortest one of the at least two historical data transmission delays is determined, and whether the shortest historical data transmission delay is less than or equal to the preset threshold is determined. If the shortest historical data transmission delay is less than or equal to the preset threshold, the historical clock offset corresponding to the shortest historical data transmission delay is determined as the clock offset between the terminal device and the first playing device.

It should be noted that if the shortest historical data transmission delay is greater than the preset threshold, it indicates that the clock offset corresponding to the shortest historical data transmission delay is invalid. In this case, a valid clock offset previously determined by the terminal device may be obtained as the clock offset between the terminal device and the first playing device, where the valid clock offset previously determined by the terminal device is a clock offset corresponding to a time before the historical times that are recorded by the terminal device and at which synchronization messages are sent and received by the terminal device and the first playing device.

Step 303: Determine, based on the clock offset between the terminal device and the first playing device, a first start playing time of multimedia information corresponding to the first playing device.

The first start playing time is used to indicate a start time at which the first playing device plays the multimedia information corresponding to the first playing device.

In this step, to enable the at least two playing devices to achieve a stereo effect, different playing devices of the at least two playing devices may play different multimedia information, where the multimedia information corresponding to the first playing device is multimedia information played in the first playing device, and the multimedia information may include audio information and/or video information.

After the clock offset between the terminal device and the first playing device is determined, the first start playing time of the multimedia information corresponding to the first playing device may be determined based on a formula (9):

$$\text{stime=system time of the terminal device+clock offset between the terminal device and the first playing device+fixed waiting time} \quad (9)$$

Because a buffer exists in the first playing device, in an actual playing process, when the terminal device sends, to the first playing device, the multimedia information corresponding to the first playing device, the first playing device first stores the received multimedia information into the buffer (buffer). The fixed waiting time in the formula (9) may be understood as a time during which the multimedia information is stored in the buffer before the buffer is full.

In a possible implementation, if the clock offset between the terminal device and the first playing device is determined by the first playing device, the terminal device may send the system time of the terminal device to the first playing device, and the first playing device may determine the first start playing time based on the formula (9), the determined clock offset between the terminal device and the first playing device, and the received system time of the terminal device. In addition, the terminal device may further send, to the first playing device, the multimedia information corresponding to the first playing device. After determining the first start playing time, the first playing device may start to play, at the first start playing time, the multimedia information corresponding to the first playing device. It may be understood that the terminal device may send, to the first playing device by using a same message or by using different messages, the system time of the terminal device and the multimedia information corresponding to the first playing device.

In another possible implementation, if the clock offset between the terminal device and the first playing device is determined by the first playing device, the first playing device may send the determined clock offset between the terminal device and the first playing device to the terminal device, and the terminal device may determine the first start playing time based on the formula (9), the received clock offset between the terminal device and the first playing device, and the system time of the terminal device. In addition, the terminal device sends, to the first playing device, the determined first start playing time and the multimedia information corresponding to the first playing device. The first playing device starts to play, at the first start playing time, the multimedia information corresponding to the first playing device. It may be understood that the terminal device may send, to the first playing device by using a same message or by using different messages, the first start playing time and the multimedia information corresponding to the first playing device. For example, the terminal device may first send, to the first playing device, the multimedia information corresponding to the first playing device, and after determining the first start playing time, send the determined first start playing time to the first playing device. Certainly, the terminal device may alternatively first send the first start playing time to the first playing device, and then send, to the first playing device, the multimedia information corresponding to the first playing device.

In still another possible implementation, if the clock offset between the terminal device and the first playing device is determined by the terminal device, the terminal device may determine the first start playing time based on the formula (9), the determined clock offset between the terminal device and the first playing device, and the system time of the terminal device. In addition, the terminal device sends, to the first playing device, the determined first start playing time and the multimedia information corresponding to the first playing device. The first playing device starts to play, at the first start playing time, the multimedia information corresponding to the first playing device. It may be understood that the terminal device may send, to the first playing device by using a same message or by using different messages, the first start playing time and the multimedia information corresponding to the first playing device. For example, the terminal device may first send, to the first playing device, the multimedia information corresponding to the first playing device, and after determining the first start playing time, send the determined first playing time to the first playing device. Certainly, the terminal device may alternatively first send the first start playing time to the first playing device, and then send, to the first playing device, the multimedia information corresponding to the first playing device.

In yet another possible implementation, if the clock offset between the terminal device and the first playing device is determined by the terminal device, the terminal device may send the determined clock offset between the terminal device and the first playing device and the system time of the terminal device to the first playing device, and the first playing device may determine the first start playing time based on the formula (9), the received clock offset between the terminal device and the first playing device, and the system time of the terminal device. In addition, the terminal device may further send, to the first playing device, the multimedia information corresponding to the first playing device. After determining the first start playing time, the first playing device may start to play, at the first start playing time, the multimedia information corresponding to the first playing device. It may be understood that the terminal device may send, to the first playing device by using a same message or by using different messages, the clock offset between the terminal device and the first playing device, the system time of the terminal device, and the multimedia information corresponding to the first playing device. For example, the terminal device may first send, to the first playing device, the multimedia information corresponding to the first playing device, and then after determining the clock offset between the terminal device and the first playing device, send the determined clock offset between the terminal device and the first playing device and the system time of the terminal device to the first playing device, or certainly may first send the determined clock offset between the terminal device and the first playing device and the system time of the terminal device to the first playing device, and then send, to the first playing device, the multimedia information corresponding to the first playing device.

Further, when the multimedia information includes audio information, to enable the at least two playing devices to achieve a stereo effect during playing of the audio information, the terminal device may perform sound channel processing on an audio stream to be played, to obtain audio information corresponding to at least two sound channels, and then send, to the first playing device of the at least two playing devices, audio information corresponding to one of the at least two sound channels.

Specifically, that the terminal device performs sound channel processing on an audio stream to be played, and sends, to the first playing device of the at least two playing devices, obtained audio information corresponding to one of the at least two sound channels may include the following several modes.

Figure 6A:
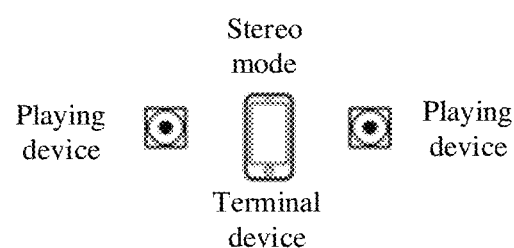
FIG. 6a is an example schematic diagram of a playing mode.

FIG. 6a is a schematic diagram of a playing mode. As shown in FIG. 6a, a first mode is a wireless stereo mode, which means that a terminal device separately establishes connections to two playing devices by using a wireless network (e.g., Wi-Fi/Bluetooth). The terminal device performs sound channel processing on an audio stream to be played that is stored by the terminal device or an audio stream to be played that is obtained from the Internet, to obtain audio information corresponding to left and right sound channels, and streams, to the two playing devices respectively, the audio information corresponding to the left and right sound channels. The two playing devices respectively perform audio playing by using the left sound channel and the right sound channel. The first playing device may be either of the two playing devices.

Figure 6B:
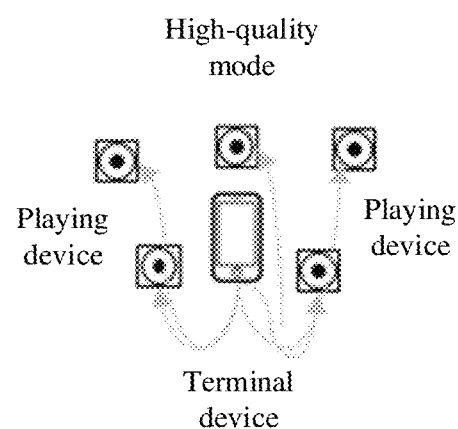
FIG. 6b is another example schematic diagram of a playing mode.

FIG. 6b is another schematic diagram of a playing mode. As shown in FIG. 6b, a second mode is a wireless high quality mode, which means that a terminal device separately establishes connections to a plurality of playing devices by using a wireless network (e.g., Wi-Fi/Bluetooth). The terminal device transmits an audio stream to be played that is stored by the terminal device or an audio stream to be played that is obtained from the Internet to the plurality of playing devices in a streaming mode for playing, and each playing device plays same audio content.

Figure 6C:
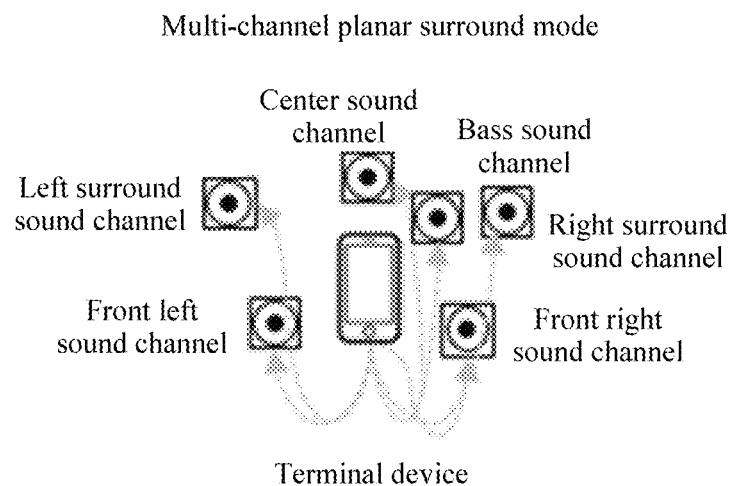
FIG. 6c is still another example schematic diagram of a playing mode.

FIG. 6c is still another schematic diagram of a playing mode. As shown in FIG. 6c, a third mode is a wireless multi-channel planar surround mode, which means that a terminal device separately establishes connections to a plurality of playing devices, for example, six or eight playing devices, by using a wireless network (e.g., Wi-Fi/Bluetooth). The terminal device performs sound channel splitting or virtual up-mixing on an audio stream to be played that is stored by the terminal device or an audio stream to be played that is obtained from the Internet, and separately streams obtained multi-channel audio information to the plurality of playing devices in a one-to-one correspondence for playing. Six playing devices are used as an example. If the audio stream to be played that is stored by the terminal device is in a stereo format, stereo audio content is first processed into a 5.1 sound channel format by using a virtual up-mixing algorithm, and then audio information corresponding to each sound channel is pushed to a specified playing device, so that the playing devices respectively play front left, center, front right, left surround, right surround, and bass sound channels, to achieve a 5.1 planar surround effect.

Figure 6D:
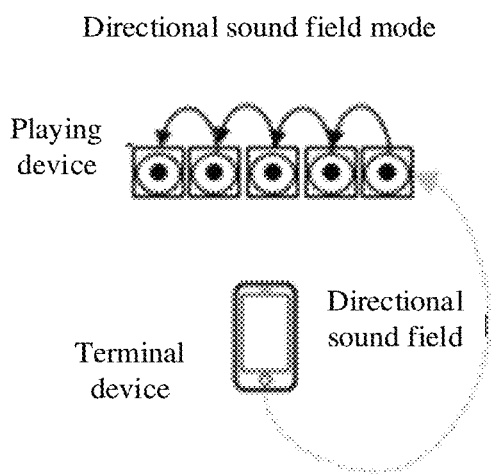
FIG. 6d is yet another example schematic diagram of a playing mode.

FIG. 6d is yet another schematic diagram of a playing mode. As shown in FIG. 6d, a fourth mode is a directional sound field mode. In this mode, a playing device is mainly a small wireless speaker, and a plurality of identical playing devices may form a soundbar shape. A terminal device performs sound channel splitting on an audio stream to be played that is stored by the terminal device or an audio stream to be played that is obtained from the Internet, to obtain audio information corresponding to at least two sound channels, then separately calculates, based on a quantity of the playing devices and distances between the playing devices, a beamforming filter coefficient corresponding to each playing device, performs a filtering operation on audio information to be sent to each playing device before streaming, and separately streams filtered multi-channel audio information to corresponding playing devices for playing, thereby forming a directional sound field effect. A manner of determining the distances between the playing devices is described in detail in the following embodiments.

Figure 6E:
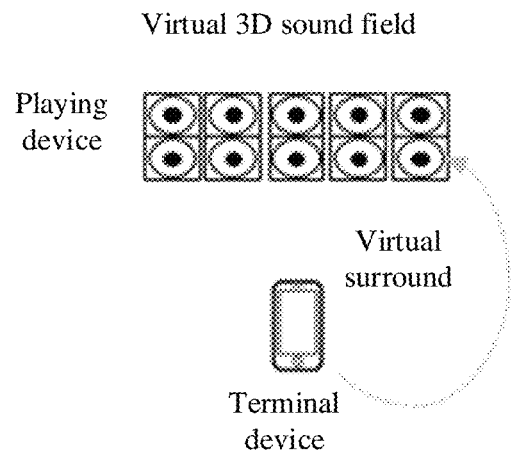
FIG. 6e is yet another example schematic diagram of a playing mode.

FIG. 6e is yet another schematic diagram of a playing mode. As shown in FIG. 6e, a fifth mode is a virtual 3D sound field mode. In this mode, a playing device is mainly a small wireless speaker, and a plurality of identical playing devices may form a two-row soundbar shape. Sound output directions of playing devices on both sides point to the left and the right respectively. Sound output directions of playing devices in a middle area of an upper row may be selected to point to the top. Sound output directions of other playing devices point to the front. When audio content in a terminal device supports a 3D sound effect (for example, audio content using 7.1.4 or 5.1.4 MPEG-H encoding or Dolby Atmos encoding), the terminal device performs sound channel splitting on an audio stream to be played that is stored by the terminal device or an audio stream to be played that is obtained from the Internet, to obtain audio information corresponding to at least two sound channels, then pre-calculates, based on relative positions of the playing devices, orientations of the playing device, and audio encoding information, a filter group corresponding to each playing device, performs a filtering operation on audio information to be sent to each playing device before streaming, and separately streams filtered multi-channel audio information to corresponding playing devices for playing, thereby forming a 3D sound field effect. A manner of determining the distances between the playing devices is described in detail in the following embodiments.

Figure 7:
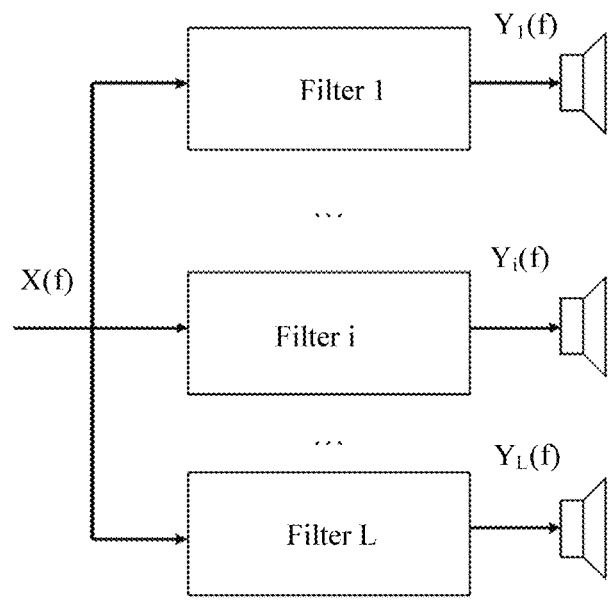
FIG. 7 is an example schematic diagram of filter calculation and enabling.

The following describes filtering operations in the fourth mode and the fifth mode. FIG. 7 is a schematic diagram of filter calculation and enabling. As shown in FIG. 7, after the terminal device decodes a locally stored audio stream to be played or an audio stream to be played that is obtained from the Internet into a pulse code modulation (PCM) bit stream, the terminal device performs mixing on the decoded PCM bit stream to obtain a signal $X(f)$, and then calculates, based on a quantity of playing devices and distances between the playing devices, a filter group $Wi(f)$ corresponding to an $i^{th}$ playing device, where $1 \leq i \leq L$, and L is the quantity of the playing devices. After the filter group $Wi(f)$ is calculated, each signal obtained after beamforming, that is, audio information that needs to be pushed to the $i^{th}$ playing device, is calculated based on a formula $Y_i(f)=W_i(f) \times X(f)$, and finally, a signal $Y_i(f)$ is sent to the $i^{th}$ playing device by using a wireless network.

On a basis of the foregoing embodiment, for a second playing device of the at least two playing devices, a manner of determining a second start playing time of multimedia information corresponding to the second playing device is similar to the manner of determining the first start playing time of the multimedia information corresponding to the first playing device. In the following description, it is assumed that the terminal device determines the second start playing time of the multimedia information corresponding to the second playing device.

Figure 8:
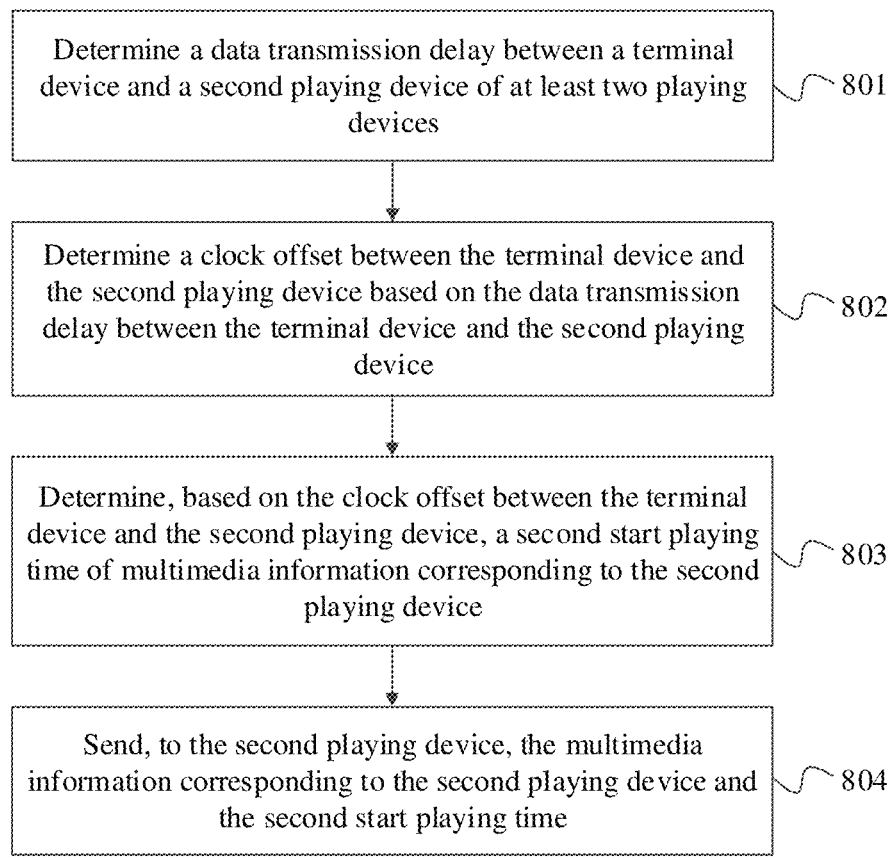
FIG. 8 is an example schematic flowchart of another multimedia information processing method according to an embodiment of this application.

FIG. 8 is a schematic flowchart of another multimedia information processing method according to an embodiment of this application. The multimedia information processing method provided in this embodiment of this application may be performed by any apparatus that performs the multimedia information processing method, and the apparatus may be implemented by using software and/or hardware. In this embodiment, the apparatus may be integrated into a terminal device 101 or a playing device 102. As shown in FIG. 8, the method includes the following steps.

Step 801: Determine a data transmission delay between a terminal device and a second playing device of at least two playing devices.

Step 802: Determine a clock offset between the terminal device and the second playing device based on the data transmission delay between the terminal device and the second playing device.

The second playing device is a playing device different from a first playing device in the at least two playing devices.

For example, a manner in which the terminal device determines the data transmission delay between the terminal device and the second playing device, and determines the clock offset between the terminal device and the second playing device based on the data transmission delay between the terminal device and the second playing device is similar to a manner in which the terminal device determines a data transmission delay between the terminal device and the first playing device, and determines a clock offset between the terminal device and the first playing device based on the data transmission delay between the terminal device and the first playing device. For details, refer to related descriptions in the foregoing embodiment.

Step 803: Determine, based on the clock offset between the terminal device and the second playing device, a second start playing time of multimedia information corresponding to the second playing device.

The second start playing time is used to indicate a start time at which the second playing device plays the multimedia information corresponding to the second playing device.

The first start playing time in the foregoing embodiment and the second start playing time enable the first playing device and the second playing device to synchronously play the multimedia information corresponding to the first playing device and the second playing device.

In this step, to enable the at least two playing devices to achieve a stereo effect, different playing devices of the at least two playing devices may play different multimedia information, where the multimedia information corresponding to the second playing device is multimedia information played in the second playing device, and the multimedia information may include audio information and/or video information.

For example, the first start playing time is a start time at which the first playing device starts to play the multimedia information corresponding to the first playing device, and the second start playing time is a start time at which the second playing device starts to play the multimedia information corresponding to the second playing device. A system time of the first playing device may be different from a system time of the second playing device, or a system time of the first playing device and a system time of the second playing device may be different from a system time of the terminal device. Therefore, in this embodiment of this application, the first start playing time may be determined by using the system time of the terminal device and the clock offset between the terminal device and the first playing device, and the second start playing time may be determined by using the system time of the terminal device and the clock offset between the terminal device and the second playing device. In this way, although the start time at which the first playing device starts to play the multimedia information and the start time at which the second playing device starts to play the multimedia information are different, the first start playing time and the second start playing time may enable the first playing device and the second playing device to synchronously play the multimedia information corresponding to the first playing device and the second playing device.

For example, a manner in which the terminal device determines the second start playing time of the multimedia information corresponding to the second playing device is similar to a manner in which the terminal device determines the first start playing time of the multimedia information corresponding to the first playing device. For details, refer to related descriptions in the foregoing embodiment.

Step 804: Send, to the second playing device, the multimedia information corresponding to the second playing device and the second start playing time.

In this step, after determining the second start playing time, the terminal device may send, to the second playing device, the multimedia information corresponding to the second playing device and the second start playing time. In this way, the second playing device can start to play the corresponding multimedia information at the second start playing time, to perform synchronous playing with the first playing device.

It should be noted that step 801 to step 803 may alternatively be performed by the second playing device. The terminal device may send, to the second playing device, the multimedia information corresponding to the second playing device. After determining the second start playing time, the second playing device starts to play the corresponding multimedia information at the second start playing time.

It should be noted that, for another playing device of the at least two playing devices, a start playing time may be determined based on the manner in the foregoing embodiment, so that each playing device of the at least two playing devices can synchronously play multimedia information corresponding to the playing device. For details, refer to related descriptions in the foregoing embodiment.

The following describes the foregoing solutions by using specific embodiments.

Figure 9:
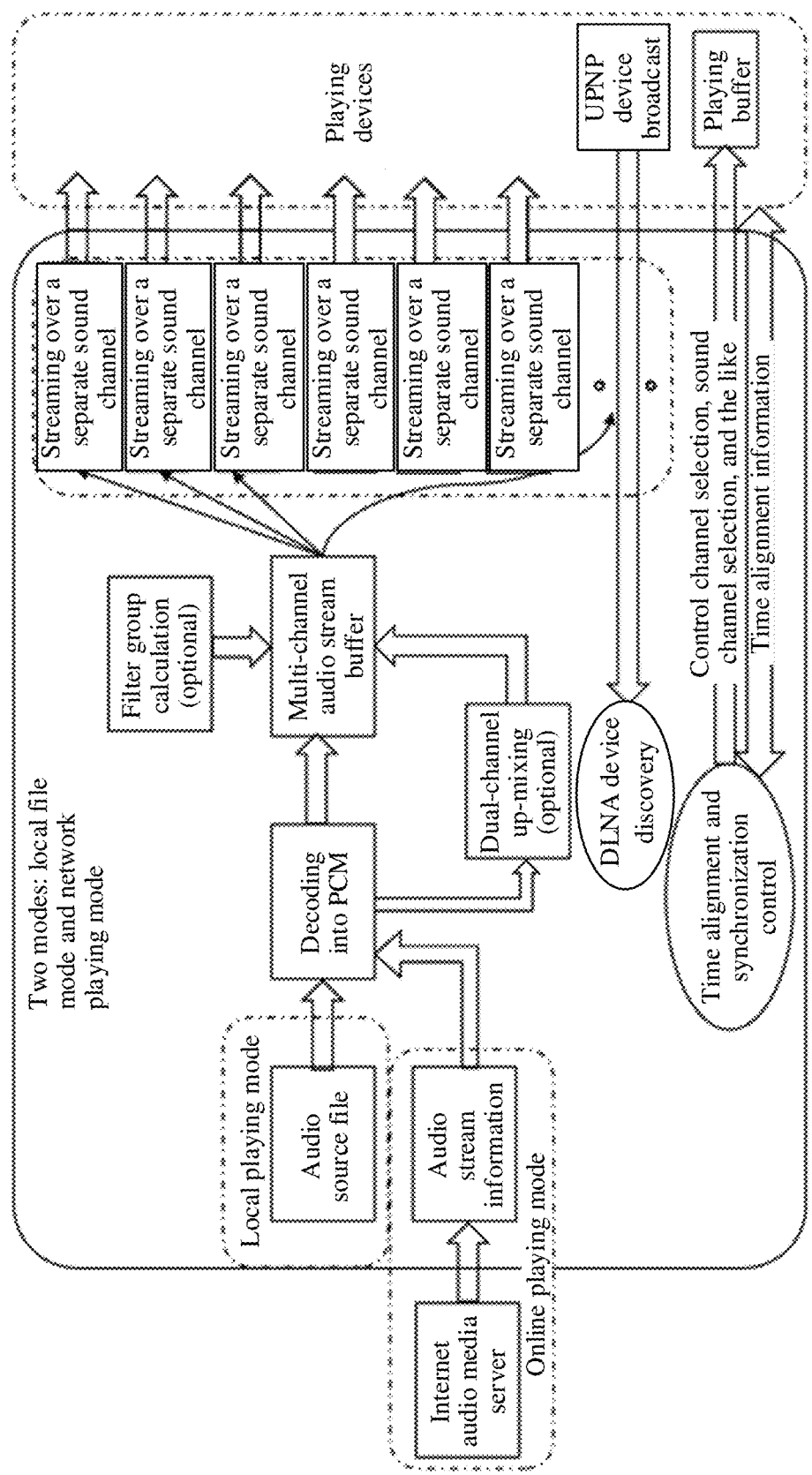
FIG. 9 is an example schematic diagram of an implementation process of a multimedia information processing method.

FIG. 9 is a schematic diagram of an implementation process of a multimedia information processing method. As shown in FIG. 9, a terminal device and a plurality of playing devices respectively access a same Wireless Fidelity (Wi-Fi) local area network. Each of the plurality of playing devices sends Universal Plug and Play (UPNP) broadcast information. The terminal device identifies the plurality of playing devices by using the Digital Living Network Alliance (DLNA) protocol, and establishes a point-to-point connection to each playing device. After establishing connections, the terminal device may send corresponding commands to the plurality of playing devices by using a socket interface, select playing sound channels of the plurality of playing devices, and push, to each playing device, multimedia information corresponding to the playing device.

Specifically, the terminal device may directly decode a locally stored audio stream to be played into a PCM bit stream, or may obtain an audio stream to be played from an Internet audio media server, and decode the audio stream into a PCM bit stream while buffering the audio stream. If the PCM bit stream is a stereo format, a dual-channel up-mixing operation may be performed to up-mix the stereo format into a sound channel format such as a 5.1/7.1/3D sound or 3D sound field. If the PCM bit stream is a 5.1/7.1 sound channel, the multi-channel planar surround mode shown in FIG. 6c may be used to directly perform streaming over separate sound channels. In addition, if the directional sound field mode shown in FIG. 6d or the virtual 3D sound field mode shown in FIG. 6e is selected, filter group calculation is performed based on the corresponding mode, filtering processing is performed on the multi-channel PCM bit stream, and then streaming over separate sound channels is performed to send, to different playing devices, audio information corresponding to the at least two sound channels. Each playing device establishes a playing buffer for storing received audio information, and performs time alignment processing and audio playing. The playing device plays the received audio information based on the start playing time determined in the foregoing embodiment.

According to the multimedia information processing method provided in this embodiment of this application, the data transmission delay between the terminal device and the first playing device of the at least two playing devices is determined; the clock offset between the terminal device and the first playing device is determined based on the data transmission delay between the terminal device and the first playing device; and then the first start playing time of the multimedia information corresponding to the first playing device is determined based on the clock offset between the terminal device and the first playing device, where the first start playing time is used to indicate the start time at which the first playing device plays the multimedia information corresponding to the first playing device. Because a clock offset between the terminal device and each of the at least two playing devices may be determined based on a data transmission delay between the terminal device and the playing device, a start playing time of multimedia information corresponding to the playing device is determined. Therefore, each of the at least two playing devices can synchronously play the multimedia information corresponding to the playing device, to improve listening experience of a user.

Figure 10:
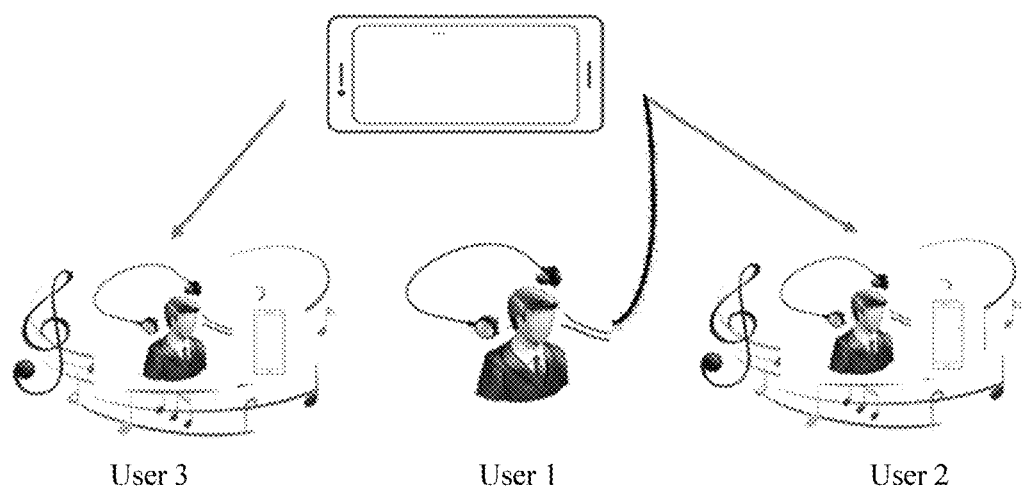
FIG. 10 is an example schematic diagram of another possible application scenario according to an embodiment of this application.

FIG. 10 is a schematic diagram of another possible application scenario according to an embodiment of this application. As shown in FIG. 10, on a basis of the foregoing embodiment, when a user views a video by using a terminal device, audio information is streamed to other playing devices by using wireless connections (such as Wi-Fi). A plurality of users may listen to a sound by inserting headsets into the other playing devices or directly using speakers of the other playing devices, and view the video on the terminal device at the same time, and it is ensured that the sound and the video are synchronized. When a plurality of playing devices are used, a surround sound effect such as 5.1 or 7.1 can be achieved by setting a sound channel for each playing device.

Figure 11:
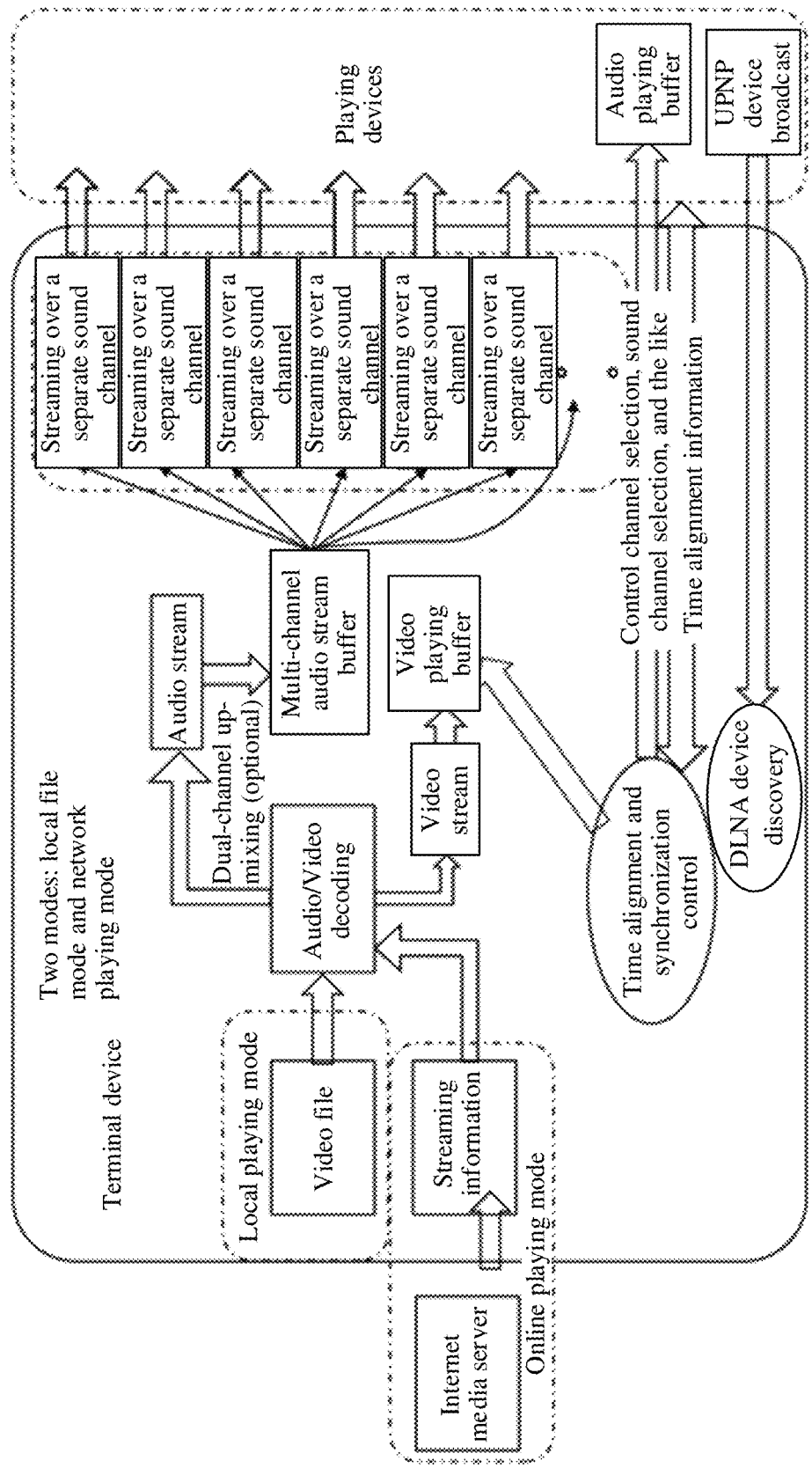
FIG. 11 is an example block diagram of an audio-video synchronization algorithm.

Specifically, FIG. 11 is a block diagram of an audio-video synchronization algorithm. As shown in FIG. 11, a terminal device and a plurality of playing devices respectively access a same Wi-Fi local area network, and the plurality of playing devices send UPNP broadcast information. The terminal device identifies the plurality of playing devices by using the DLNA protocol, and establishes a point-to-point connection to each playing device. After establishing connections, the terminal device may send corresponding commands to the plurality of playing devices by using a socket interface, select playing sound channels of the plurality of playing devices, and push, to each playing device, audio information corresponding to the playing device.

A process in which the terminal device streams the corresponding audio information to the playing device is similar to the streaming process in FIG. 9. For details, refer to related descriptions in FIG. 9.

After the terminal device synchronizes the audio information with the first playing device of the at least two playing devices in the manner in the foregoing embodiment, because a playing buffer exists in the first playing device, when the terminal device sends the audio information to the first playing device, the first playing device needs to store the received audio information in the playing buffer. After the playing buffer is full, the first playing device plays the audio information based on the start playing time. In this case, the terminal device may sets back an original playing time of the audio information, to play the audio information synchronously with the first playing device. However, the audio information and the video information in the terminal device are decoded separately. After decoding a video stream, the terminal device stores the decoded video stream in a video playing buffer for playing. In this case, if the video stream is still played based on the original time, audio-video asynchronization is caused. To resolve this problem, in this embodiment of this application, the terminal device adjusts, based on a delay time of playing the audio information, a delay time of playing the video information. In this way, when playing the video information, the terminal device also sets back the corresponding time, thereby implementing audio-video synchronization.

In this embodiment, a time alignment synchronization mechanism can be used to resolve an audio-video synchronization problem, ensure audio-video synchronization, and bring better video viewing experience to the user.

Figure 12:
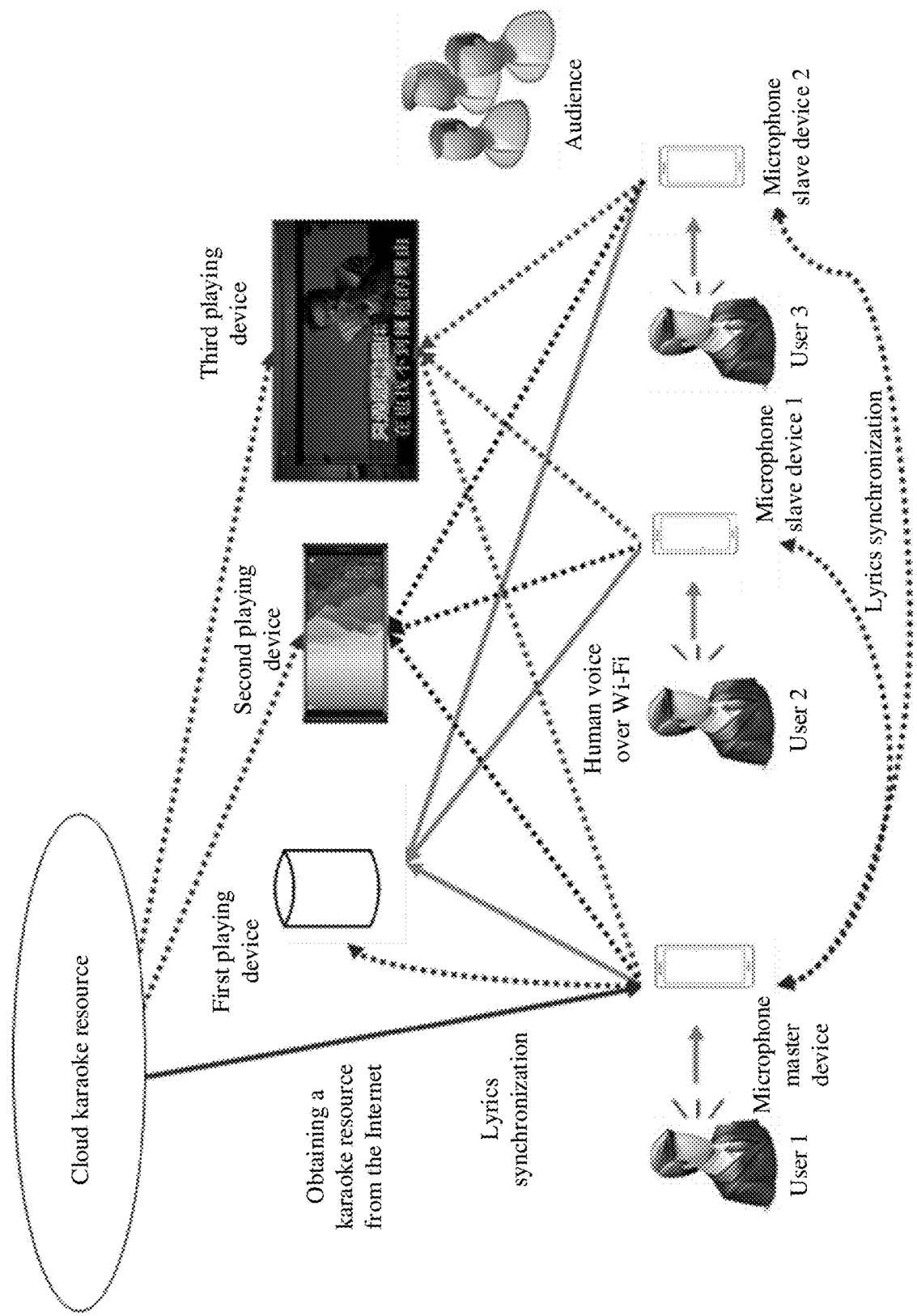
FIG. 12 is an example schematic diagram of still another possible application scenario according to an embodiment of this application.

FIG. 12 is a schematic diagram of still another possible application scenario according to an embodiment of this application. As shown in FIG. 12, on a basis of the foregoing embodiment, a user may further perform coordinated karaoke by using a plurality of terminal devices and a plurality of playing devices, where the plurality of terminal devices may capture voice information of the user. For example, a microphone master device may capture voice information of a user 1, a microphone slave device 1 may capture the voice information of the user 1, and a microphone slave device 2 may capture the voice information of the user 1. The plurality of terminal devices establish connections to the plurality of playing devices (such as a mobile phone, a speaker, and a television) in a wireless manner (such as Wi-Fi), and the plurality of playing devices may simultaneously play the captured voice information of the user and background music to achieve a karaoke effect.

Figure 13A:
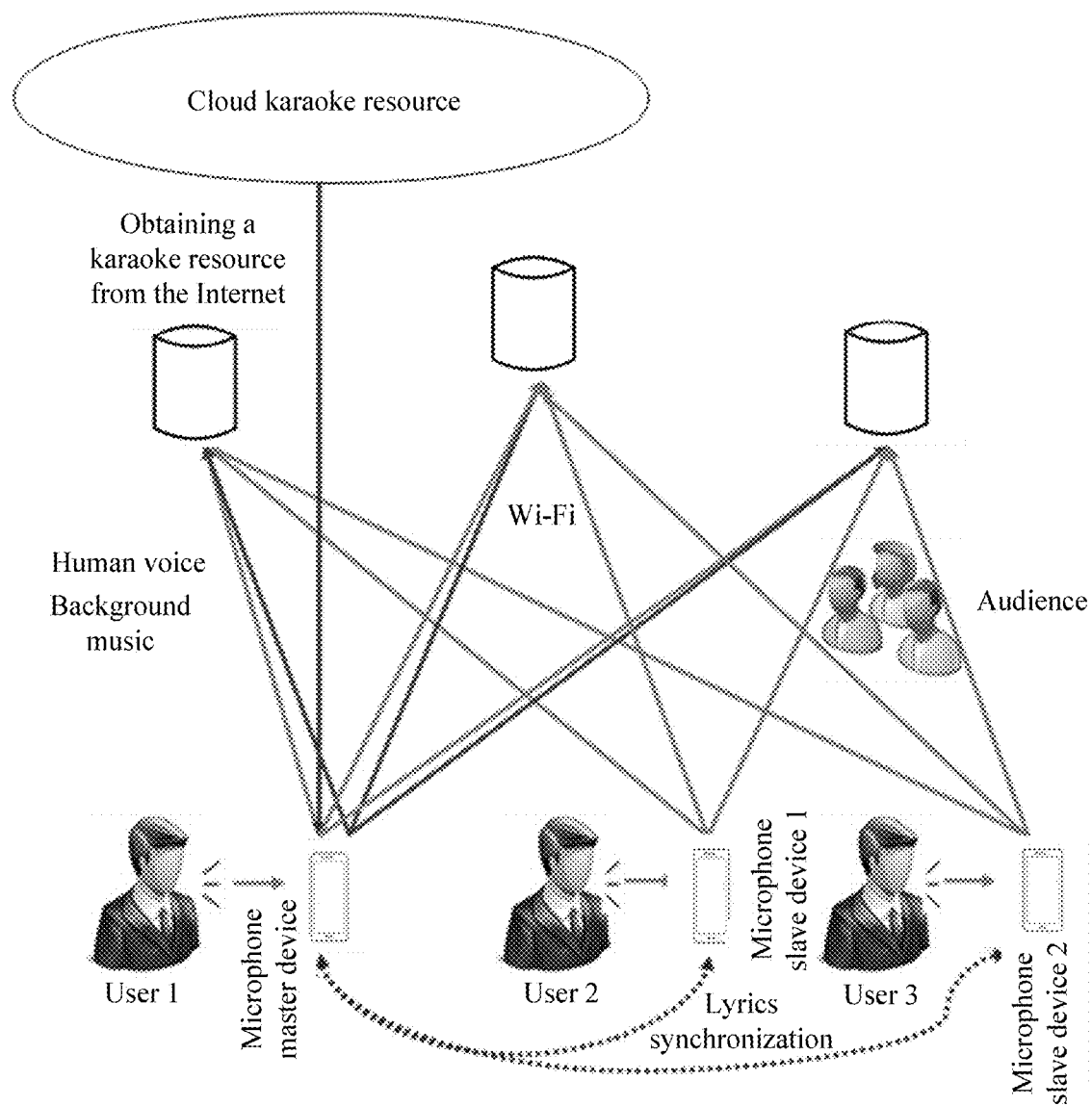
FIG. 13a is an example schematic diagram of coordinated karaoke among a plurality of terminal devices and a plurality of speakers.

FIG. 13*a* is a schematic diagram of coordinated karaoke among a plurality of terminal devices and a plurality of speakers. As shown in FIG. 13*a*, each terminal device (such as a mobile phone) is connected to a plurality of playing devices (such as speakers) in a wireless manner, and each microphone slave device (such as a microphone slave device 1 and a microphone slave device 2) is connected to a microphone master device. For example, a terminal device corresponding to a user 1 may be a microphone master device, a terminal device corresponding to a user 2 may be a microphone slave device 1, and a terminal device corresponding to a user 3 may be a microphone slave device 2. The microphone master device may send background music to each playing device. In addition, a sound channel of each playing device for playing may be configured. The microphone master device may capture voice information of the user 1, the microphone slave device 1 may capture voice information of the user 2, and the microphone slave device 2 may capture voice information of the user 3. The microphone master device and the microphone slave devices transmit the captured voice information to each playing device to achieve a karaoke effect.

Figure 13B:
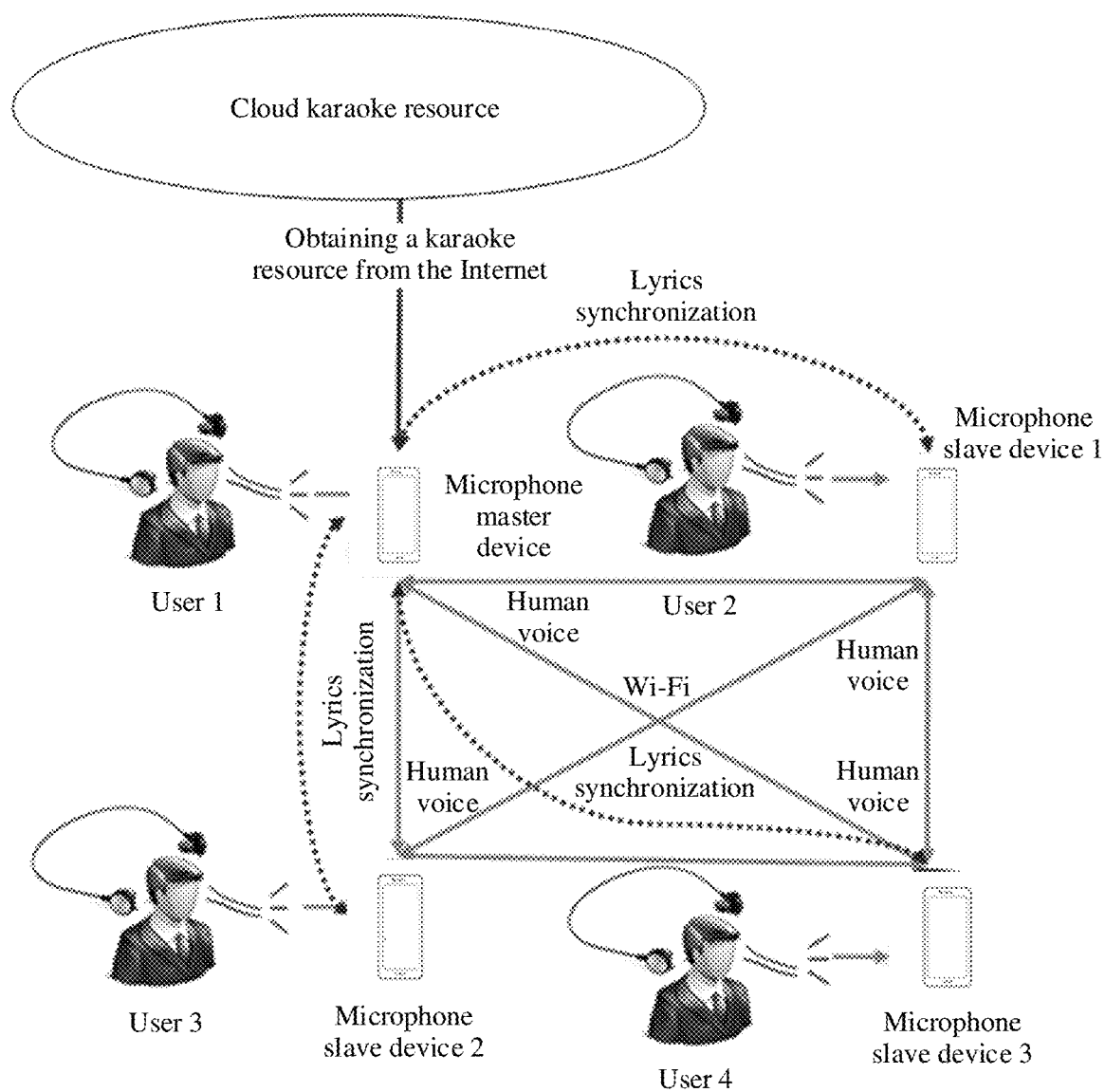
FIG. 13b is an example schematic diagram of coordinated karaoke among a plurality of terminal devices and distributed headsets.

FIG. 13*b* is a schematic diagram of coordinated karaoke among a plurality of terminal devices and distributed headsets. As shown in FIG. 13*b*, in this scenario, all terminal devices (such as mobile phones) establish wireless connections to each other to form a star network. A microphone master device sends background music to each microphone slave device in advance (for example, a microphone slave device 1, a microphone slave device 2, and a microphone slave device 3). Each terminal device may transmit captured voice information of a user to another terminal device by using the wireless network. For example, the microphone master device may transmit captured voice information of a user 1 to the microphone slave device 1, the microphone slave device 2, and the microphone slave device 3; and the microphone slave device 1 may transmit captured voice information of a user 2 to the microphone master device, the microphone slave device 2, and the microphone slave device 3. In this way, each user can listen to the voice of another user by using a headset.

On a basis of the application scenarios shown in FIG. 12 to FIG. 13*b*, the following describes in detail a process of lyrics synchronization between playing devices.

Figure 14:
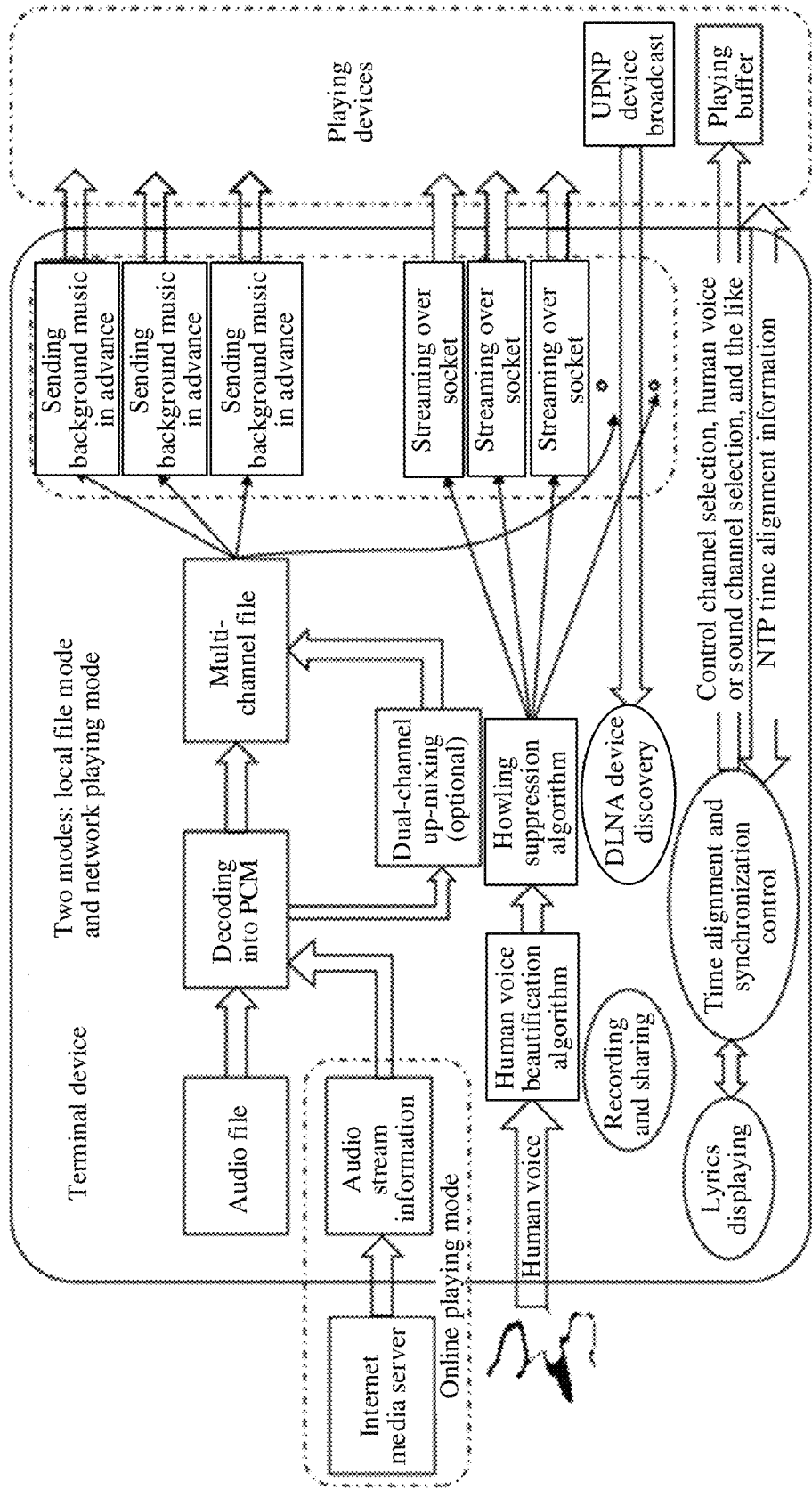
FIG. 14 is an example block diagram of an algorithm for processing audio information by a terminal device during karaoke.

FIG. 14 is a block diagram of an algorithm for processing audio information by a terminal device during karaoke. As shown in FIG. 14, a plurality of terminal devices and a plurality of playing devices respectively access a same Wi-Fi local area network. The plurality of playing devices send UPNP broadcast information. The plurality of terminal devices identify the plurality of playing devices by using the DLNA protocol, and establish a point-to-point connection to each playing device.

After a connection is established, a terminal device (such as a microphone master device) sends background music to other playing devices (such as microphone slave devices). Specifically, the terminal device may directly decode a locally stored audio stream to be played into a PCM bit stream, or may obtain an audio stream to be played from an Internet audio media server, and decode the audio stream into a PCM bit stream while buffering the audio stream. The terminal device (such as the microphone master device) saves the PCM bit stream as a multi-channel file, where the multi-channel file may be a stereo file, a 5.1/7.1/3D file, or another file with more sound channels, where each sound channel corresponds to one file. If the playing devices are a plurality of speakers, each sound channel file may be sent to a corresponding speaker in advance, and a sound channel for playing by each speaker may be set in advance by the terminal device (such as the microphone master device).

When a user starts to sing, each terminal device captures voice information of the user by using a microphone, and processes the captured voice information by using a human voice beautification algorithm, for example, performs processing such as equalization (EQ), artificial reverberation, or a timbre adjustment. If a first playing device of at least two playing devices is a speaker, each terminal device further performs, by using a howling suppression algorithm module, howling suppression algorithm processing on the voice information processed by the human voice beautification algorithm, where the howling suppression algorithm module includes howling detection and control. When howling is detected, howling is controlled by adjusting a gain of each frequency band. In addition, each terminal device establishes a socket interface with the first playing device, and streams the voice information processed by the howling suppression algorithm, to the first playing device for playing.

Further, in the foregoing scenario of coordinated karaoke among the plurality of terminal devices and the plurality of speakers, background music played by the first playing device needs to be synchronized with lyrics displayed by each terminal device. Specifically, after selecting a song by using the terminal device, the user sends a uniform resource locator (URL) of the song to the first playing device of the at least two playing devices, and obtains lyrics corresponding to the song. The first playing device obtains the background music based on the received URL. Certainly, the terminal device may alternatively send the background music to the first playing device directly. The first playing device initializes a player based on the background music, and determines whether the background music is being played. If the first playing device is playing the background music, the first playing device may obtain a current playing position, and send the current playing position to the terminal device. The terminal device adjusts a display position of the lyrics based on the current playing position, to update a status of the lyrics. In a possible implementation, when the terminal device adjusts the display position of the lyrics, a delay between the lyrics displayed on the terminal device and the background music played by the playing device may be first determined, and then the display position of the lyrics is adjusted based on the current display position of the lyrics and the delay between the lyrics and the background music. A manner of determining the delay between the lyrics displayed on the terminal device and the background music played by the playing device is similar to the manners of determining delays shown in FIG. 4 and FIG. 5. For related descriptions, refer to the foregoing embodiment.

In addition, if the first playing device is in a state of not playing the background music, the first playing device refreshes a playing status of the first playing device based on the received background music, and sends the playing status of the first playing device or the current playing position to the terminal device. The terminal device adjusts the display position of the lyrics based on the foregoing manner.

In the scenario of coordinated karaoke among the plurality of terminal devices and the distributed headsets, lyrics synchronization between the terminal devices can be ensured by background music synchronization between the terminal devices.

It should be noted that, for background music synchronization between the playing devices or the terminal devices, refer to the multimedia information synchronization manner in the foregoing embodiment.

Further, in an actual karaoke environment, a network environment is very complex and a network delay is in a fluctuation process. To achieve a low-delay karaoke effect, a network status needs to be monitored. Specifically, in a karaoke process, the terminal device may send a voice data packet to the first playing device of the at least two playing devices every m milliseconds. On the first playing device, times of receiving first, . . . , $n^{th}$ voice packets may be recorded as $t_1, \ldots, t_n$ respectively, and then a time difference between every two voice packets is calculated: $\Delta t_n = t_n - t_{n-1}$. Then a time difference sequence of received voice packets may be obtained: $\Delta t_1, \ldots, \Delta t_n$.

In an ideal case, the first playing device still receives two consecutive voice packets with a time difference of $(\Delta t_i)$ m milliseconds (a time difference of sending voice packets by the terminal device). However, in an actual karaoke environment, due to a fluctuation of a network delay, $\Delta t_i \neq m$. Therefore, a fluctuation degree (e.g., variance) of Ati can reflect a fluctuation degree of a network delay. To reduce adverse impact of the fluctuation of a network delay on an overall karaoke loop delay, a voice packet received in a stable stage of the network (in this case, the network delay is short) needs to be used as a start voice frame actually played by the first playing device. If a sound effect algorithm exists in the terminal device, because a delay of the sound effect algorithm is not constant, a human voice beautification sound effect processing algorithmneeds to be added after the start voice frame of the first playing device is determined. After the start voice frame, when the network status is poor, the network delay increases, and a voice packet that needs to be played by the first playing device may arrive late. In this case, packet compensation processing needs to be performed. A common packet loss compensation algorithm may be used for packet compensation processing. When a voice packet arrives late, the voice packet needs to be discarded. If the network status evaluated by using the monitoring algorithm is excessively poor, for example, if a quantity of consecutive compensation packets is greater than a preset value, for example, greater than 10, the first playing device needs to notify the terminal device, to notify the user that the current network status is poor, and the user may choose to quit another application occupying a network bandwidth, or choose to try karaoke later.

In this embodiment, the lyrics and the background music may be synchronized. In addition, because an adaptive network status detection method is used to determine real-time arrival of the human voice and make a corresponding adjustment, the delay can be kept at a low level, and a human voice lag problem is resolved, thereby bringing better experience to the user.

For example, in an actual application scenario, for the at least two playing devices provided in the foregoing embodiment, the user may randomly arrange positions of the playing devices, and distances between the playing devices may not be fixed either. In this case, when the at least two playing devices are used to play multimedia information, the user may not have good listening experience. In the prior art, a user needs to manually measure a distance and a relative position relationship between playing devices, and input the distance and the relative position relationship to a terminal device for filter calculation and enabling, and this brings complex operation experience to the user.

In an embodiment of this application, in consideration of the foregoing problem, relative position information of at least two playing devices is obtained; position information of a user relative to the at least two playing devices is obtained based on the relative position information of the at least two playing devices; then a sound field correction is performed, based on the position information of the user relative to the at least two playing devices and the relative position information of the at least two playing devices, on original multimedia information corresponding to a first playing device of the at least two playing devices, to obtain multimedia information corresponding to the first playing device, where the multimedia information includes audio information; and then the multimedia information corresponding to the first playing device is sent to the first playing device. Because a sound field correction can be performed, based on the position information of the user relative to the at least two playing devices and the relative position information of the at least two playing devices, on original multimedia information corresponding to each of the at least two playing devices, and corrected multimedia information is sent to each playing device, after the playing device plays the multimedia information, the user is in a sweet spot, and listening experience of the user can be improved.

It should be noted that, in this embodiment of this application, when playing the multimedia information corresponding to the first playing device, the first playing device may also determine a first start playing time based on the manner in the embodiment shown in FIG. 3, and start to play the multimedia information based on the first start playing time.

Figure 15:
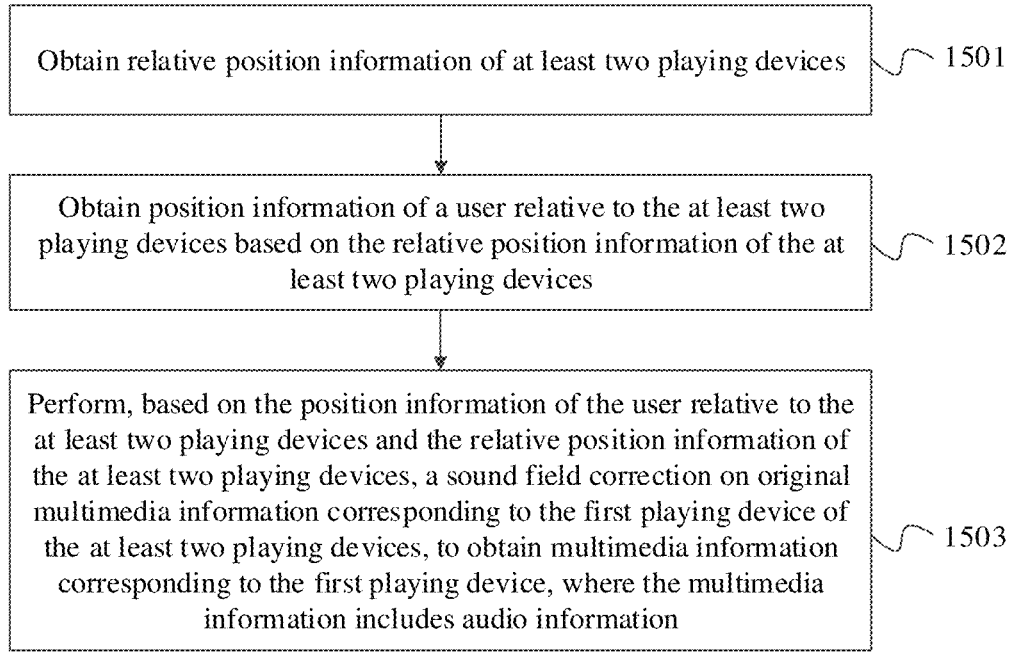
FIG. 15 is an example schematic flowchart of still another multimedia information processing method according to an embodiment of this application.

FIG. 15 is a schematic flowchart of still another multimedia information processing method according to an embodiment of this application. In this embodiment of this application, an execution body may be a terminal device, or may be a playing device, for example, a first playing device. As shown in FIG. 15, the method includes the following steps.

Step 1501: Obtain relative position information of at least two playing devices.

In this step, the relative position information of the at least two playing devices may be understood as a distance between any two of the at least two playing devices.

For example, assuming that the relative position information of the at least two playing devices includes a distance between a first playing device of the at least two playing devices and a second playing device of the at least two playing devices, the following describes in detail how to obtain the relative position information of the at least two playing devices: determining first duration and second duration, and determining the distance between the first playing device and the second playing device based on the first duration and the second duration. The first duration is a difference between a time at which a microphone of the first playing device captures a second sound played by the second playing device and a time at which the microphone of the first playing device captures a first sound played by the first playing device. The second duration is a difference between a time at which a microphone of the second playing device captures the second sound played by the second playing device and a time at which the microphone of the second playing device captures the first sound played by the first playing device.

Figure 16:
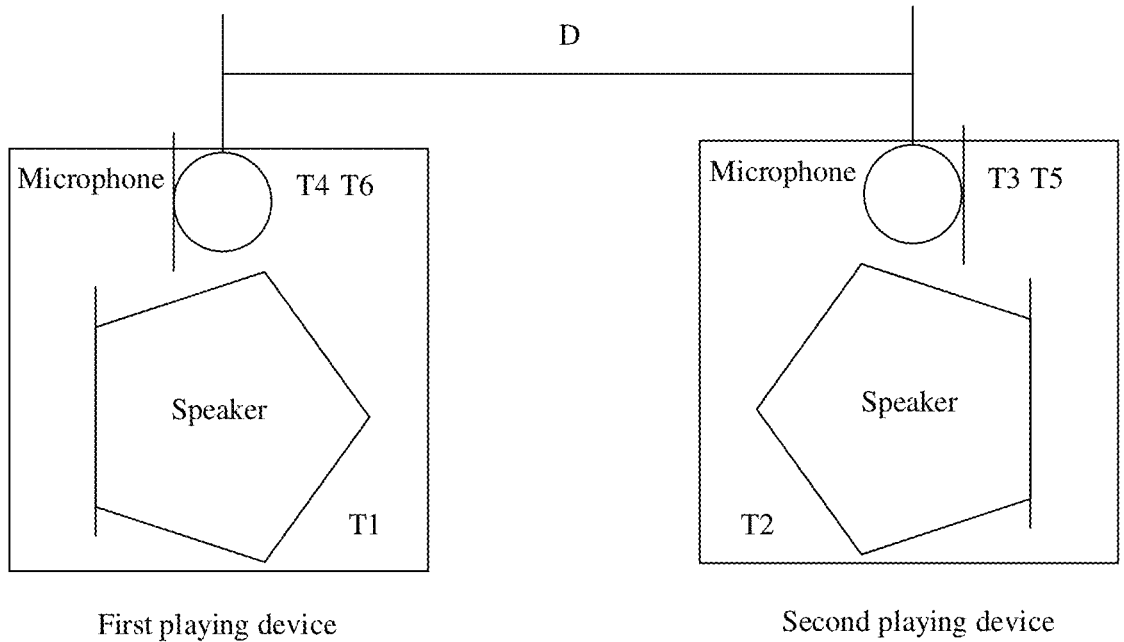
FIG. 16 is an example schematic diagram for calculating relative position information of a first playing device and a second playing device.

Specifically, in this embodiment of this application, it is assumed that both the first playing device and the second playing device have microphones and speaker devices, that is, both can play sounds and capture sounds. FIG. 16 is a schematic diagram for calculating the relative position information of the first playing device and the second playing device. As shown in FIG. 16, if the speaker of the first playing device plays the first sound at a time T1, the microphone of the first playing device captures the first sound at a time T4, and the microphone of the second playing device captures, at a time T3, the first sound played by the speaker of the first playing device at the time T1; and if the speaker of the second playing device plays the second sound at a time T2, where T2−T1>100 milliseconds, the microphone of the second playing device captures the second sound at a time T5, and the microphone of the first playing device captures, at a time T6, the second sound played by the speaker of the second playing device at the time T2. It may be understood that, assuming that the distance between the first playing device and the second playing device is D, the following formulas exist:

$$T3=T1+D/C+Tde \quad (10)$$

$$T6=T2+D/C+Tde \quad (11)$$

$$T4=T1+TdelaySelf \quad (12)$$

$$T5=T2+TdelaySelf \quad (13)$$

In the formulas, C is a sound velocity, me is a delay recorded from arrival of a sound wave at the microphone to conversion into a digital signal, and TdelaySelf is a delay recorded from arrival of a sound wave emitted by the device itself at the microphone to conversion into a digital signal.

Because a physical distance traveled before the sound wave emitted by the device itself arrives at the microphone may be ignored, TdelaySelf≈Tde.

The following formulas may be determined based on the formula (10) to the formula (13):

$$Tdelay1=T6-T4 \quad (14)$$

$$Tdelay2=T5-T3 \quad (15)$$

Based on the formula (10) to the formula (15), Tdelay1 and Tdelay2 may be calculated through autocorrelation. Therefore, the distance between the first playing device and the second playing device may be calculated based on a formula (16):

$$D=(Tdelay1-Tdelay2)*C/2 \quad (16)$$

Assuming that an audio sampling function is x(n), calculating autocorrelation may be changed to calculating cross-correlation of $x_n$ and $x_{(n-N)}$, where N is a length of $x_n$.

Assuming $y_n=x_{(n-N)}$, the following formula exists:

$$\hat{R}_{xy}(m) = \begin{cases} \sum_{n=0}^{N-m-1} x_{n+m} y_n^*, & m \geq 0, \\ \hat{R}_{yx}^*(-m), & m < 0. \end{cases}$$

Based on the formula, an output vector $c(m)=\hat{R}_{xy}(m-N)$, m=1, 2, . . . , 2N−1, may be obtained. A position d corresponding to a maximum value of c(m) in m=1, 2, . . . , N is determined, and this may be used to determine N-d, that is, delay duration. N-d obtained through calculation in the foregoing manner by using the first playing device is equal to Tdelay1, and N-d obtained through calculation in the foregoing manner by using the second playing device is equal to Tdelay2 Therefore, Tdelay1−Tdelay2 can be calculated. In other words, the distance between the first playing device and the second playing device may be determined by determining values of N-d separately calculated by the first playing device and the second playing device.

Tdelay1 is the first duration, and Tdelay2 is the second duration.

It should be noted that the distance between any two of the at least two playing devices may be calculated based on the foregoing manner.

Step 1502: Obtain position information of a user relative to the at least two playing devices based on the relative position information of the at least two playing devices.

In this step, after the relative position information of the at least two playing devices is determined, the position information of the user relative to the at least two playing devices may be obtained based on the relative position information of the at least two playing devices.

In a possible implementation, the relative position information of the at least two playing devices includes the distance between the first playing device of the at least two playing devices and the second playing device of the at least two playing devices. In this case, when the position information of the user relative to the at least two playing devices is obtained, a sound source localization technology may be used to obtain first angle information of the first playing device relative to a microphone array of the second playing device and second angle information of the second playing device relative to a microphone array of the first playing device, where the first angle information is angle information in a coordinate axis of the microphone array of the second playing device, and the second angle information is angle information in a coordinate axis of the microphone array of the first playing device; then a rotation correction is performed on the coordinate axis of the microphone array of the first playing device based on the first angle information and the second angle information, where an axial direction of the coordinate axis of the microphone array of the second playing device is consistent with an axial direction of the coordinate axis of the microphone array of the first playing device after the rotation correction; and a position of the user relative to the first playing device is determined based on the coordinate axis of the microphone array of the first playing device after the rotation correction and based on the distance between the first playing device and the second playing device.

Specifically, when the user places the playing devices, microphone arrays on the playing devices may not face a same direction. Therefore, to make the obtained position information of the user relative to the at least two playing devices more accurate, a terminal device performs more accurate control on the sound field, and a rotation correction also needs to be performed on the coordinate axis of the microphone array.

Figure 17:
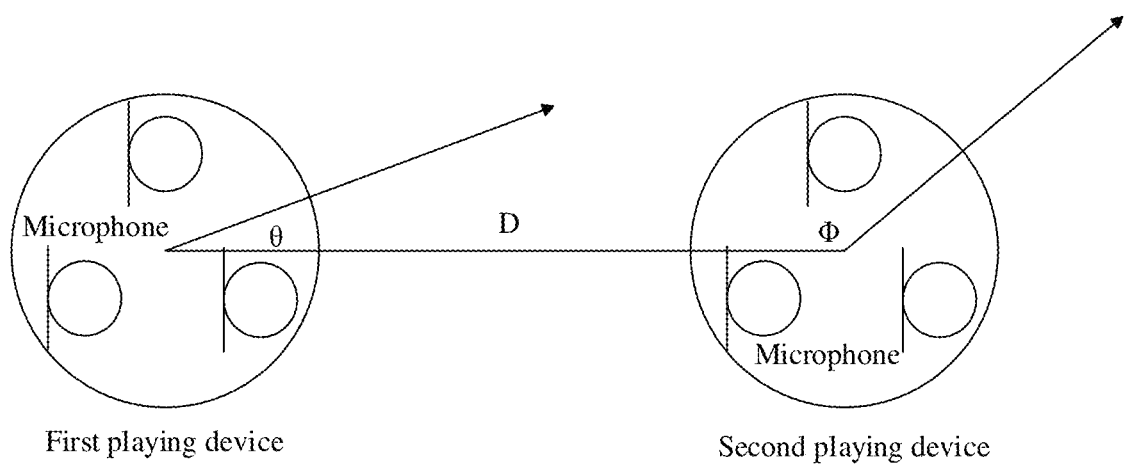
FIG. 17 is an example schematic diagram of a rotation correction of a coordinate axis of a playing device.

FIG. 17 is a schematic diagram of a rotation correction of a coordinate axis of a playing device. As shown in FIG. 17, after the first playing device plays the sound by using the speaker, the terminal device or the second playing device may obtain, through calculation by using the sound source localization technology, the first angle information θ of the first playing device relative to the microphone array of the second playing device, where θ<0, and the first angle information is the angle information in the coordinate axis of the microphone array of the second playing device; likewise, after the second playing device plays the sound by using the speaker, the terminal device or the first playing device may obtain, through calculation by using the sound source localization technology, the second angle information σ of the second playing device relative to the microphone array of the first playing device, where σ>0, and the second angle information is the angle information in the coordinate axis of the microphone array of the first playing device. After the first angle information and the second angle information are determined, the coordinate axis of the microphone array of the first playing device may be rotated by σ-θ-180 degrees. In this way, the axial direction of the coordinate axis of the microphone array of the second playing device is consistent with the axial direction of the coordinate axis of the microphone array of the first playing device after the rotation correction.

After the rotation correction is performed on the coordinate axis of the microphone array of the first playing device, the position of the user relative to the first playing device is determined based on the coordinate axis of the microphone array of the first playing device after the rotation correction and based on the distance between the first playing device and the second playing device.

In a possible implementation, third angle information of the user relative to the microphone array of the first playing device may be obtained by using the sound source localization technology, where the third angle information is angle information in the coordinate axis of the microphone array of the first playing device after the rotation correction; fourth angle information of the user relative to the microphone array of the second playing device is obtained by using the sound source localization technology, where the fourth angle information is angle information in the coordinate axis of the microphone array of the second playing device; and then the position of the user relative to the first playing device is determined based on the distance between the first playing device and the second playing device, the third angle information, and the fourth angle information.

Figure 18:
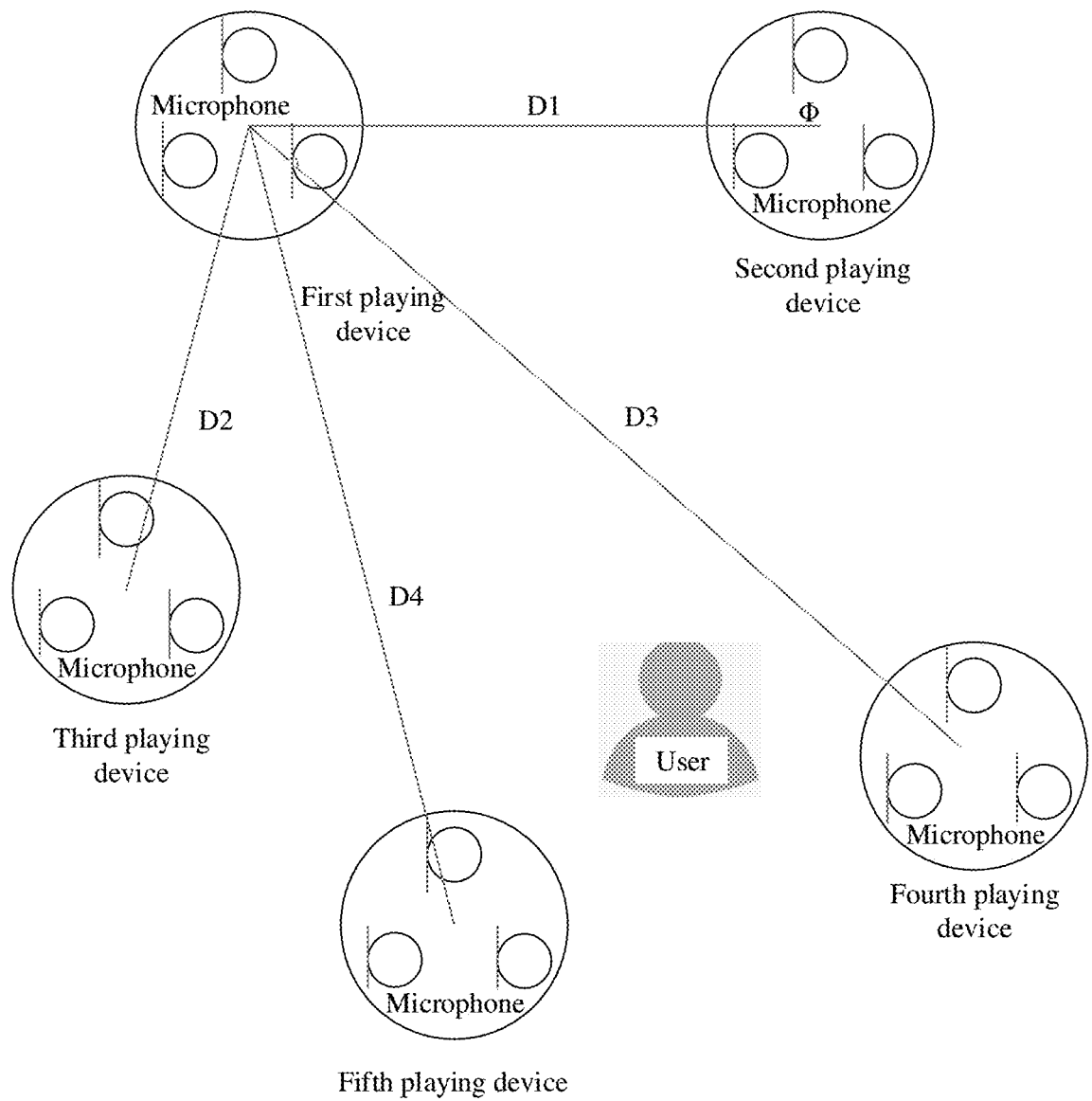
FIG. 18 is an example schematic diagram of positions of a user and playing devices.

Specifically, FIG. 18 is a schematic diagram of positions of the user and playing devices. As shown in FIG. 18, after the user sends voice information, the third angle information of the user relative to the microphone array of the first playing device may be calculated by using the sound source localization technology in the coordinate axis of the microphone array of the first playing device after the rotation correction. Likewise, the fourth angle information of the user relative to the microphone array of the second playing device may be calculated by using the sound source localization technology in the coordinate axis of the microphone array of the second playing device. The position of the user relative to the first playing device is determined based on the distance between the first playing device and the second playing device, the third angle information, and the fourth angle information. It may be understood that the position of the user relative to the first playing device may include angle information of the user relative to the first playing device and a distance between the user and the first playing device.

Similarly, rotation angles of coordinate axes of microphone arrays of a third playing device, a fourth playing device (and so on) may be sequentially calculated in the foregoing manner, so that rotation corrections are performed on the coordinate axes. Therefore, the axial direction of the coordinate axis of the microphone array of the second playing device is consistent with axial directions of the coordinate axes of the microphone arrays of the third playing device, the fourth playing device (and so on) after the rotation corrections. In this way, axial directions of the coordinate axes of the microphone arrays of all the playing devices are consistent. A position of the user relative to each playing device may be determined based on the coordinate axis of the microphone array of each playing device after the rotation correction and the distance between the playing devices.

Step 1503: Perform, based on the position information of the user relative to the at least two playing devices and the relative position information of the at least two playing devices, a sound field correction on original multimedia information corresponding to the first playing device of the at least two playing devices, to obtain multimedia information corresponding to the first playing device, where the multimedia information includes audio information.

In this step, after the position information of the user relative to each of the at least two playing devices and the distance between any two of the at least two playing devices are determined, the sound field correction may be performed on the original multimedia information corresponding to the first playing device of the at least two playing devices, where the first playing device may be any one of the at least two playing devices, and the performing a sound field correction on original multimedia information corresponding to the first playing device may include adjusting sound intensity and/or phase information of the original multimedia information corresponding to the first playing device.

In addition, after the position information of the user relative to each of the at least two playing devices and the distance between any two of the at least two playing devices are determined, a sound field correction may be performed on original multimedia information corresponding to the second playing device of the at least two playing devices, where the second playing device may be any one of the at least two playing devices and different from the first playing device, and the performing a sound field correction on original multimedia information corresponding to the second playing device may include adjusting sound intensity and/or phase information of the original multimedia information corresponding to the second playing device.

Further, if the terminal device performs, based on the position information of the user relative to the at least two playing devices and the relative position information of the at least two playing devices, the sound field correction on the original multimedia information corresponding to the first playing device and the second playing device of the at least two playing devices, the terminal device further needs to send, to the first playing device, the multimedia information corresponding to the first playing device after the correction, and send, to the second playing device, the multimedia information corresponding to the second playing device after the correction. In this way, multimedia information played by each playing device is multimedia information obtained after the sound field correction. Therefore, a listening experience of the user can be improved.

For example, on a basis of the foregoing embodiment, to reduce adverse impact of noise, active noise reduction needs to be performed when audio information is played by using a playing device. In the prior art, active noise reduction technologies include a headset active noise reduction technology and a vehicular active noise reduction technology, where the headset active noise reduction technology includes in-ear headset active noise reduction and over-ear headset active noise reduction. In both of the two active noise reduction manners, a secondary path impulse response from a headphone speaker to an error microphone or an eardrum and a primary path impulse response from a reference microphone to the error microphone or the eardrum are measured offline first, then a feed-forward filter coefficient and a feedback filter coefficient are calculated by using an offline training method or an online matching method, and then reverse noise is generated in a feed-forward mode, a feedback mode, or a mixed mode to cancel ambient noise in an auditory canal, to achieve an objective of active noise reduction. A technical solution to vehicular active noise reduction is similar to the technical solution to headset active noise reduction. An acoustic transfer function from a vehicular speaker to a position near a driver's seat at a height of a human ear needs to be measured in advance, and an active noise reduction filter coefficient is calculated by using the offline training or online matching method. In an actual application, these filters are used for active noise reduction. However, in both of the foregoing active noise reduction technologies, it is assumed that an acoustic transfer path from a playing device to a human ear is known, and a noise reduction filter coefficient is obtained based on the known acoustic transfer path. Therefore, the solution in the prior art is mainly applied to a headset scenario and a vehicular scenario. In an open environment, for example, in a home environment, a position of a user is unfixed, but a relative position of a playing device is fixed. As a result, an acoustic transfer path from the playing device to the user is unknown. Therefore, how to perform active noise reduction in an open environment is a technical problem to be resolved currently.

Figure 19:
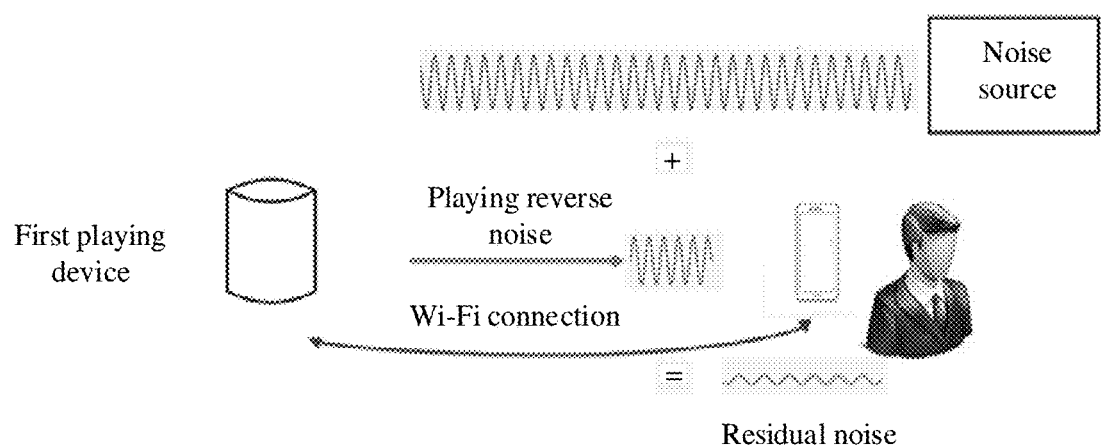
FIG. 19 is an example schematic diagram of active noise reduction.

FIG. 19 is a schematic diagram of active noise reduction. As shown in FIG. 19, in this embodiment of this application, the terminal device establishes a Wi-Fi connection to the first playing device. The terminal device captures ambient noise near the position of the user, and transfers the ambient noise to the first playing device. The first playing device performs a series of calculation, generates reverse noise, and plays the reverse noise. In this case, a part of ambient noise (for example, low-frequency noise) at the position of the user may be canceled, and an active noise reduction effect is achieved. In a possible implementation, when the first playing device plays the multimedia information corresponding to the first playing device, mixed multimedia information is captured, where the mixed multimedia information includes the multimedia information corresponding to the first playing device and ambient noise information; then the ambient noise information and/or an estimated value of a secondary path impulse response from the first playing device to the terminal device are/is determined based on the multimedia information corresponding to the first playing device and the mixed multimedia information; and then the ambient noise information and/or the estimated value of the secondary path impulse response are/is sent to the first playing device, where the noise information and/or the estimated value of the secondary path impulse response are/is used to obtain reverse noise, and the reverse noise is used to cancel the ambient noise information.

Figure 20:
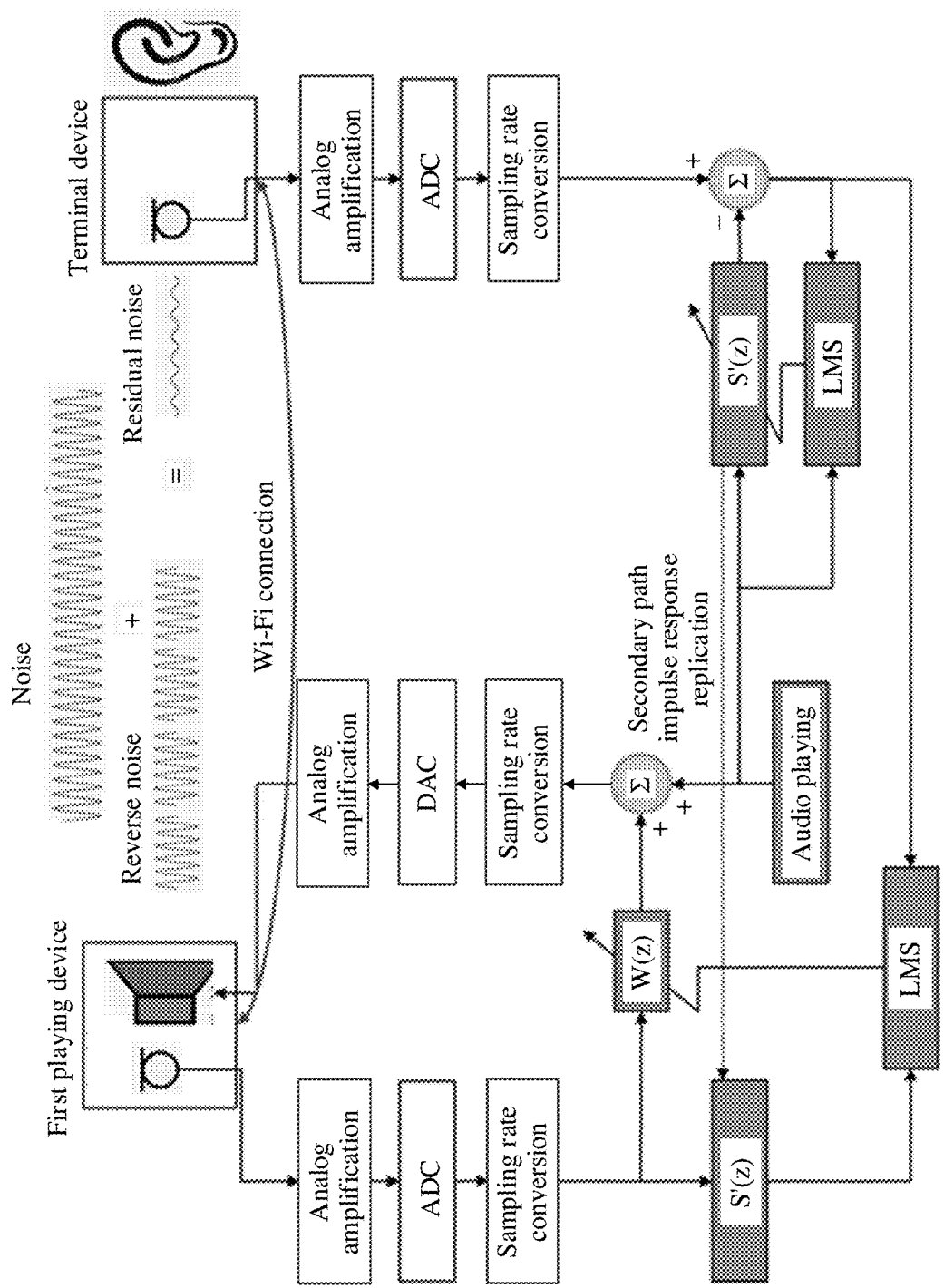
FIG. 20 is an example block diagram of an active noise reduction algorithm.

Specifically, FIG. 20 is a block diagram of an active noise reduction algorithm. As shown in FIG. 20, multimedia information in this embodiment is mainly audio information. The terminal device sends, to the first playing device, audio information corresponding to the first playing device. When playing the audio information, the first playing device may perform a time alignment synchronization operation according to the method shown in FIG. 3. When the first playing device plays the audio information, the terminal device captures the audio information by using a microphone. In this case, the microphone of the terminal device captures mixed audio information, and the mixed audio information includes the audio information corresponding to the first playing device and the ambient noise information.

The terminal device performs adaptive filtering based on the audio information stored by the terminal device and the captured mixed audio information, and subtracts the audio information corresponding to the first playing device from the mixed audio information captured by the microphone of the terminal device, to obtain the ambient noise information. In addition, an estimated value $S'(z)$ of the secondary path impulse response from the first playing device to the terminal device may also be obtained.

The terminal device may send the obtained ambient noise information to the first playing device by using a Wi-Fi network, or may send the obtained estimated value $S'(z)$ of the secondary path impulse response to the first playing device by using a Wi-Fi network, or may send both the ambient noise information and the estimated value $S'(z)$ of the secondary path impulse response to the first playing device by using a Wi-Fi network. The first playing device adaptively updates a filter coefficient $W(z)$ based on the received ambient noise information and/or the estimated value $S'(z)$ of the secondary path impulse response, and multiplies the ambient noise information by the filter coefficient $W(z)$ to obtain the reverse noise. In this way, when playing the audio information, the first playing device may further play directional noise, to cancel a part of ambient noise, so that the ambient noise sent by the terminal device is minimized, thereby achieving an objective of active noise reduction. The adaptive update algorithm may be a filtered least mean square (filtered-x least mean square, FXLMS) algorithm.

Specifically, as shown in FIG. 20, when the first playing device plays downlink audio information (for example, music), the captured audio information played by the first playing device is subtracted from the microphone of the terminal device by using a least mean square (LMS) adaptive filter. Assuming that the downlink audio information is $d(t)$, a corresponding signal captured by the microphone of the terminal device is $d(t) \times S(z)$, and an objective of the LMS adaptive filter is to cause $S'(z)$ to converge to $S(z)$. After complete convergence, $S'(z)$ is replicated to an FX-LMS adaptive filter on the left side to update the $W(z)$ active noise reduction coefficient. Finally, a resultant signal captured by the microphone of the terminal device is minimized, and an objective of active noise reduction is achieved.

For another playing device of the at least two playing devices, an objective of active noise reduction may also be achieved in the foregoing manner. For a noise reduction process, refer to related descriptions in the foregoing embodiment.

It can be understood that, if a plurality of playing devices are connected to the terminal device by using the Wi-Fi network, parallel adaptive filtering algorithms are run, and reverse noise output by the plurality of playing devices is superimposed, so that ambient noise captured by the microphone of the terminal device can be minimized.

In this embodiment, when the first playing device plays the multimedia information corresponding to the first playing device, the terminal device captures the mixed multimedia information, determines the ambient noise information and/or the estimated value of the secondary path impulse response from the first playing device to the terminal device based on the multimedia information corresponding to the first playing device and the mixed multimedia information, and sends the ambient noise information and/or the estimated value of the secondary path impulse response to the first playing device; and then the first playing device may obtain the reverse noise based on the ambient noise information and/or the estimated value of the secondary path impulse response, to cancel the ambient noise information. Therefore, an objective of active noise reduction can also be achieved in an open environment.

According to the multimedia information processing method provided in this embodiment of this application, the relative position information of the at least two playing devices is obtained; the position information of the user relative to the at least two playing devices is obtained based on the relative position information of the at least two playing devices; then the sound field correction is performed, based on the position information of the user relative to the at least two playing devices and the relative position information of the at least two playing devices, on the original multimedia information corresponding to the first playing device of the at least two playing devices, to obtain the multimedia information corresponding to the first playing device, where the multimedia information includes audio information; and then the multimedia information corresponding to the first playing device is sent to the first playing device. Because a sound field correction can be performed, based on the position information of the user relative to the at least two playing devices and the relative position information of the at least two playing devices, on original multimedia information corresponding to each of the at least two playing devices, and corrected multimedia information is sent to each playing device, after the playing device plays the multimedia information, the user is in a sweet spot, and listening experience of the user can be improved.

Figure 21:
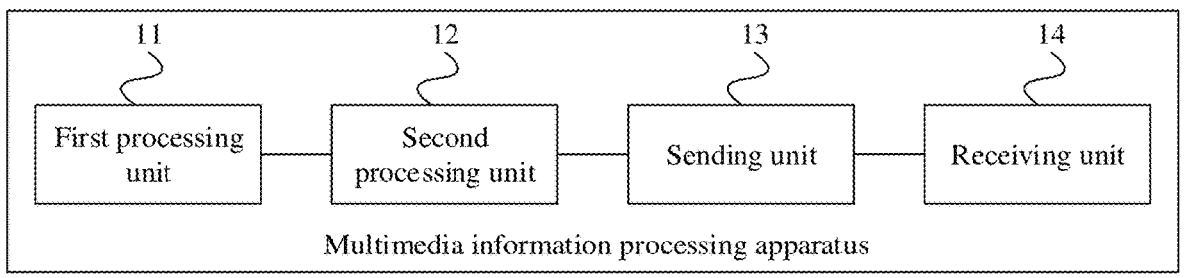
FIG. 21 is an example schematic diagram of a structure of a multimedia information processing apparatus according to an embodiment of this application.

FIG. 21 is a schematic diagram of a structure of a multimedia information processing apparatus according to an embodiment of this application. The multimedia information processing apparatus may be the terminal device in the foregoing embodiment, or may be the playing device in the foregoing embodiment. Referring to FIG. 21, the apparatus includes a first processing unit 11, a second processing unit 12, a microphone (not shown in the figure), and a display unit (not shown in the figure).

The first processing unit 11 is configured to determine a data transmission delay between a terminal device and a first playing device of at least two playing devices.

The first processing unit 11 is further configured to determine a clock offset between the terminal device and the first playing device based on the data transmission delay between the terminal device and the first playing device.

The second processing unit 12 is configured to determine, based on the clock offset between the terminal device and the first playing device, a first start playing time of multimedia information corresponding to the first playing device, where the first start playing time is used to indicate a start time at which the first playing device plays the multimedia information corresponding to the first playing device.

In addition, the microphone is configured to capture a sound signal and convert the sound signal into an electrical signal. The display unit is configured to display the multimedia information that is played.

The multimedia information processing apparatus provided in this embodiment of this application may perform the foregoing corresponding method embodiment, for example, the embodiment shown in FIG. 3. Implementation principles and technical effects thereof are similar.

Optionally, the apparatus is the terminal device, and the apparatus further includes: a sending unit 13, configured to send, to the first playing device, the multimedia information corresponding to the first playing device and the first start playing time.

Optionally, the apparatus is the terminal device, and the apparatus further includes the sending unit 13.

The first processing unit 11 is further configured to determine a data transmission delay between the terminal device and a second playing device of the at least two playing devices.

The first processing unit 11 is further configured to determine a clock offset between the terminal device and the second playing device based on the data transmission delay between the terminal device and the second playing device.

The second processing unit 12 is further configured to determine, based on the clock offset between the terminal device and the second playing device, a second start playing time of multimedia information corresponding to the second playing device, where the second start playing time is used to indicate a start time at which the second playing device plays the multimedia information corresponding to the second playing device, and the first start playing time and the second start playing time enable the first playing device and the second playing device to synchronously play the multimedia information corresponding to the first playing device and the second playing device.

The sending unit 13 is configured to send, to the second playing device, the multimedia information corresponding to the second playing device and the second start playing time.

Optionally, the first processing unit 11 is configured to:
determine the data transmission delay between the terminal device and the first playing device and a clock offset corresponding to the data transmission delay between the terminal device and the first playing device;
compare the data transmission delay between the terminal device and the first playing device with a preset threshold; and
if the data transmission delay between the terminal device and the first playing device is less than or equal to the preset threshold, determine that the clock offset corresponding to the data transmission delay between the terminal device and the first playing device is the clock offset between the terminal device and the first playing device.

Optionally, the first processing unit 11 is configured to:
determine, based on times at which synchronization messages are sent and received by the terminal device and the first playing device, the data transmission delay between the terminal device and the first playing device and the clock offset corresponding to the data transmission delay between the terminal device and the first playing device.

Optionally, the first processing unit 11 is configured to:
if the data transmission delay between the terminal device and the first playing device is greater than the preset threshold, determine the clock offset between the terminal device and the first playing device based on historical times that are recorded by the terminal device and at which synchronization messages are sent and received by the terminal device and the first playing device, where the historical times are recorded in a historical time period of preset duration, or a quantity of the historical times is a preset value.

Optionally, the first processing unit 11 is configured to:
determine, based on the historical times, at least two historical data transmission delays and historical clock offsets corresponding to the at least two historical data transmission delays, where the at least two historical data transmission delays are data transmission delays between the terminal device and the first playing device; and determine that a historical clock offset corresponding to a shortest one of the at least two historical data transmission delays is the clock offset between the terminal device and the first playing device.

Optionally, the apparatus is the terminal device, and the synchronization messages include a synchronization request and a synchronization response; and the apparatus further includes a receiving unit 14, where the first processing unit 11 is further configured to determine a first time at which a synchronization request is received from the first playing device and a second time at which a synchronization response is sent to the first playing device;

the receiving unit 14 is configured to receive a first message from the first playing device, where the first message includes a third time at which the first playing device sends the synchronization request and a fourth time at which the first playing device receives the synchronization response; and the first processing unit 11 is further configured to determine, based on the first time, the second time, the third time, and the fourth time, the data transmission delay between the terminal device and the first playing device and the clock offset corresponding to the data transmission delay between the terminal device and the first playing device.

Optionally, the apparatus is the terminal device, and the synchronization messages include a synchronization request and a synchronization response; and the apparatus further includes a receiving unit 14, where the first processing unit 11 is further configured to determine a fifth time at which a synchronization request is sent to the first playing device and a sixth time at which a synchronization response is received from the first playing device;

the receiving unit 14 is configured to receive a second message from the first playing device, where the second message includes a seventh time at which the first playing device receives the synchronization request and an eighth time at which the first playing device sends the synchronization response; and the first processing unit 11 is further configured to determine, based on the fifth time, the sixth time, the seventh time, and the eighth time, the data transmission delay between the terminal device and the first playing device and the clock offset corresponding to the data transmission delay between the terminal device and the first playing device.

Optionally, the multimedia information includes audio information; and the sending unit 13 is further configured to:

perform sound channel processing on an audio stream to be played, to obtain audio information corresponding to at least two sound channels; and send, to the first playing device, audio information corresponding to one of the at least two sound channels.

The multimedia information processing apparatus provided in this embodiment of this application may perform the foregoing corresponding method embodiment, for example, the embodiments shown in FIG. 3 and FIG. 8. Implementation principles and technical effects thereof are similar.

It should be noted that, it should be understood that, the division into the units of the apparatus is merely logical function division. In actual implementation, all or some of the units may be integrated into a physical entity, or the units may be physically separate. In addition, these units may all be implemented in a form of software invoked by using a processing element, or may all be implemented in a form of hardware; or some units may be implemented in a form of software invoked by using a processing element, and some units are implemented in a form of hardware. For example, the sending unit may be a processing element disposed separately, or may be integrated into a chip of the apparatus for implementation. In addition, the sending unit may be stored in a memory of the apparatus in a form of a program, and invoked by a processing element of the apparatus to perform the function of the sending unit. Implementation of other units is similar to the implementation of the sending unit. In addition, all or some of the units may be integrated together, or may be implemented independently. The processing element described herein may be an integrated circuit with a signal processing capability. In an implementation process, steps of the foregoing method or the foregoing units may be implemented by using an integrated logic circuit of hardware in the processor element, or by using an instruction in a form of software. In addition, the sending unit is a unit that controls sending, and may send information by using a transmit apparatus, such as an antenna and a radio frequency apparatus, of the apparatus.

The foregoing units may be configured as one or more integrated circuits for implementing the foregoing method, for example, one or more application specific integrated circuits (ASICs), one or more microprocessors (DSPs), or one or more field-programmable gate arrays (FPGAs). For another example, when one of the foregoing units is implemented by scheduling a program by a processing element, the processing element may be a general-purpose processor, for example, a central processing unit (CPU) or another processor that can invoke the program. For still another example, the units may be integrated and implemented in a form of a system-on-a-chip (SOC).

Figure 22:
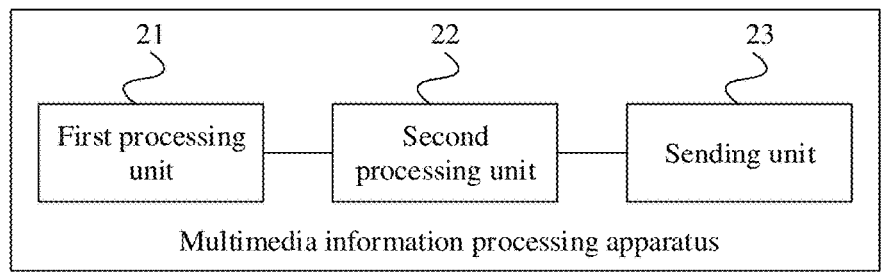
FIG. 22 is an example schematic diagram of another structure of a multimedia information processing apparatus according to an embodiment of this application.

FIG. 22 is another schematic diagram of a structure of a multimedia information processing apparatus according to an embodiment of this application. The multimedia information processing apparatus may be the terminal device in the foregoing embodiment, or may be the playing device in the foregoing embodiment. Referring to FIG. 22, the apparatus includes a first processing unit 21, a second processing unit 22, a microphone (not shown in the figure), and a display unit (not shown in the figure).

The first processing unit 21 is configured to obtain relative position information of at least two playing devices.

The first processing unit 21 is further configured to obtain position information of a user relative to the at least two playing devices based on the relative position information of the at least two playing devices.

The second processing unit 22 is configured to perform, based on the position information of the user relative to the at least two playing devices and the relative position information of the at least two playing devices, a sound field correction on original multimedia information corresponding to a first playing device of the at least two playing devices, to obtain multimedia information corresponding to the first playing device, where the multimedia information includes audio information.

In addition, the microphone is configured to capture a sound signal and convert the sound signal into an electrical signal. The display unit is configured to display the multimedia information that is played.

The multimedia information processing apparatus provided in this embodiment of this application may perform the foregoing corresponding method embodiment, for example, the embodiment shown in FIG. 15. Implementation principles and technical effects thereof are similar.

Optionally, the apparatus is a terminal device, and the apparatus further includes a sending unit 23.

The sending unit 23 is configured to send, to the first playing device, the multimedia information corresponding to the first playing device.

Optionally, the apparatus is the terminal device, and the apparatus further includes the sending unit 23.

The second processing unit 22 is further configured to perform, based on the position information of the user relative to the at least two playing devices and the relative position information of the at least two playing devices, a sound field correction on original multimedia information corresponding to a second playing device of the at least two playing devices, to obtain multimedia information corresponding to the second playing device, where the multimedia information includes audio information.

The sending unit 23 is configured to send, to the second playing device, the multimedia information corresponding to the second playing device.

Optionally, the relative position information of the at least two playing devices includes a distance between the first playing device and the second playing device of the at least two playing devices; and the first processing unit 21 is configured to:
    obtain first angle information of the first playing device relative to a microphone array of the second playing device and second angle information of the second playing device relative to a microphone array of the first playing device by using a sound source localization technology, where the first angle information is angle information in a coordinate axis of the microphone array of the second playing device, and the second angle information is angle information in a coordinate axis of the microphone array of the first playing device;
    perform a rotation correction on the coordinate axis of the microphone array of the first playing device based on the first angle information and the second angle information, where an axial direction of the coordinate axis of the microphone array of the second playing device is consistent with an axial direction of the coordinate axis of the microphone array of the first playing device after the rotation correction; and
    determine, based on the coordinate axis of the microphone array of the first playing device after the rotation correction and based on the distance between the first playing device and the second playing device, a position of the user relative to the first playing device.

Optionally, the first processing unit 21 is configured to:
    obtain third angle information of the user relative to the microphone array of the first playing device by using the sound source localization technology, where the third angle information is angle information in the coordinate axis of the microphone array of the first playing device after the rotation correction;
    obtain fourth angle information of the user relative to the microphone array of the second playing device by using the sound source localization technology, where the fourth angle information is angle information in the coordinate axis of the microphone array of the second playing device; and
    determine the position of the user relative to the first playing device based on the distance between the first playing device and the second playing device, the third angle information, and the fourth angle information.

Optionally, the relative position information of the at least two playing devices includes the distance between the first playing device and the second playing device of the at least two playing devices; and the first processing unit 21 is configured to:
    determine first duration and second duration, where the first duration is a difference between a time at which the microphone of the first playing device captures a second sound played by the second playing device and a time at which the microphone of the first playing device captures a first sound played by the first playing device, and the second duration is a difference between a time at which the microphone of the second playing device captures the second sound played by the second playing device and a time at which the microphone of the second playing device captures the first sound played by the first playing device; and
    determine the distance between the first playing device and the second playing device based on the first duration and the second duration.

Optionally, the first processing unit 21 is configured to:
    determine the distance between the first playing device and the second playing device based on a formula $D=(Tdelay1-Tdelay2)*C/2$, where D is the distance between the first playing device and the second playing device, Tdelay1 is the first duration, Tdelay2 is the second duration, and C is a sound velocity.

Optionally, the apparatus is the terminal device, and the apparatus further includes the sending unit 23.

When the first playing device plays the multimedia information corresponding to the first playing device, the second processing unit 22 is further configured to capture mixed multimedia information, where the mixed multimedia information includes the multimedia information corresponding to the first playing device and ambient noise information.

The second processing unit 22 is further configured to determine the ambient noise information and/or an estimated value of a secondary path impulse response from the first playing device to the terminal device based on the multimedia information corresponding to the first playing device and the mixed multimedia information.

The sending unit 23 is configured to send the ambient noise information and/or the estimated value of the secondary path impulse response to the first playing device, where the noise information and/or the estimated value of the secondary path impulse response are/is used to obtain reverse noise, and the reverse noise is used to cancel the ambient noise information.

The multimedia information processing apparatus provided in this embodiment of this application may perform the foregoing corresponding method embodiment, for example, the embodiment shown in FIG. 15. Implementation principles and technical effects thereof are similar.

It should be noted that, it should be understood that, the division into the units of the apparatus is merely logical function division. In actual implementation, all or some of the units may be integrated into a physical entity, or the units may be physically separate. In addition, these units may all be implemented in a form of software invoked by using a processing element, or may all be implemented in a form of hardware; or some units may be implemented in a form of software invoked by using a processing element, and some units are implemented in a form of hardware. For example, the sending unit may be a processing element disposed separately, or may be integrated into a chip of the apparatus for implementation. In addition, the sending unit may be stored in a memory of the apparatus in a form of a program, and invoked by a processing element of the apparatus to perform the function of the sending unit. Implementation of other units is similar to the implementation of the sending unit. In addition, all or some of the units may be integrated together, or may be implemented independently. The processing element described herein may be an integrated circuit with a signal processing capability. In an implementation process, steps of the foregoing method or the foregoing units may be implemented by using an integrated logic circuit of hardware in the processor element, or by using an instruction in a form of software. In addition, the sending unit is a unit that controls sending, and may send information by using a transmit apparatus, such as an antenna and a radio frequency apparatus, of the apparatus.

The foregoing units may be configured as one or more integrated circuits for implementing the foregoing method, for example, one or more application specific integrated circuits (ASICs), one or more microprocessors (DSPs), or one or more field programmable gate arrays (FPGAs). For another example, when one of the foregoing units is implemented by scheduling a program by a processing element, the processing element may be a general-purpose processor, for example, a central processing unit (CPU) or another processor that can invoke the program. For still another example, the units may be integrated and implemented in a form of a system-on-a-chip (SOC).

Figure 23:
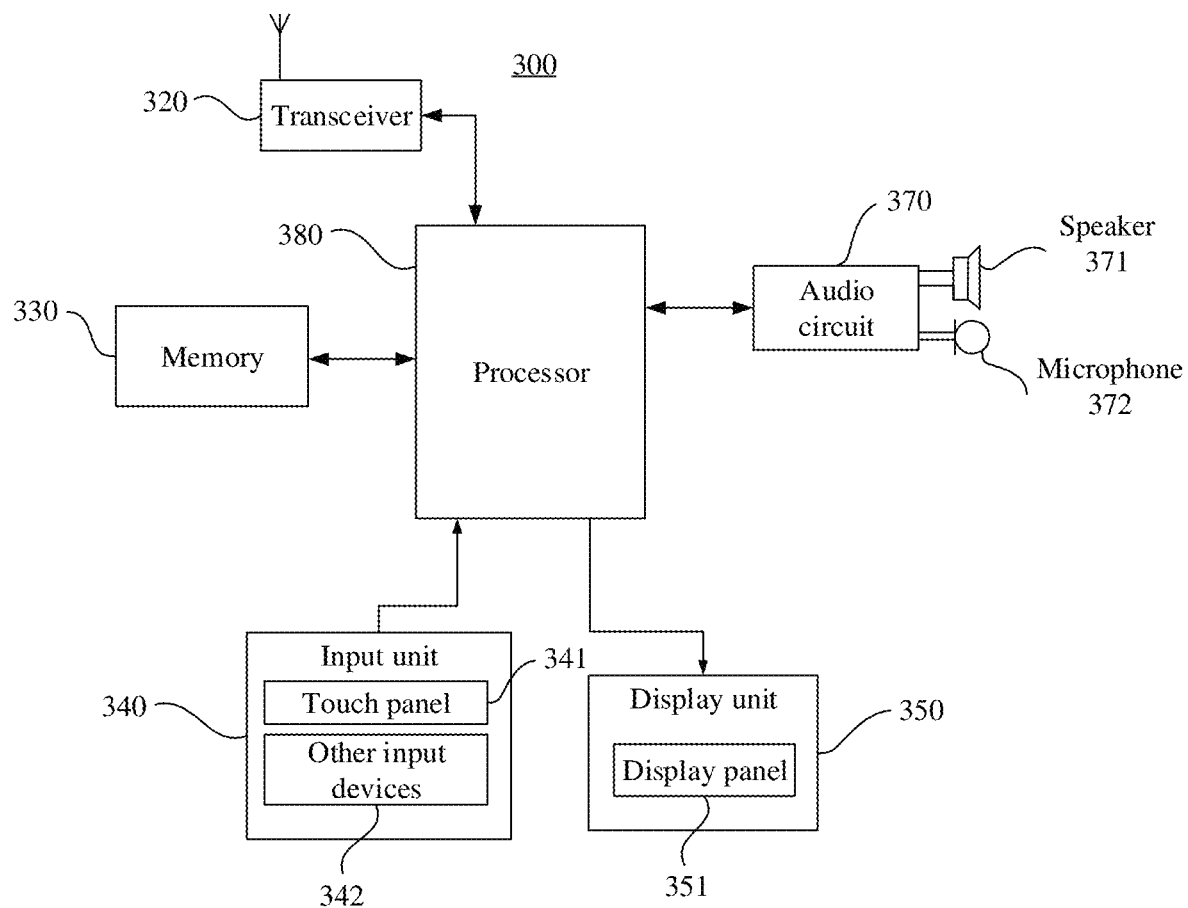
FIG. 23 is an example schematic diagram of still another structure of a multimedia information processing apparatus according to an embodiment of this application.

FIG. 23 is still another schematic diagram of a structure of a multimedia information processing apparatus according to an embodiment of this application. The multimedia information processing apparatus may be the terminal device in the foregoing embodiment, or may be the playing device in the foregoing embodiment. Referring to FIG. 23, the multimedia information processing apparatus 300 includes a processor 380, a memory 330, and a transceiver 320.

In this embodiment of this application, the memory 330 is configured to store instructions, the processor 380 is configured to execute the instructions stored in the memory 330, and the memory 330 is configured to store a software program and a module. The processor 380 executes various function applications and data processing by running the software program and the module that are stored in the memory 330, for example, may perform the steps shown in FIG. 3 or FIG. 8, such as determining a data transmission delay between a terminal device and a first playing device of at least two playing devices, determining a clock offset between the terminal device and the first playing device based on the data transmission delay between the terminal device and the first playing device, and determining, based on the clock offset between the terminal device and the first playing device, a first start playing time of multimedia information corresponding to the first playing device, and/or is used for other processes in the technology described in this application.

In addition, the processor 380 executes various function applications and data processing by running the software program and the module that are stored in the memory 330, for example, may perform the steps shown in FIG. 15, such as obtaining relative position information of at least two playing devices, obtaining position information of a user relative to the at least two playing devices based on the relative position information of the at least two playing devices, and performing, based on the position information of the user relative to the at least two playing devices and the relative position information of the at least two playing devices, a sound field correction on original multimedia information corresponding to a first playing device of the at least two playing devices, to obtain multimedia information corresponding to the first playing device, and/or is used for other processes in the technology described in this application.

When the multimedia information processing apparatus 300 is a terminal device, the transceiver 320 is configured to send, to the first playing device, the multimedia information corresponding to the first playing device and the first start playing time; and the transceiver 320 is further configured to send, to a second playing device, multimedia information corresponding to the second playing device and a second start playing time.

When the multimedia information processing apparatus 300 is a playing device, the transceiver 320 is configured to send, to the terminal device, the determined position information of the user relative to the at least two playing devices.

The processor 380 may be, for example, the processor 110 in FIG. 2. The memory 330 may be, for example, the internal memory 121 in FIG. 2. The transceiver 320 may be, for example, the antenna 1 and the antenna 2 in FIG. 2.

It may be understood that the multimedia information processing apparatus 300 may further include an audio circuit 370, an input unit 340, and a display unit 350. The audio circuit 370 includes a speaker 371 and a microphone 372. For functions of the audio circuit 370, the speaker 371, and the microphone 372, refer to the descriptions of the audio module 170, the speaker 170A, and the microphone 170C in FIG. 2. In addition, at least three microphones 372 need to be disposed in the multimedia information processing apparatus 300 to form a microphone array. The processor 380 may control the microphone array to perform sound source localization, to obtain first angle information of the first playing device relative to a microphone array of the second playing device and second angle information of the second playing device relative to a microphone array of the first playing device. The processor 380 may control the microphone array to perform sound source localization, to obtain third angle information of the user relative to the microphone array of the first playing device and fourth angle information of the user relative to the microphone array of the second playing device.

A speaker 371 in the first playing device is configured to play the multimedia information corresponding to the first playing device. A speaker 371 in the second playing device is configured to play the multimedia information corresponding to the second playing device.

The input unit 340 may be configured to receive input digit or character information and generate a key signal input related to a user setting and function control of the multimedia information processing apparatus 300. Specifically, the input unit 340 may include a touchscreen 341 and another input device 342. The touchscreen 341 is also referred to as a touch panel, and may collect a touch operation performed by a user on or near the touchscreen 341 (for example, an operation performed by the user on the touchscreen 341 or near the touchscreen 341 by using any proper object or accessory such as a finger or a stylus), and drive a corresponding connection apparatus based on a preset program. Optionally, the touchscreen 341 may include two parts: a touch detection apparatus and a touch controller. The touch detection apparatus detects a touch orientation of the user, detects a signal generated by the touch operation, and transmits the signal to the touch controller. The touch controller receives touch information from the touch detection apparatus, converts the touch information into touch point coordinates, and then sends the touch point coordinates to the processor 380. The touch controller may receive, and execute a command sent by the processor 380. In addition, the touchscreen 341 may be implemented in a plurality of types, for example, a resistive type, a capacitive type, an infrared type, and a surface acoustic wave type. In addition to the touchscreen 341, the input unit 340 may further include the another input device 342. Specifically, the another input device 342 may include but is not limited to one or more of a physical keyboard, a function button (such as a volume control button or a switch button), a trackball, a mouse, a joystick, and the like.

The input unit 340 may be, for example, the button 190 in FIG. 2.

The display unit 350 may be configured to display information input by the user or information provided to the user and various menus of the multimedia information processing apparatus 300. The display unit 350 may include a display panel 351. For a function of the display unit 350, refer to the description of the display 194 in FIG. 2.

This application further provides a storage medium, including a readable storage medium and a computer program, where the computer program is used to implement the multimedia information processing method provided in any one of the foregoing embodiments.

This application further provides a program product, where the program product includes a computer program (that is, executable instructions), and the computer program is stored in a readable storage medium. At least one processor of a terminal device or a playing device may read the computer program from the readable storage medium, and the at least one processor executes the computer program, so that the terminal device or the playing device implements the multimedia information processing method provided in the foregoing embodiments.

An embodiment of this application further provides a multimedia information processing apparatus, including at least one storage element and at least one processing element. The at least one storage element is configured to store a program. When the program is executed, the multimedia information processing apparatus is enabled to perform an operation of the terminal device or the playing device according to any one of the foregoing embodiments. The apparatus may be a terminal chip or a playing device chip.

All or some of the steps of the method embodiments may be implemented by a program instructing related hardware. The foregoing program may be stored in a computer-readable memory. When the program is executed, the steps of the methods in the embodiments are performed. The memory (e.g., storage medium) includes: a read-only memory (ROM), a RAM, a flash memory, a hard disk, a solid-state drive, a magnetic tape, a floppy disk, an optical disc, and any combination thereof.

It should be noted that, to make the description brief, the foregoing method embodiments are expressed as a series of actions. However, a person skilled in the art should appreciate that the present technology is not limited to the described action sequence, because according to the present technology, some steps may be performed in other sequences or performed simultaneously. In addition, a person skilled in the art should know that the actions and modules described in this specification are not mandatory for the present technology.

A person of ordinary skill in the art may understand that all or some of the procedures of the methods in the foregoing embodiments may be implemented by a computer program instructing relevant hardware. The program may be stored in a computer-readable storage medium. When the program runs, the procedures of the methods in the embodiments are performed. The foregoing storage medium may be a magnetic disk, an optical disc, a read-only memory (ROM), a random access memory (RAM), or the like.

Although the present technology is described with reference to the embodiments, in a process of implementing the present technology that the claims protect, a person skilled in the art may understand and implement other variations of the disclosed embodiments by viewing the accompanying drawings, disclosed content, and the appended claims. In the claims, "comprising" does not exclude another component or another step, and "a" or "one" does not exclude a case of a plurality of. A single processor or another module may implement several functions enumerated in the claims. Some measures are recorded in dependent claims that are different from each other, but this does not mean that these measures cannot be combined to produce a better effect. A computer program may be stored/distributed in an appropriate medium such as an optical storage medium or a solid-state medium and be provided together with other hardware or be used as a part of hardware, or may be distributed in another manner, for example, by using the Internet, or another wired or wireless telecommunications system.

Specific examples are used in this specification to describe the principles and implementations of the present technology. The descriptions of the foregoing embodiments are merely intended to help understand the methods and ideas of the present technology. In addition, with respect to the implementations and the application scope, modifications may be made by a person of ordinary skill in the art according to the ideas of the present technology. Therefore, this specification shall not be construed as a limitation on the present technology.

What is claimed is:

1. A multimedia information processing method, comprising:
    obtaining relative position information of first and second playing devices;
    obtaining first angle information of the first playing device relative to a microphone array of the second playing device, and second angle information of the second playing device relative to a microphone array of the first playing device;
    performing a rotation correction on a coordinate axis of the microphone array of the first playing device based on the first angle information and the second angle information;
    determining, based on the coordinate axis of the microphone array of the first playing device after the rotation correction and based on the relative position information of the first playing device and the second playing device, position information associated with a position of the user relative to the first playing device and the second playing device; and
    performing, based on the position information associated with the position of the user relative to the first and second playing devices and the relative position information of the first and second playing devices, a sound field correction on original multimedia information corresponding to the first playing device, to obtain multimedia information corresponding to the first playing device, wherein the multimedia information includes audio information.

2. The method according to claim 1, further comprising:
sending, to the first playing device, the multimedia information corresponding to the first playing device.

3. The method according to claim 1, further comprising:
performing, based on the position information associated with the position of the user relative to the first and second playing devices and the relative position information of the first and second playing devices, a sound field correction on original multimedia information corresponding to the second playing device, to obtain multimedia information corresponding to the second playing device, wherein the multimedia information includes audio information; and
sending, to the second playing device, the multimedia information corresponding to the second playing device.

4. The method according to claim 1, wherein
the relative position information of the first and second playing devices includes a distance between the first playing device and the second playing device,
the first angle information and the second angle information are obtained by using a sound source localization technology,
the first angle information includes a coordinate axis of the microphone array of the second playing device, and the second angle information includes the coordinate axis of the microphone array of the first playing device, and
an axial direction of the coordinate axis of the microphone array of the second playing device is consistent with an axial direction of the coordinate axis of the microphone array of the first playing device after the rotation correction.

5. The method according to claim 4, wherein determining the position of the user relative to the first playing device and the second playing device comprises:
obtaining third angle information of the user relative to the microphone array of the first playing device by using the sound source localization technology, wherein the third angle information includes the coordinate axis of the microphone array of the first playing device after the rotation correction;
obtaining fourth angle information of the user relative to the microphone array of the second playing device by using the sound source localization technology, wherein the fourth angle information includes the coordinate axis of the microphone array of the second playing device; and
determining the position of the user relative to the first playing device based on the distance between the first playing device and the second playing device, the third angle information, and the fourth angle information.

6. The method according to claim 1, wherein the relative position information of the first and second playing devices includes a distance between the first playing device and the second playing device, and obtaining the relative position information of the first and second playing devices comprises:
determining a first duration and a second duration, wherein the first duration includes a difference between a time at which a microphone of the first playing device captures a second sound played by the second playing device and a time at which the microphone of the first playing device captures a first sound played by the first playing device, and the second duration includes a difference between a time at which a microphone of the second playing device captures the second sound played by the second playing device and a time at which the microphone of the second playing device captures the first sound played by the first playing device; and
determining the distance between the first playing device and the second playing device based on the first duration and the second duration.

7. The method according to claim 1, further comprising:
when the first playing device plays the multimedia information corresponding to the first playing device, capturing mixed multimedia information, wherein the mixed multimedia information includes the multimedia information corresponding to the first playing device and ambient noise information;
determining the ambient noise information and/or an estimated value of a secondary path impulse response from the first playing device to a terminal device based on the multimedia information corresponding to the first playing device and the mixed multimedia information; and
sending the ambient noise information and/or the estimated value of the secondary path impulse response to the first playing device, wherein the ambient noise information and/or the estimated value of the secondary path impulse response are used to obtain reverse noise, and the reverse noise is used to cancel the ambient noise information.

8. A multimedia information processing apparatus, comprising:
a processor; and
a memory configured to store computer readable instructions that, when executed by the processor, cause the multimedia information processing apparatus to:
obtain relative position information of first and second playing devices;
obtain first angle information of the first playing device relative to a microphone array of the second playing device, and second angle information of the second playing device relative to a microphone array of the first playing device;
perform a rotation correction on a coordinate axis of the microphone array of the first playing device based on the first angle information and the second angle information;
determine, based on the coordinate axis of the microphone array of the first playing device after the rotation correction and based on the relative position information of the first playing device and the second playing device, position information associated with a position of the user relative to the first playing device and the second playing device; and
perform, based on the position information associated with the position of the user relative to the first and second playing devices and the relative position information of the first and second playing devices, a sound field correction on original multimedia information corresponding to the first playing device, to obtain multimedia information corresponding to the first playing device, wherein the multimedia information includes audio information.

9. The multimedia information processing apparatus according to claim 8, wherein the multimedia information processing apparatus includes a terminal device, and the multimedia information processing apparatus further comprises a transceiver, wherein the transceiver is configured to send, to the first playing device, the multimedia information corresponding to the first playing device.

10. The multimedia information processing apparatus according to claim 8, further comprising a transceiver, wherein the multimedia information processing apparatus is further caused to perform, based on the position information associated with the position of the user relative to the first and second playing devices and the relative position information of the first and second playing devices, a sound field correction on original multimedia information corresponding to the second playing device, to obtain multimedia information corresponding to the second playing device, wherein the multimedia information includes audio information; and the transceiver is configured to send, to the second playing device, the multimedia information corresponding to the second playing device.

11. The multimedia information processing apparatus according to claim 8, wherein the relative position information of the first and second playing devices includes a distance between the first playing device and the second playing device;

the first angle information and the second angle information are obtained by using a sound source localization technology, the first angle information includes a coordinate axis of the microphone array of the second playing device, and the second angle information includes the coordinate axis of the microphone array of the first playing device, and an axial direction of the coordinate axis of the microphone array of the second playing device is consistent with an axial direction of the coordinate axis of the microphone array of the first playing device after the rotation correction.

12. The multimedia information processing apparatus according to claim 8, wherein the relative position information of the first and second playing devices includes a distance between the first playing device and the second playing device, and the multimedia information processing apparatus is further caused to:

determine a first duration and a second duration, wherein the first duration includes a difference between a time at which a microphone of the first playing device captures a second sound played by the second playing device and a time at which the microphone of the first playing device captures a first sound played by the first playing device, and the second duration includes a difference between a time at which a microphone of the second playing device captures the second sound played by the second playing device and a time at which the microphone of the second playing device captures the first sound played by the first playing device; and determine the distance between the first playing device and the second playing device based on the first duration and the second duration.

13. The multimedia information processing apparatus according to claim 8, further comprising a transceiver, wherein when the first playing device plays the multimedia information corresponding to the first playing device, mixed multimedia information is captured, wherein the mixed multimedia information includes the multimedia information corresponding to the first playing device and ambient noise information;

the multimedia information processing apparatus is further caused to determine the ambient noise information and/or an estimated value of a secondary path impulse response from the first playing device to the terminal device based on the multimedia information corresponding to the first playing device and the mixed multimedia information; and the transceiver is configured to send the ambient noise information and/or the estimated value of the secondary path impulse response to the first playing device, wherein the ambient noise information and/or the estimated value of the secondary path impulse response are used to obtain reverse noise, and the reverse noise is used to cancel the ambient noise information.

14. A non-transitory computer-readable storage medium storing a computer program having computer readable instructions that, when executed by a processor of a multimedia information processing apparatus, cause the multimedia information processing apparatus to provide execution comprising:

obtaining relative position information of first and second playing devices;

obtaining first angle information of the first playing device relative to a microphone array of the second playing device, and second angle information of the second playing device relative to a microphone array of the first playing device;

performing a rotation correction on a coordinate axis of the microphone array of the first playing device based on the first angle information and the second angle information;

determining, based on the coordinate axis of the microphone array of the first playing device after the rotation correction and based on the relative position information of the first playing device and the second playing device, position information associated with a position of the user relative to the first playing device and the second playing device; and performing, based on the position information associated with the position of the user relative to the first and second playing devices and the relative position information of the first and second playing devices, a sound field correction on original multimedia information corresponding to the first playing device, to obtain multimedia information corresponding to the first playing device, wherein the multimedia information includes audio information.

15. The non-transitory computer-readable storage medium of claim 14, wherein the multimedia information processing apparatus is further caused to provide execution comprising:

sending, to the first playing device, the multimedia information corresponding to the first playing device.

16. The non-transitory computer-readable storage medium of claim 14, wherein the multimedia information processing apparatus is further caused to provide execution comprising:

performing, based on the position information associated with the position of the user relative to the first and second playing devices and the relative position information of the first and second playing devices, a sound field correction on original multimedia information corresponding to the second playing device, to obtain multimedia information corresponding to the second playing device, wherein the multimedia information includes audio information; and sending, to the second playing device, the multimedia information corresponding to the second playing device.

17. The non-transitory computer-readable storage medium of claim 14, wherein the relative position information of the first and second playing devices includes a distance between the first playing device and the second playing device the first angle information and the second angle information are obtained by using a sound source localization technology, the first angle information includes a coordinate axis of the microphone array of the second playing device, and the second angle information includes the coordinate axis of the microphone array of the first playing device, and an axial direction of the coordinate axis of the microphone array of the second playing device is consistent with an axial direction of the coordinate axis of the microphone array of the first playing device after the rotation correction.

18. The non-transitory computer-readable storage medium of claim 17, wherein determining the position of the user relative to the first playing device and the second playing device comprises:

obtaining third angle information of the user relative to the microphone array of the first playing device by using the sound source localization technology, wherein the third angle information includes the coordinate axis of the microphone array of the first playing device after the rotation correction;

obtaining fourth angle information of the user relative to the microphone array of the second playing device by using the sound source localization technology, wherein the fourth angle information includes the coordinate axis of the microphone array of the second playing device; and determining the position of the user relative to the first playing device based on the distance between the first playing device and the second playing device, the third angle information, and the fourth angle information.

19. The non-transitory computer-readable storage medium of claim 14, wherein the relative position information of the first and second playing devices includes the a distance between the first playing device and the second playing device, and obtaining the relative position information of the first and second playing devices comprises:

determining a first duration and a second duration, wherein the first duration includes a difference between a time at which a microphone of the first playing device captures a second sound played by the second playing device and a time at which the microphone of the first playing device captures a first sound played by the first playing device, and the second duration includes a difference between a time at which a microphone of the second playing device captures the second sound played by the second playing device and a time at which the microphone of the second playing device captures the first sound played by the first playing device; and determining the distance between the first playing device and the second playing device based on the first duration and the second duration.

20. The non-transitory computer-readable storage medium of claim 14, wherein the multimedia information processing apparatus is further caused to provide execution comprising:

when the first playing device plays the multimedia information corresponding to the first playing device, capturing mixed multimedia information, wherein the mixed multimedia information includes the multimedia information corresponding to the first playing device and ambient noise information;

determining the ambient noise information and/or an estimated value of a secondary path impulse response from the first playing device to a terminal device based on the multimedia information corresponding to the first playing device and the mixed multimedia information; and sending the ambient noise information and/or the estimated value of the secondary path impulse response to the first playing device, wherein the ambient noise information and/or the estimated value of the secondary path impulse response are used to obtain reverse noise, and the reverse noise is used to cancel the ambient noise information.

* * * * *